(12) United States Patent
Beverina et al.

(10) Patent No.: US 7,308,388 B2
(45) Date of Patent: Dec. 11, 2007

(54) METHOD AND APPARATUS FOR RISK MANAGEMENT

(75) Inventors: Anthony Beverina, Falls Church, VA (US); Bryan Ware, Fairfax, VA (US)

(73) Assignee: Digital Sandbox, Inc., Mclean, VA (US)

( * ) Notice: Subject to any disclaimer, the term of this patent is extended or adjusted under 35 U.S.C. 154(b) by 1147 days.

(21) Appl. No.: 09/853,690

(22) Filed: May 14, 2001

(65) Prior Publication Data
US 2001/0027388 A1    Oct. 4, 2001

Related U.S. Application Data

(62) Division of application No. 09/453,509, filed on Dec. 3, 1999, now Pat. No. 7,231,327.

(51) Int. Cl.
*G06G 7/48* (2006.01)
(52) U.S. Cl. ............... 703/6; 703/2; 705/1; 705/4; 705/22
(58) Field of Classification Search ............... 703/6, 703/11, 2; 340/541; 705/22, 1, 4
See application file for complete search history.

(56) References Cited

U.S. PATENT DOCUMENTS

| | | | | |
|---|---|---|---|---|
| 5,440,498 | A * | 8/1995 | Timm ................ | 340/541 |
| 5,856,803 | A * | 1/1999 | Pevler ................ | 342/13 |
| 6,254,394 | B1 * | 7/2001 | Draper et al. ........ | 434/11 |
| 6,590,496 | B2 * | 7/2003 | Peterson et al. ...... | 340/522 |
| 7,027,992 | B2 * | 4/2006 | Zaccaria et al. ...... | 705/4 |
| 2001/0027389 | A1 * | 10/2001 | Beverina et al. ..... | 703/22 |
| 2004/0006513 | A1 * | 1/2004 | Wolfe ................ | 705/22 |
| 2004/0249679 | A1 * | 12/2004 | Henderson et al. .... | 705/4 |

OTHER PUBLICATIONS

"Applications of Quantitative Modeling to Knowledge-Based Risk Assessment Studies", Biswas et al, ACM 0-89791-320-5/89/0006/0092, ACM 1989.*
"Installation Force Protection Guide", United States Air Force, 1997.*
"The Strategic use of Expert Systems for Risk Management in the Insurance Industry", Meyer et al, ACM 089791-416-3, ACM 1990.*

(Continued)

*Primary Examiner*—Fred Ferris
(74) *Attorney, Agent, or Firm*—DLA Piper US LLP

(57) ABSTRACT

An integrated risk management tool includes a persistent object database to store information about actors (individuals and/or groups), physical surroundings, historical events and other information. The risk management tool also includes a decision support system that uses data objects from the database and advanced decision theory techniques, such as Bayesian Networks, to infer the relative risk of an undesirable event. As part of the relative risk calculation, the tool uses a simulation and gaming environment in which artificially intelligent actors interact with the environment to determine susceptibility to the undesired event. Preferred embodiments of the tool also include an open "plug-in" architecture that allows the tool to interface with existing consequence calculators. The tool also provides facilities for presenting data in a user-friendly manner as well as report generation facilities.

19 Claims, 53 Drawing Sheets

OTHER PUBLICATIONS

"Airport Vulnerability Assessment—An Analytical Approach", Lazarick, IEEE 0-7803-4535-5/98, IEEE 1998.*

"Hazard Analysis of Commercial Space Transportation" Federal Aviation Administration, Executive Summary, pp. 9-1 through 9-27, Oct. 1995.*

"Blast Vulnerability of Building Structures and the Public from Terrorist Attack", Johnson et al, Proceedings of 1994 International Carnahan Conference on Security Technology, IEEE 1994.*

Air Force Instruction 31-210, Secretary of the Air Force, Aug. 1, 1999.*

"Statigic Direction in Artificail Intelligence", Doyle et al, ACM Computing Surveys, vol. 28, No. 4, Dec. 1996.*

"Crisis Prediction Disaster Management", Swiatek et al, SAIC Science and Technology Trends II, Jun. 1994.*

"Tools against terrorism and other disasters", Press Release, Sandia National Laboratories, Jul. 2001.*

Nguyen, "Target Mission Estimation", IEEE Third International Conference on Knowledge-Based Intelligent Information Engine Systems, pp. 66-69 (Aug. 1999).

Allen, et al., "Modeling Requirements for Simulating the Effects of Extreme Acts of Terrorism: A White Paper", Sandia National Laboratories, Abstract (Oct. 1998).

Ojha, et al., "Quantifying Operational Risk Using Bayesian Networks and Monte Carlo Simulations", Proceedings of the Second International Conference on Information Fusion, Abstract (Jul. 1999).

Verton, "Marine Unit Buys Attack-Modeling Software", Federal Computer Week, p. 39 (Oct. 18, 1999).

Fitzgerald, "Anti-Terrorism Software Models Real Effects of Biological Weapons", Security, pp. 9-10 (Jul. 1999).

Santoso, et al., "Nuclear Plant Fault Diagnosis Using Probabilistic Reasoning", IEEE 1999 Power Engineering Society Summer Meeting, pp. 714-719 (Jul. 1999).

Bakert, et al. "Force Aggregation via Bayesian Nodal Analysis", IEEE 1998 Information Technology Conference, pp. 6-9 (Sep. 1998).

Ogyunyemi, et al., "Probabilistically Predicting Penetrating Injury for Decision Support", IEEE 1998 Symposium on Computer-Based Medical Systems, pp. 44-49 (Jun. 1998).

Geiger, et al., "Probabilistic Relevance Relations", IEEE Transactions on Systems, Man, and Cybernetics-Part A: Systems and Humans, vol. 28 No. 1, pp. 17-25 (Jan. 1998).

Goldszmidt, et al., "Plan Simulation Using Bayesian Networks", IEEE Proceedings of the 11th Conference on Artificial Intelligence to Applications, pp. 155-161 (Feb. 1995).

McMichael, "BARTIN: Minimising Bayes Risk and Incorporating Priors Using Supervised Learning Networks", IEE Proceedings F-Radar and Signal Processing, vol. 139 Issue 6, pp. 413-419 (Dec. 1992).

Anonymous, "Science and Technology" Serious Games, Economist, pp. 81-82 (Jul. 8, 2000).

* cited by examiner

801

Risk Summary Table

| WEAPON | DELIVERY SYSTEM | TARGETS | PROB. OF ATTACK | SUSCEPT- IBILITY | CONSEQ- UENCES | PASSIVE COUNTERMEASURES |
|---|---|---|---|---|---|---|
| 500LB BOMB | CAR | HEAD- QUARTERS | HIGH | MOD | HIGH | ID CHECK |
| 500LB BOMB | TRUCK | DLA HQ BLDG | MOD | HIGH | HIGH | FRF, WALL |
| ANTHRAX | AEROSOL | FT. BELVOIR | LOW | MOD | HIGH | DETECTORS PPC |
|  |  |  |  |  |  |  |
|  |  |  |  |  |  |  |

Site Profiler Risk Assessment

RISK ASSESSMENT:

THE LIKELIHOOD OF (VEHICULAR) (BOMBS) TO (FT. BELVOIR) IS HIGH.
YOUR MOST ATTRACTIVE TARGETS ARE:
    -BUILDING 2120, DLA HQ
    -BUILDING 600, NVESD LAB
    -BUILDING 1900, INSEAM HQ
    -BUILDING 20, GENERAL QUARTERS    <WHY?>

OF THESE TARGETS, (DLA HQ) IS THE MOST SUSCEPTIBLE.

THE CONSEQUENCES OF A (VEHICULAR) (BOMB) AT ALL OF THESE ASSETS IS EXTREMELY HIGH DUE TO:
    -VIP'S    <WHY?>
    -MISSION IMPORTANCE    <WHY?>
    -POPULATION    <WHY?>
    -RECOVERABILITY    <WHY?>
• MORE
• RISK TABLE       • DONE

Asset Attractiveness

IN ORDER TO ASSESS THE ATTRACTIVENESS OF THIS ASSET TO A TERRORIST, YOU WILL NEED TO DESCRIBE THE FOLLOWING FEATURES OF THE ASSET:
- PROXIMITY TO OTHER IMPORTANT ASSETS
- POPULATION
- DEMOGRAPHICS
- RECOGNIZABILITY
- ACCESSIBILITY
- AND IMPORTANCE

EACH OF THESE DESCRIPTIONS WILL IMPACT THE ATTRACTIVENESS OF THE ASSET TO A TERRORIST.

- <u>LET'S GET STARTED</u>

Risk Summary Table

Selecting a column heading and dragging it to the left will make a primary grouping Clicking on a column heading will sort and group the table based on that column being the secondary sort. — 1610

Selection of the entire row, using the arrow on the left of the table takes the user to the Risk Details Screen allowing access to the Sim and other features.

1620

| WEAPON | DELIVERY SYSTEM | TARGETS | PROB. OF ATTACK | SUSCEPT-IBILITY | CONSEQ-UENCES | PASSIVE COUNTERMEASURES |
|---|---|---|---|---|---|---|
| 500LB BOMB | CAR | HEAD-QUARTERS | HIGH | MOD | HIGH | ID CHECK |
| 5000LB BOMB | TRUCK | DLA HQ BLDG | MOD | HIGH | HIGH | FRF, WALL |
| ANTHRAX | AEROSOL | FT. BELVOIR | LOW | MOD | HIGH | DETECTORS PPC |

Clicking on a risk component will allow the user to dr

FIG. 31

Screen Definition consist of a list of items to display to the user

Title for the screen

Screen Definition — 3100

| Type | Prompts | Format | Data | Data Modifier |
|---|---|---|---|---|
| TITLE | User Information | BOLD | – | – |
| INPUT | Please enter your name: | – | User.Name | – |
| INPUT | Please enter your military ID number: | – | User.ID | – |
| INPUT | Please select your rank: | – | User.Rank | Ranks[ Service.Type] 2 |
| INPUT | Please enter you age: | – | User.Age | – |
| BREAK | – | – | – | – |
| NAV_IN | – | – | Team | – |
| TITLE | Assessment Information | BOLD | – | – |
| INPUT | Please enter the name of the base: | – | Assessment.Name | – |
| INPUT | Please select the date for the assessment: | – | Assessment.StartDate | – |

Data items the user needs to input with prompts to show beside them

Explicite navigational instructions to the GUI Engine to override the default flow of screens

METHOD AND APPARATUS FOR RISK MANAGEMENT

This application is a Divisional of application Ser. No. 09/453,509, filed Dec. 3, 1999, the entirety of which is incorporated herein by reference.

BACKGROUND OF THE INVENTION

1. Field of the Invention

The invention is related to the management of risk in general and more particularly to an apparatus and method of managing risks associated with terrorism.

2. Related Art

Risk can be defined as probability*vulnerability. Probability is the probability that an undesirable event will occur. Vulnerability is susceptibility to the event multiplied by the consequences associated with that event. Managing risk involves the process of determining the risk and taking steps to decrease the risk by decreasing the probability or vulnerability, or both. Managing risk is an important task faced by people in many different situations. Insurance companies and financial planners manage risk to capital when deciding when to insure and what stocks on bonds to include in a portfolio. Homeowners manage risk when deciding whether to purchase a burglar alarm system. One particularly important form of risk management is terrorism prevention.

Terrorism is a world-wide problem. Unfortunately, many in the United States associate terrorism with certain Arabian and/or Islamic nations and view the threat of terrorism from this limited framework. However, as recent events such as the Oklahoma City bombing have demonstrated, terrorism is not limited to any particular nation, religion, political system, or ideology. Today, the problem has become far more complex and is rapidly changing.

One problem faced by those with responsibility for assessing the threat of terrorism and its prevention is the lack of suitable tools to help them perform their tasks. Known tools generally fall into one of two categories: a) terrorist attack damage assessors; and b) terrorist attack likelihood predictors (i.e., probability calculators). The first type of tool, terrorist attack damage assessors (i.e., consequence calculators), are generally computer based. These tools attempt to answer the questions like "What will happen if a car carrying a 500 pound bomb explodes at the front door of my building?" (Blast model tools) and "What will happen if a 50 gallon drum of nerve gas is opened in the parking garage?" ("CBR"—chemical, biological and radiological—tools). The tools, which typically employ complex computer modeling algorithms such as those found in CAD/CAM programs, have three important drawbacks. First, they require detailed information (which can be difficult, time consuming and expensive to obtain) to construct the model and are often not flexible enough to handle situations in which the detailed data is not available. It is likely that data required to use these tools on the Murrah building in Oklahoma City would still not be collected at this point due to the time and costs associated with collecting such data. Second, these tools require expertise on the part of the user. Third, and perhaps most importantly, programs such as these provide no guidance as to the likelihood that the attack will succeed (the accessability), the likely location of an attack (e.g., the front or rear of the building, which building, etc., the type of weapon (explosive, chemical, biological or radiological) likely to be used, and how to prevent or at least minimize the occurrence of the attack in the first place.

The second type of tool, terrorist attack likelihood predictors, are typified by paper and pencil questionnaires provided by government agencies to remote locations. These tools attempt to answer the question "How likely am I to be attacked by terrorists?" The form of the tool is generally a series of questions such as "Do you have any nuclear material at your facility?", "Are you located in an urban, suburban or rural area? And "Are you a military or civilian installation?" These questionnaires award a certain number of points based on each answer and base the likelihood of terrorist attack on the total number of points. These tools also suffer from several serious drawbacks. While they may tell you that an attack is likely, they provide no guidance as to the nature of the attack and how to prevent it, provide no indication as to whether the attack will be successful, and provide no indication of the consequence of a successful attack.

Another problem faced by those charged with preventing terrorism is the lack of flexibility in adapting anti-terrorism plans. It has become the practice of many institutions to formulate an anti-terrorism plan that defines a number of threat levels. These plans are typically prepared by outside agencies or consulting firms based on individual knowledge and experience. Updating the plans based on changed circumstances requires the individual security specialists to be recalled, which is expensive and time consuming. Furthermore, the plans may not be appropriate for changing circumstances. By way of example, there may be great differences between a plan for high threat of terrorist activity on a military installation that was designed to protect mission-critical assets such as a weapons system and a plan for a high threat of terrorist activity on that same military installation when the high-threat condition is caused by a visit from a head of state or because of threatened attacks on troops rather than the weapons system. Furthermore, the source of the threat may also change its nature. A plan devised to stop a suicide car bomb attack favored by one known terrorist group may not be effective for a chemical attack favored by another terrorist group.

Changes to the plan may also become necessary because the site has expanded, or because of changes to the physical surroundings (e.g., new developments have been built in close proximity to a site previously surrounded by woods). Plan changes are also necessitated by the frequent changes to AT/FP doctrine, enunciated in sources such as DoD 2000.16, the Joint Service Integrated Vulnerability Assessment (JSIVA) Team standard operating procedures, and the J34 Installation AT/FP Planning Template, due to the evolving nature of the threat and lessons learned from previous attacks.

SUMMARY OF THE INVENTION

The aforementioned deficiencies have been overcome to a great extent by the present invention which provides an integrated risk management tool. The integrated risk management tool uses a persistent object database to store information about actors (individuals and/or groups), physical surroundings, historical events and other information. The risk management tool also includes a decision support system that uses data objects from the database and advanced decision theory techniques, such as Bayesian Networks, to infer the relative risk of an undesirable event. As part of the relative risk calculation, the tool uses a simulation and gaming environment in which artificially intelligent actors interact with the environment to determine susceptibility to the undesired event. Finally, the tool includes an open "plug-in" architecture that allows the tool to interface with existing consequence calculators. The tool also provides facilities for presenting data in a user-friendly manner as well as report generation facilities.

In preferred embodiments, the invention takes the form of a software program that may be run on a personal computer or workstation that allows users to evaluate the risk of a terrorist attack at their site, determine their vulnerability to a terrorist attack, assess the damage caused by a successful terrorist attack, and select countermeasures to prevent terrorist attacks. The program provides the user with importing, drawing and modeling tools to allow the user to quickly and easily build a model of the site of interest in both 2 and 3 dimensions. Once the site model is established, simulation is performed to generate information about threat scenarios. The simulation can be viewed by the user from whatever eye-point the user chooses. In the simulation, the user selects a weapons system and location for a terrorist attack, such as a car bomb at the rear of the building. The simulation constructs and analyzes possible routes that the terrorist may take to reach the location, taking into consideration the site model and all site-specific information such as the existence of roads, car barriers, guard stations, hills, etc. The simulation then selects the most probable route and calculates the likelihood of success, or accessability. The program will allow the user to modify the site model to add physical countermeasures (including hardening the target, denying access to the target, etc.) and re-run the simulation to determine the effectiveness of the countermeasures.

The system also provides an artificial intelligence risk assessment tool to help users manage risk. After the simulations have been run, the risk assessment tool determines relative risk based on the probability of an attack and the vulnerability of a site to an attack. Vulnerability is partially based on susceptibility, which in turn is partially based on the accessability as determined by the simulation described above; and partially based on a consequence calculation. The use in highly preferred embodiments of physical modeling and physics—based accessability calculations from the 3D simulation/gaming environment in the calculation of relative risk is seen as a particularly advantageous embodiment of the invention. In highly preferred embodiments, the risk assessment tool is implemented using a Bayesian influence network. The network is based upon input from experts in the anti-terrorism field.

The program can also provide damage assessments to the user under the user's control—in other words, the consequence calculation portion of the problem can be used independently of the risk management process as a whole. Provided with the program are two built-in analysis tools: 1) a first order blast-assessment tool; and 2) a first order downwind CBR hazard prediction tool. However, the program is built on a plug-in model. That is, the program is designed to interface with industry standard programs so that the standard programs will accept input from the invention and return the desired information (e.g., blast effects). In this manner, the program incorporates improvements to these programs as they occur without the need to update the program code. The user is allowed to specify a weapon system and delivery point, in response to which the system performs the damage calculations.

Preferred embodiments of the invention allow users to produce, view and print industry-standard reports as well as custom reports. Planners can develop AT/FP site plans in a standard J34 Installation AT/FP Planning Template format. Assessors can log observations and produce out-briefs and reports in JSIVA formats. Highly, preferred embodiments of the invention produce custom reports in JSIVA formats. More highly, preferred embodiments of the invention produce custom reports with detailed data on risk and other items.

Preferred embodiments of the invention provide a theater-level information management system (TIMS 130) that allows senior commanders to view information pertaining to multiple sites under their command. Access to the data is provided through a web-accessible browser interface. Preferred embodiments of the present invention also include an editing tool that allows modification of the database, the GUI 202, and the output of the system.

BRIEF DESCRIPTION OF THE DRAWINGS

The foregoing and other features and advantages of the invention will be more readily understood with reference to the following drawings in which:

FIG. 8 is a view of screens generated by the GUI.

FIG. 14 is a review of a Planner Interface screen format.

FIG. 16 is a review of the Risk Summary Table Screen.

FIG. 31 is a table of exemplary screen definitions.

DETAILED DESCRIPTION

The present invention will be discussed with reference to preferred embodiments of risk management programs. Specific details, such as graphical user interfaces, report formats, etc., are set forth in order to provide a thorough understanding of the present invention. The preferred embodiments discussed herein should not be understood to limit the invention.

Although the invention has many uses, it finds particular utility in the terrorism risk management arena. Thus, the invention will be discussed in connection with terrorism risk management embodiments. However, as will be discussed further below, the invention is useful in many fields and is not limited to terrorism risk management embodiments.

Figure 1:
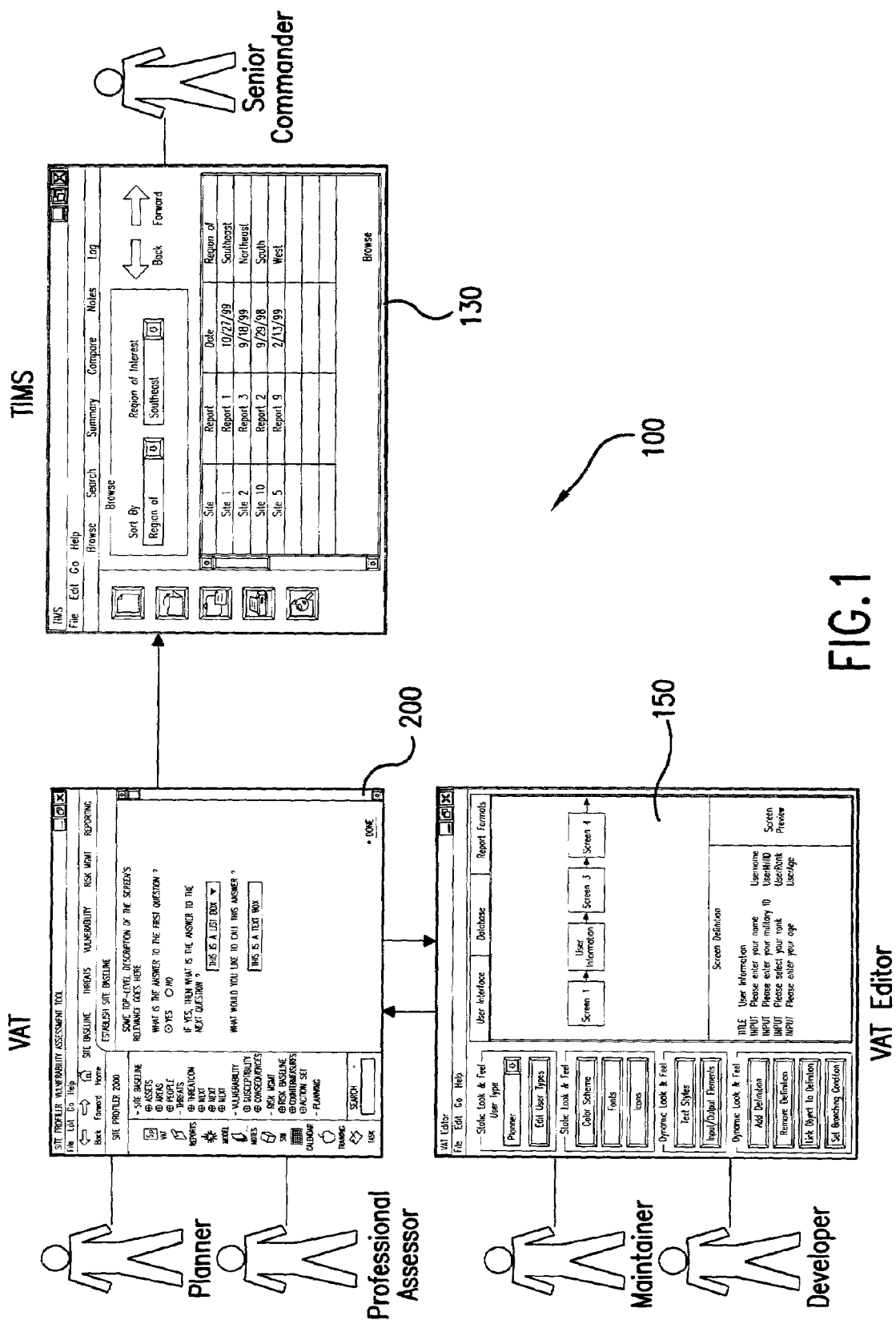
FIG. 1 is a schematic diagram of an automated vulnerability assessment tool comprising the VAT, the VAT Editor, and the TIMS, according to one embodiment of the present invention.

Referring now to FIG. 1, an automated vulnerability assessment tool (AVAT) 100 includes a vulnerability assessment tool (VAT) 200, a theater information management system (TIMS) 130, and a VAT Editor 150. In preferred embodiments, the tool may be run on a personal computer or workstation. Each of these component parts of the AVAT 100 will be discussed in further detail below.

The Vulnerability Assessment Tool

Figure 2:
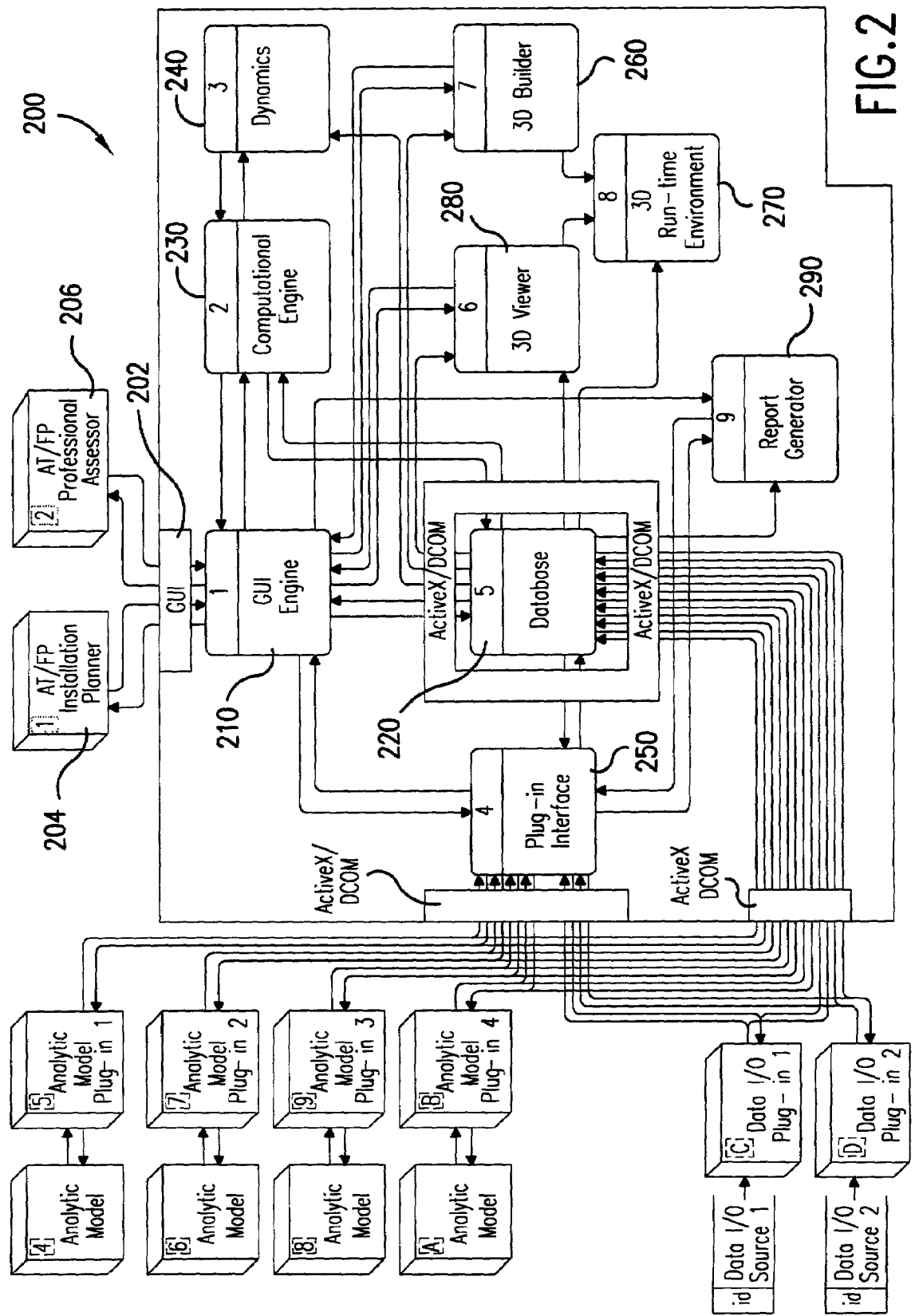
FIG. 2 is a block diagram of the architecture of the VAT of FIG. 1.

The VAT 200 presents a single interface to the user that accesses a powerful underlying architecture. This architecture, shown in FIG. 2, is a complex integration of modules that are collectively employed to meet the needs of the VAT 200 users. FIG. 2 shows the modules that comprise the VAT 200, the VAT's 200 external interfaces, and the relationships among the components. This complex architecture is better understood by a description of how the system is used.

Figure 3:
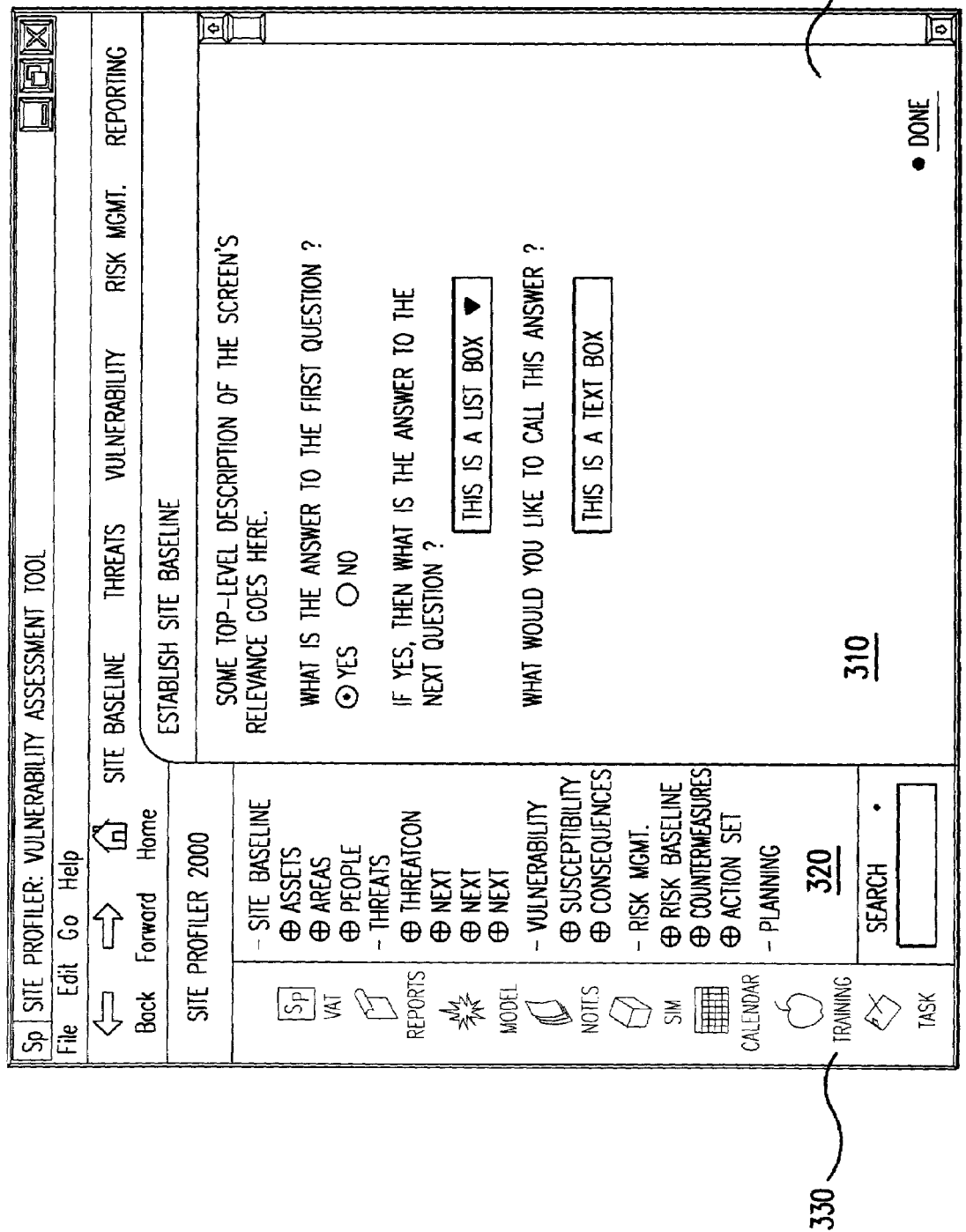
FIG. 3 is a view of a screen from a graphical user interface of the VAT according to a preferred embodiment of the invention.

Users must first interface with the system through a consistent and effective user interface. The users are not expert computer operators or technical experts, so the mode of communication must be straightforward and easily understood by the layman. The GUI 202 provides a web-like interface to the system with easy navigation references, screens that are simple and logically organized, and based on a dialog with the user rather than a form-based input. The VAT 200 User Interface exemplary screen 300 depicted in FIG. 3 illustrates what the user interface looks like as the user enters information. This screen 300 allows direct access at all times to the tools associated with the VAT 200 and provides a structured or non-linear progression through the data entry interview, depending on user choice.

The GUI Engine 210, shown in FIG. 2, (the term engine in a software context relates to a program that provides a specific capability, but is easily modifiable to support various implementations. A "GUI Engine" is simply a program to interact with the user graphically, without requiring scripted user interface screens. A Web browser is a good example of a GUI Engine 210—the browser displays any Hypertext Markup Language (HTML) document and its links without them being programmed in the browser) allows user interface content to be different for each user while the structure of the interface 202 remains the same. This allows the VAT 200 to communicate differently with Planners and Professional Assessors, or even among the Services. For example, the Planner interface 204 contains instruction, examples, and a more verbose dialog to elicit the same information that the Professional Assessor may be able to enter through a simple form provided by the Professional Assessor interface 206. This allows the user interface 202 to be individualized, ensuring that the data is entered and displayed correctly for all users, but efficiently and quickly for expert users.

Figure 4:
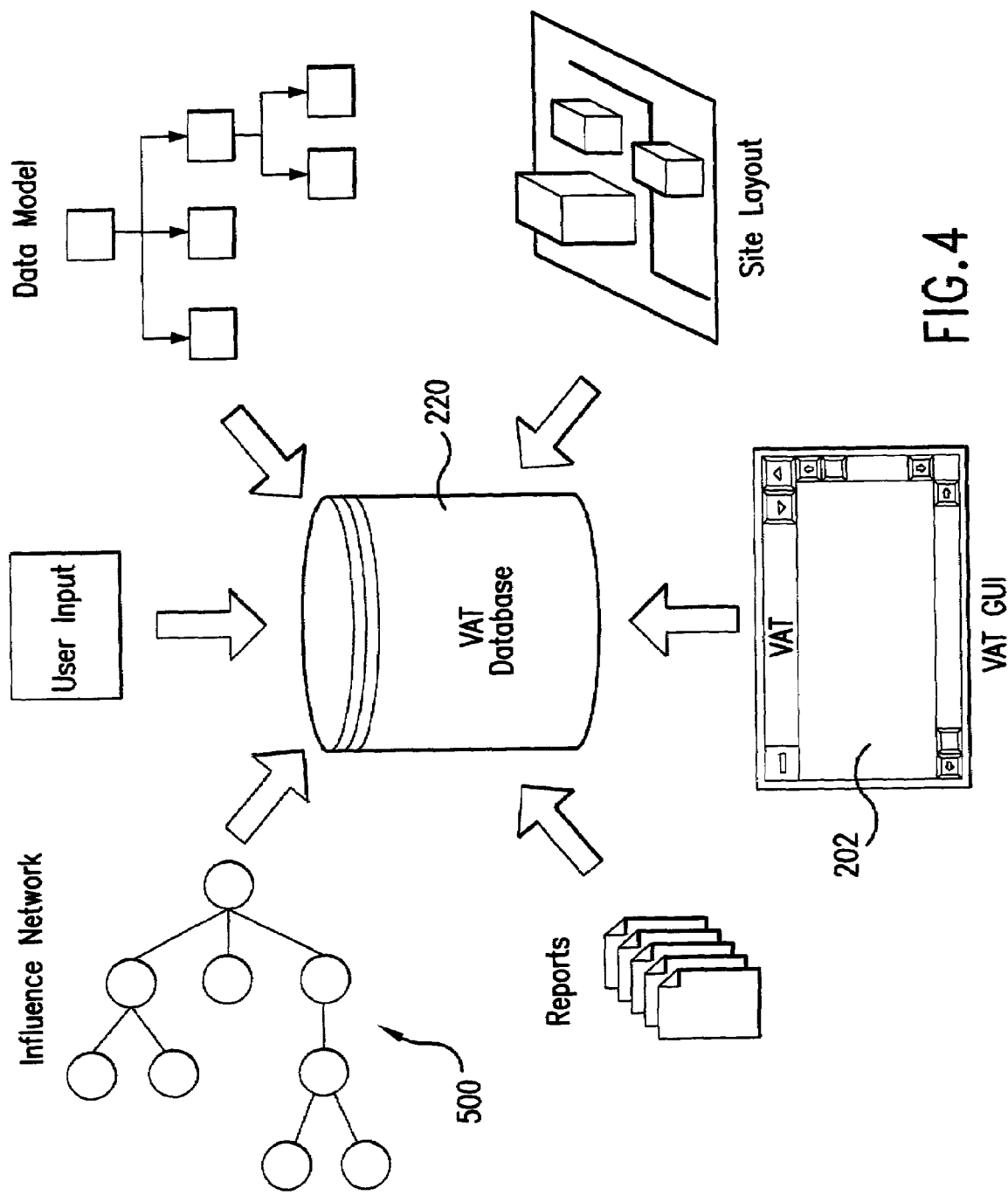
FIG. 4 is a symbolic diagram showing contents of the VAT database.

The GUI Engine 210 receives all of the screens, questions, and display data through the Database module 220. The Database module 220 is a relational database that contains all of the data used by the VAT 200, whether entered by the user, or calculated by the VAT 200, as shown in FIG. 4. Driving the GUI 202 from the Database module 220 allows the user interface 202 to be dynamic, customizable, and readily updateable without reprogramming the user interface 202.

Although the GUI's 202 first task is to elicit data from the user through the interview process, the primary objective of the GUI 202 is to interface with the underlying Computational Engine 230 module, shown in FIG. 2. The Computational Engine 230 combines user-entered data, along with data stored in the Database module 220, to calculate risk and all of its underlying components. The Computational Engine 230 uses elaborate artificial intelligence and simulation algorithms to analyze and assess the specific targets, threats, vulnerabilities, and ultimately, the risks at a user's site.

Figure 5:
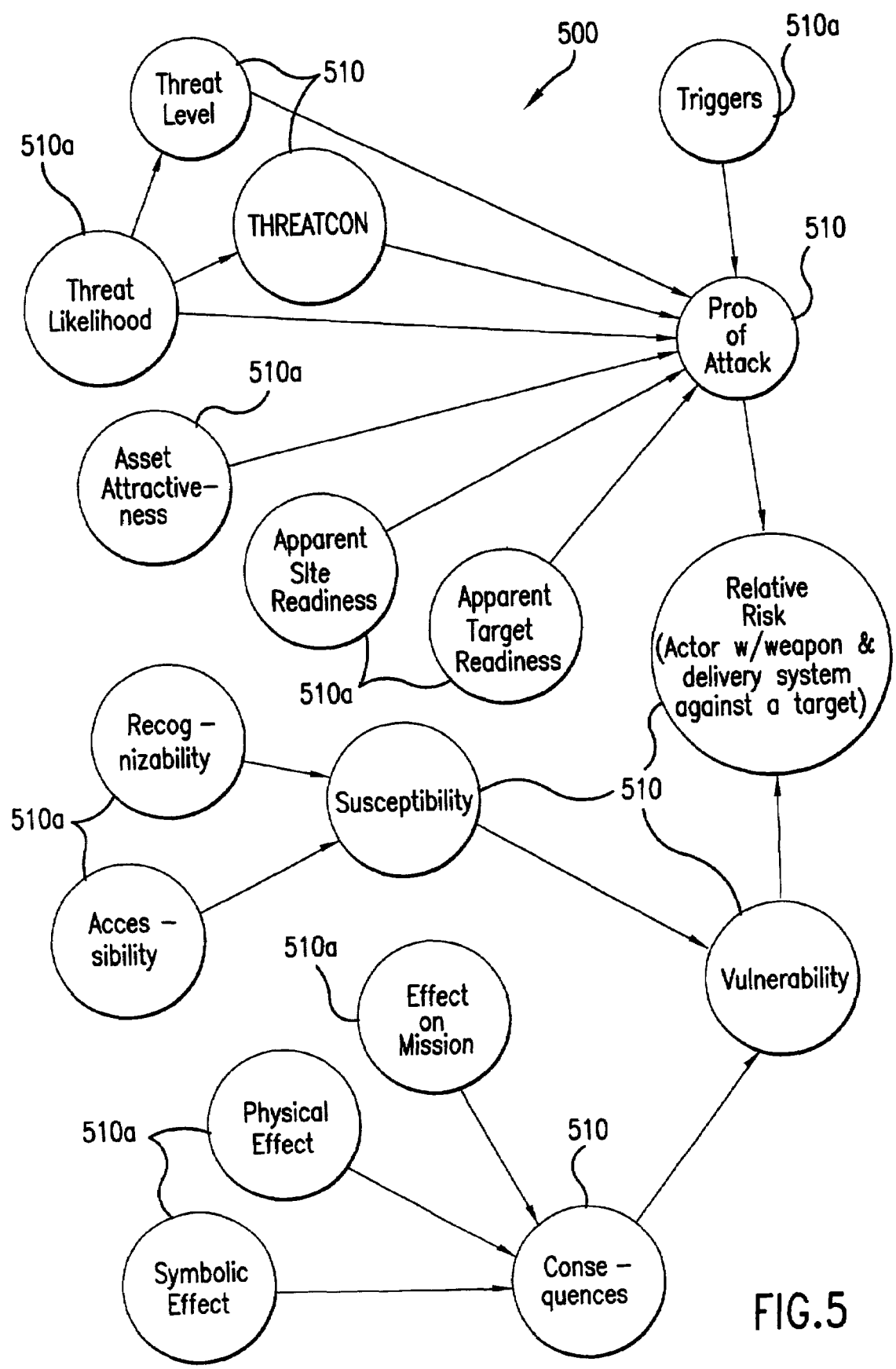
FIG. 5 is a diagram of a risk influence network according to a preferred embodiment of the invention.

The foundation for the Computational Engine 230 is the Influence Network 500 shown in FIG. 5. This network 500 shows all of the nodes 510, 510a that ultimately affect the risk of a given threat against a given target. The values for each of the nodes 510, 510a are combined using probability and statistics equations that account for the weighting of the various nodes and the uncertainty in their values. The network 500 also provides results without requiring all of the data to be known. Thus, if the user does not have information for the detailed leaf nodes 510a the network 500 can adapt and solve the network 500 based on higher level data.

The VAT 200 architecture allows nodes 510, 510a and sub-nodes (not shown in FIG. 5) of the network 500 to be 'turned-on' as new information is available. With additional information, the confidence in the results should increase. For example, the likelihood of an attack may not change as the user adds additional information at the leaf nodes 510a, but we can be more confident in the threat likelihood if it is backed up by supporting information. This flexibility allows users to gain quick insights into their risks and improve on their risk assessment as additional information is available.

This network 500 also provides a rigorous, quantitative calculation of risks. The network 500 provides an intuitive representation of the factors that the calculation considers. It can be read as, 'Leaf node X influences branch node Y, which, in turn, influences node Z'. The network 500 is capable of handling influences that cannot be quantitatively described. Thus, if one cannot be sure how much the anniversary of the Branch Davidian incident will affect the Probability of Attack (via the "Triggers" Leaf Node 510a), one can still include it in the network 500 calculation by simply stating that it may increase the probability. The implementation of the network 500 in the Computational Engine 230 also allows for the network 500 to be changed or modified without re-programming. Thus, if experts or events indicate that a new factor should be considered, it can be added to the risk network 500 by creating a new node object in the Database 220.

The network 500 provides an integrated representation of the factors that impact the specific risks at a site in a manner that can be understood by subject matter experts (to validate the model) and interpreted by the VAT 200 so that results can be displayed in a meaningful manner to VAT 200 users. The data used by the network 500, as well as the network 500 itself, can be modified and upgraded by modifying the database 220 without deriving a new equation or reprogramming the VAT 200 artificial intelligence (AI) algorithms.

Many of the inputs to the network 500 can come directly from the GUI 202. Other inputs are derived from databases or are provided from intermediate AI, simulation, or model calculations. Threat vectors, blast consequences and accessibility of a target are all examples of nodes that require additional complex calculations to be conducted. The Computational Engine 230 manages all of these calculations. When the calculation involves the physics-based interaction of objects (i.e., like driving a truck), the Dynamics module 240 (shown in FIG. 2) is used to calculate the forces, speed, acceleration, and other relevant physical parameters. When the calculation requires detailed modeling of weapons effects the Computational Engine 230 accesses external models through the Plug-in Interface 250 and uses the results of the model in the consequence nodes of the network 500. Each network node is stored in the Database module 220.

Figure 6:
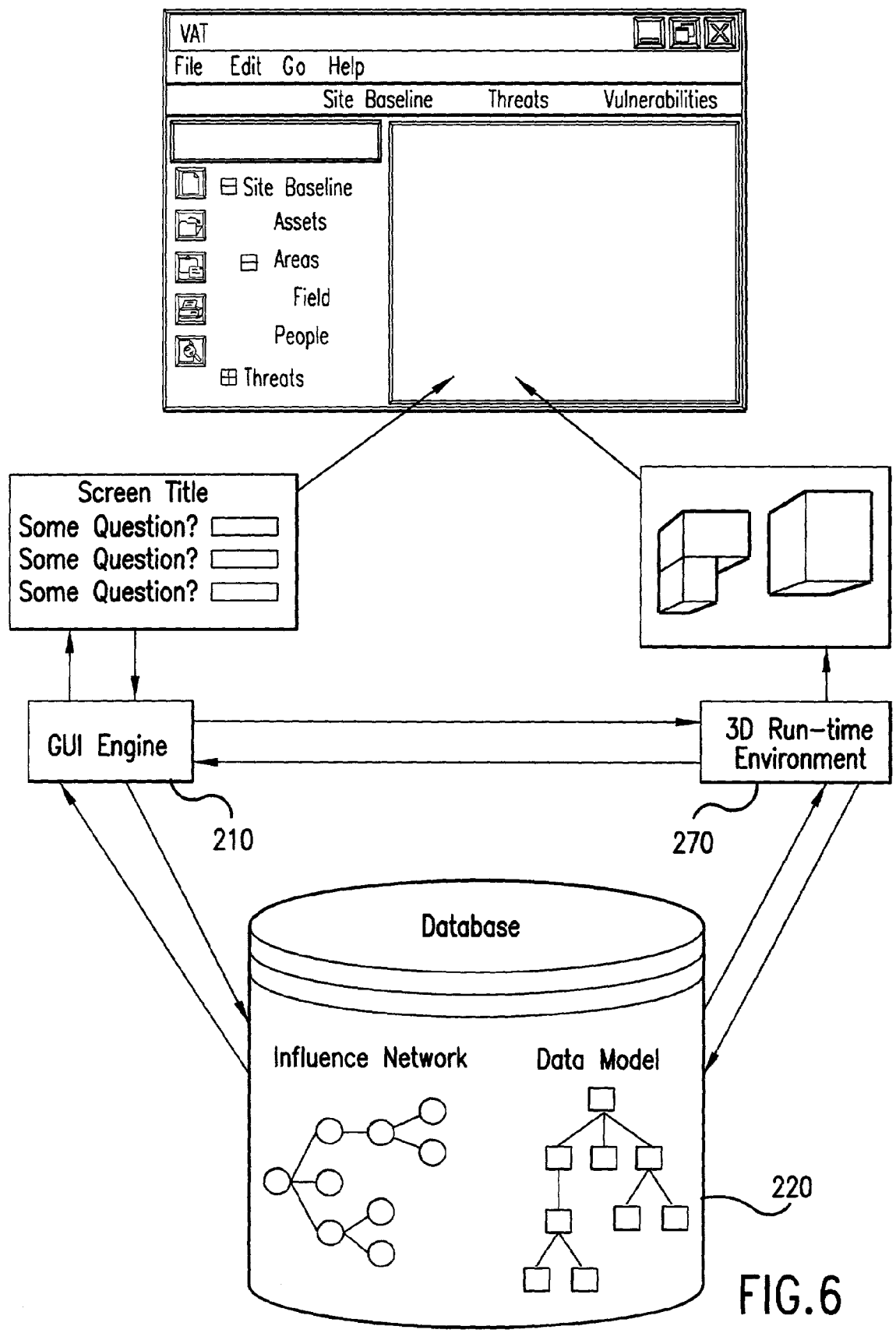
FIG. 6 is a symbolic diagram showing inputs to the VAT database.

Much of the data required by the Computational Engine 230 is spatial in nature. In order to analyze specific terrorist threats, the Computational Engine 230 relies on a 3D representation of the user's site. This site is developed using the 3D Builder module 260. Like the GUI Engine 210, the 3D Builder module 260 is driven by the Database module 220 and all of the information entered into the 3D Builder 260 is stored in the Database module 220. Thus, all of the interfaces in the software are tightly integrated with a single database, as shown in FIG. 6.

Figure 7:
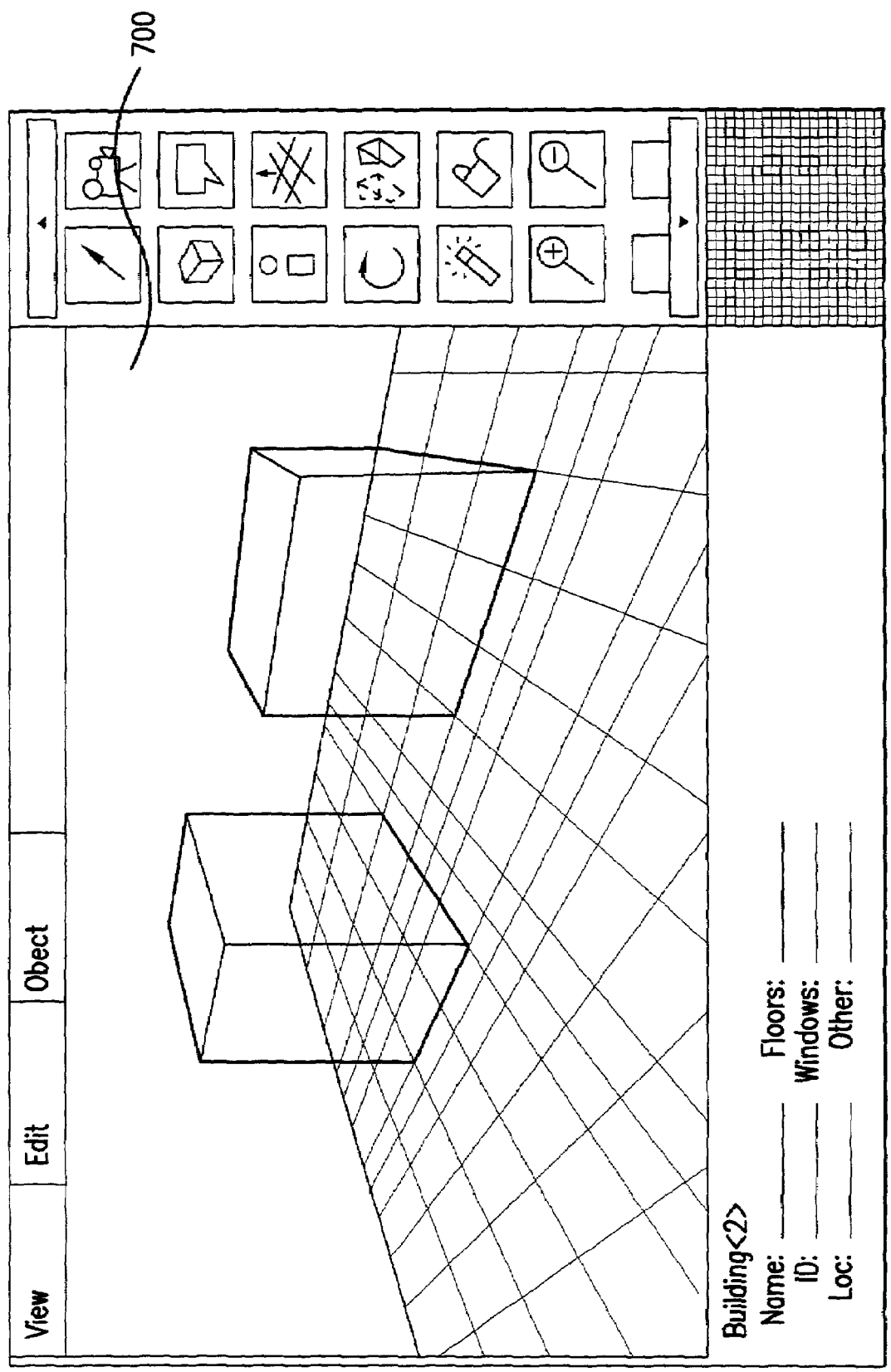
FIG. 7 is an exemplary illustration of a 3D builder screen.

The 3D Builder 260, a screen shot 700 of which is shown in FIG. 7, provides an interface for the user to build a 3D representation of his site. The 3D Builder 260 imports files from computer aided design (CAD) programs or images and uses them as the outline for the site layout. The user can then 'build' virtual representations of the buildings, roads, and perimeters of the site and identify population centers, VIPs, and countermeasures. This virtual representation of the site is stored in the Database module 220 and is used by the Computational Engine 230 to compute threat vectors and the accessibility of assets and by the Analytic Models to calculate weapon effects against targets.

The GUI 202 must also display complex risk, spatial, temporal, cost, and probabilistic data to the user in a useful and effective manner. Because the terrorist threat is often so vague and multi-dimensional, the information display must present simplified representations of the information and allow the user to interact with the information to see how the data is inter-related—what kinds of assets are most susceptible to a certain threat, which threats bear the highest consequences, and so on. Information from the risk influence network 500 and information in the Database module 220 can be interpreted and displayed in many combinations and representations. The GUI 202 provides sortable tables, text interpretations of data, 3D animations of scenarios, and graphs like the screens 801, 802, 803 shown in FIG. 8. The GUI 202 provides web-like capability to drill-down into any high level information presented by the GUI 202. For example, if the probability of attack for a given threat is described in the GUI 202 as 'high', the user will be able to click on 'high' and drill-down to the nodes that caused the value to be high (e.g., Organization X is active in your area, they have Y weapon capabilities, and Z holy day is a trigger for this threat).

Understanding risk and the inter-relationships among threat, critical assets, and vulnerabilities is essential to developing an AT/FP plan. The Computational Engine 230 interprets threat data and recommends countermeasures to the user that should be used to reduce the threat or the consequences of an attack. These countermeasures are not limited to hardening of assets (blast walls, FRF, etc.) but include countermeasures to:
  Deter the threat from acting,
  Deny access to the target,
  Detect the threat or event,
  Mitigate the consequences of an event,
  Interdict the threat, and
  Respond to the event.

The Database module 220 retains the relationships among these countermeasures and procedures and the threats that they counter to allow the user to develop a defensive posture. The 3D Builder 260 allows the user to specifically place countermeasures and optimize their placement to be most effective against the threat.

The VAT 200 allows the user to consider costs when employing countermeasures to manage risk. The VAT 200 does not provide a detailed cost modeling or cost benefit analysis capability; however, for classes of countermeasures the user may select, the VAT Database 220 is populated with 'initial cost' and 'recurring cost' parameters. The values for these parameters are defined as none, low, moderate, or high. The database also contains fields for the user to enter dollar costs for specific countermeasures, if desired. These costs can be printed in custom reports or viewed in risk summary tables to sort and rank risk mitigation strategies by cost.

Much of the risk data presented to the user is generated by the Computational Engine 230. However, when considering risk, one of the most important considerations is the consequence of a specific threat against a specific target. The results of a threat-target pair must be analyzed to determine the casualties and damage that would result from the event so that this data can be used in the risk network 500. Rather than developing a simple routine or a new weapons model, the VAT 200 uses existing blast and nuclear, chemical, biological, and radiological (NCBR) models to calculate the consequences used by the Computational Engine 230. In preferred embodiments, six models will be included with the VAT 200:

AT Planner from U.S. Army Corps of Engineers Waterways Experiment Station

FP Tool from Naval Surface Warfare Center, Dahlgren, Va.

Blast/FX™ from TRW, Inc.

Blast Card (Look-up table) from TSWG

HPAC from Defense Threat Reduction Agency (DTRA)

CBR Card (Look-up table) from Titan Corporation

Figure 9:
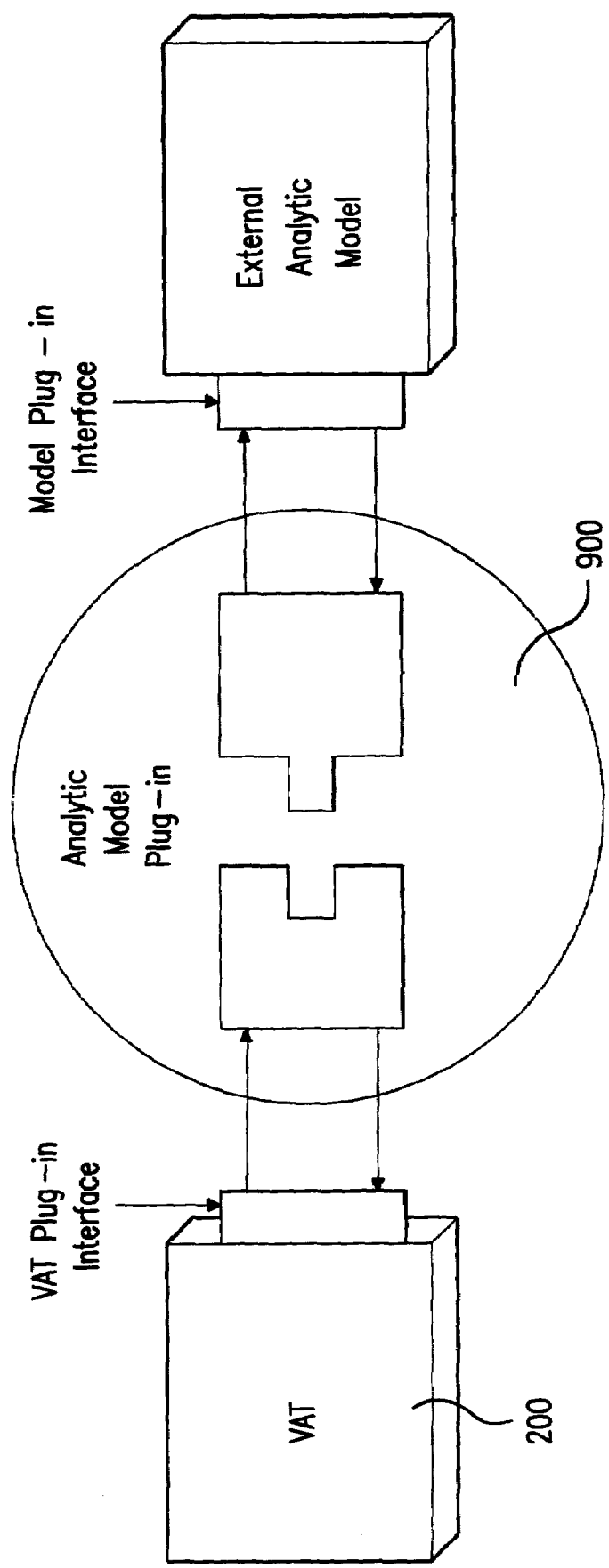
FIG. 9 is a symbolic view of the plug-in architecture.

The plug-in interface 250 provides a mechanism 900 (shown symbolically in FIG. 9) to send the model data from the VAT 200 that is needed to properly execute the model. The results of the model calculations are then sent back to the VAT 200 where they are interpreted and used by the risk network 500 and presented to the user. All of this happens without the user having to launch another program, learn how to use each of the external models, or enter the same information over again in another application.

The VAT 200 architecture allows other developers to interface to the VAT 200 and provide new models and capabilities that were not initially built in to the VAT 200. This flexible architecture ensures that the VAT 200 is not limited to yesterday's state-of-the-art, but rather, that it can be upgraded through plug-ins to take advantage of evolving models and data. Much like the model plug-ins, the data used by the decision network 500, the GUI 202 screens, and the database 220 itself can be modified by the VAT 200 support organization. Thus, as doctrine or the understanding of the terrorist threat improves, the VAT 200 can be readily modified to use this new information.

The VAT Database 220 can be exported from the system. This will not only allow for back-ups of the data, but also allows the Database 220 to be exchanged among users. This will allow Professional Assessors to import an installation's existing VAT Database 220 and use that as the starting point for their assessment—thereby eliminating the need to re-enter data.

Figure 10:
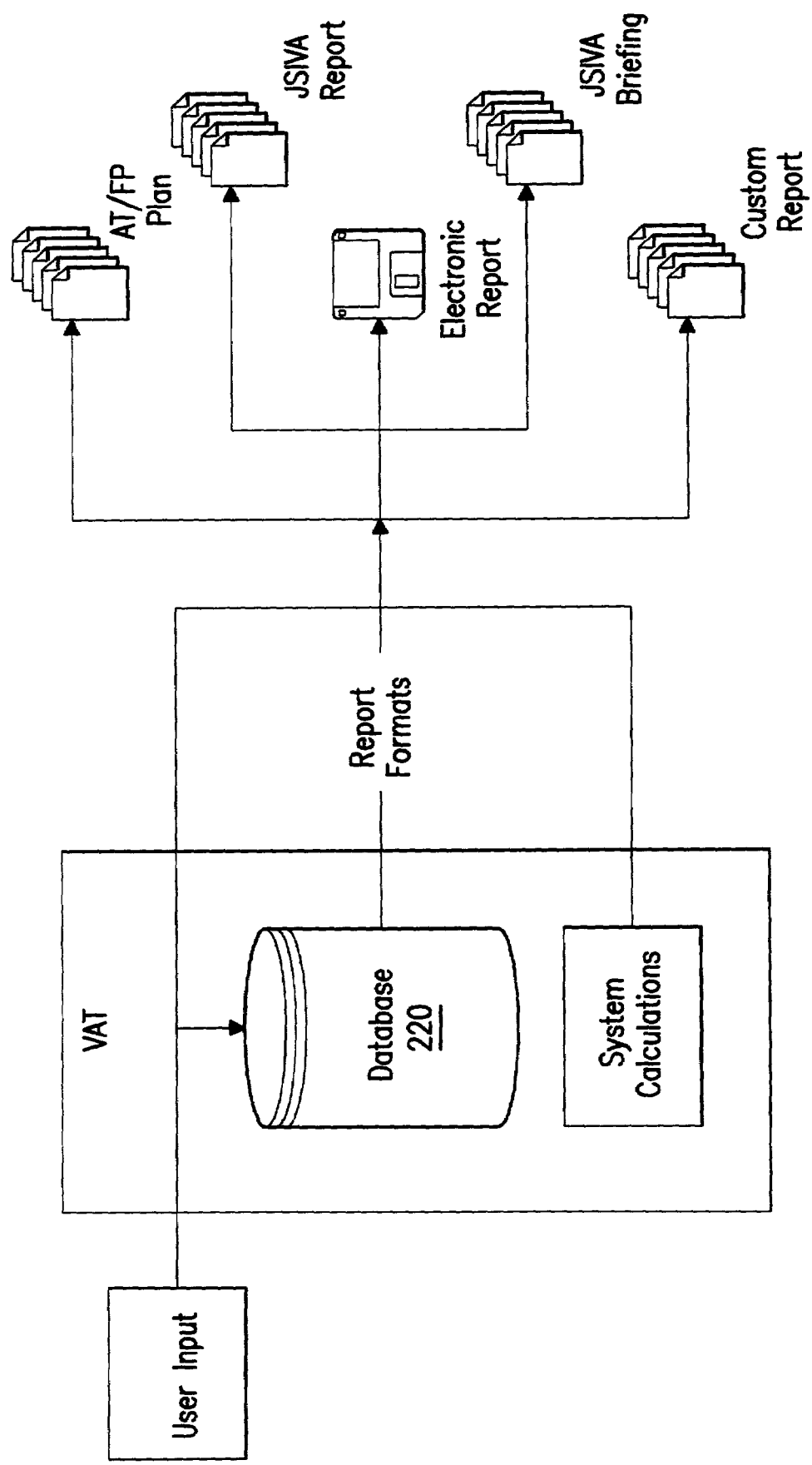
FIG. 10 is a symbolic view of the report generation process.

All of the data entered by the user and the information calculated by the system is stored in the Database module 220. This information is therefore available for export and dissemination to reports and other applications as shown in FIG. 10. The VAT 200 will provide, at a minimum, the report formats from the JSIVA Report and the AT/FP Installation Planning Template. Information from the VAT 200 will be used to populate these reports and the user will be able to finish the reports by writing the remaining required text. This document will then be saved to the database and will be available in Microsoft Word™ format for reproduction. The VAT 200 will also provide the flexibility for users to create custom reports or to save out and print VAT 200 risk assessment reports.

VAT 200 Editor

In order to make this modification possible, the AVAT 100 Suite design provides a flexible architecture of component modules and a suite of tools (referred to herein as the VAT Editor 150) that can be used to modify the system. These tools allow the VAT 200 support organization to modify the VAT 200 without having to rely on the system developer or wade through millions of lines of code. Since all of the components of the system are tightly integrated with the Database module 220, the VAT Editor 150 essentially provides a way to modify the existing database 220 to change the GUI 202, Computational Engine 230, report output, etc., a shown in FIG. 11.

Theater Information Management System (TIMS)

Figure 12:
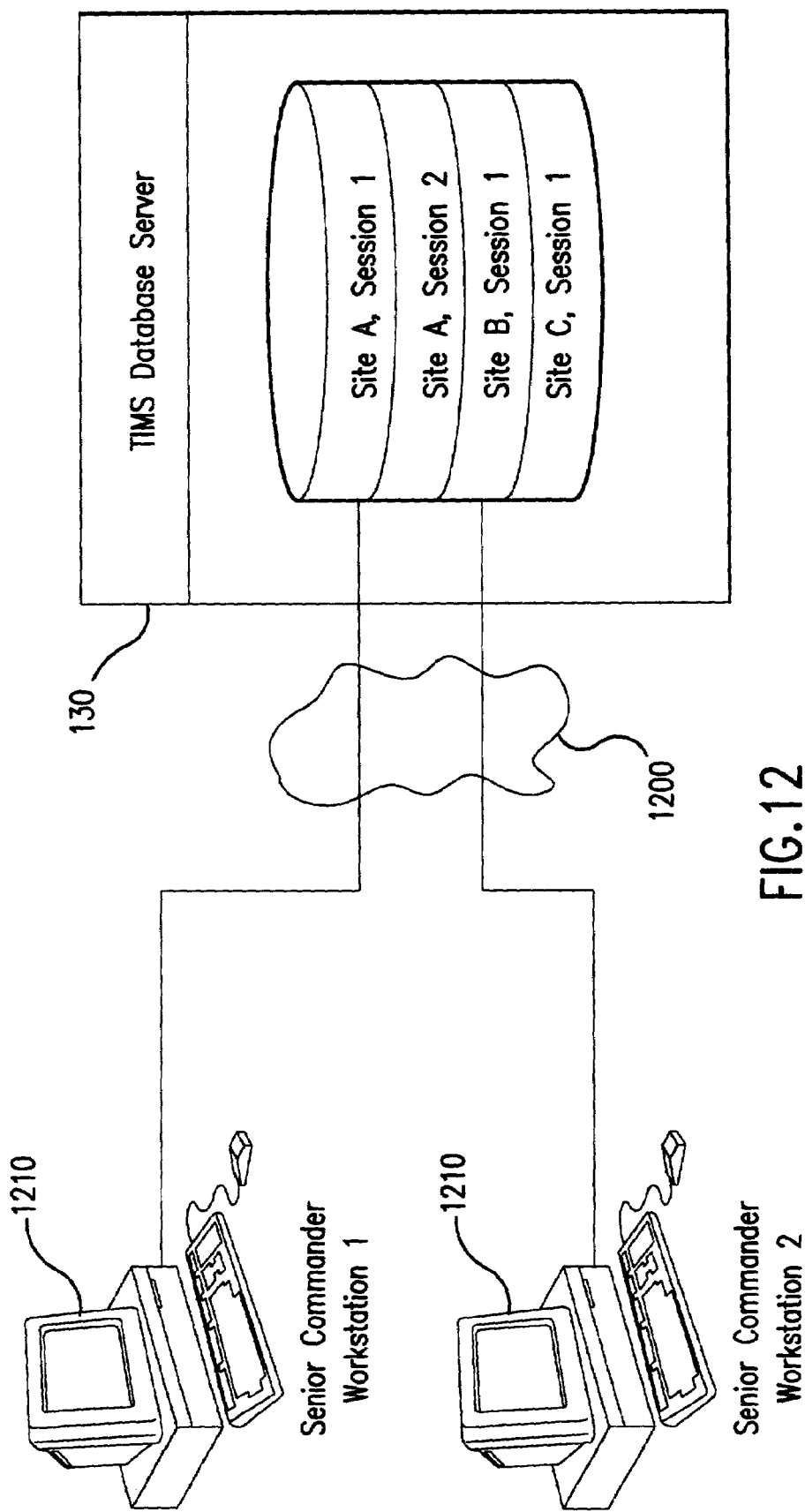
FIG. 12 is a block diagram showing connection of the TIMS to remote computers/terminals.

The VAT 200 information is also available to Senior Commanders via the TIMS 130 to compare among the sites within their area of responsibility (AOR). The TIMS 130 is a web-based application that allows Senior Commanders to view top-level threat, vulnerability, and risk data from multiple VAT databases 220. These databases are stored in the TIMS 130 database that can be located on any web network 1200. The Senior Commander will access this database through a web browser client on any connected computer 1210 as shown in FIG. 12. Data from the TIMS 130 can be compared, sorted, searched, and graphed. The TIMS 130 will be built using industry standard web technologies so that it can be integrated with other web applications.

Through the Plug-in Interface 250, the VAT 200 can also exchange data with other applications. This will allow the VAT 200 to import and export data to the JSIVA Information System (JIS) and other similar applications. This will ensure that users who have an investment in other applications will be able to effectively migrate to the VAT 200 and that users of all of the applications will be able to exchange data. While it may not be possible or desirable to provide an exchange mechanism for all of the data among the VAT 200 and other systems, the Plug-in Interface 250 will minimize the amount of re-entry of existing data.

AVAT 100 Suite Deployment

Figure 13A:
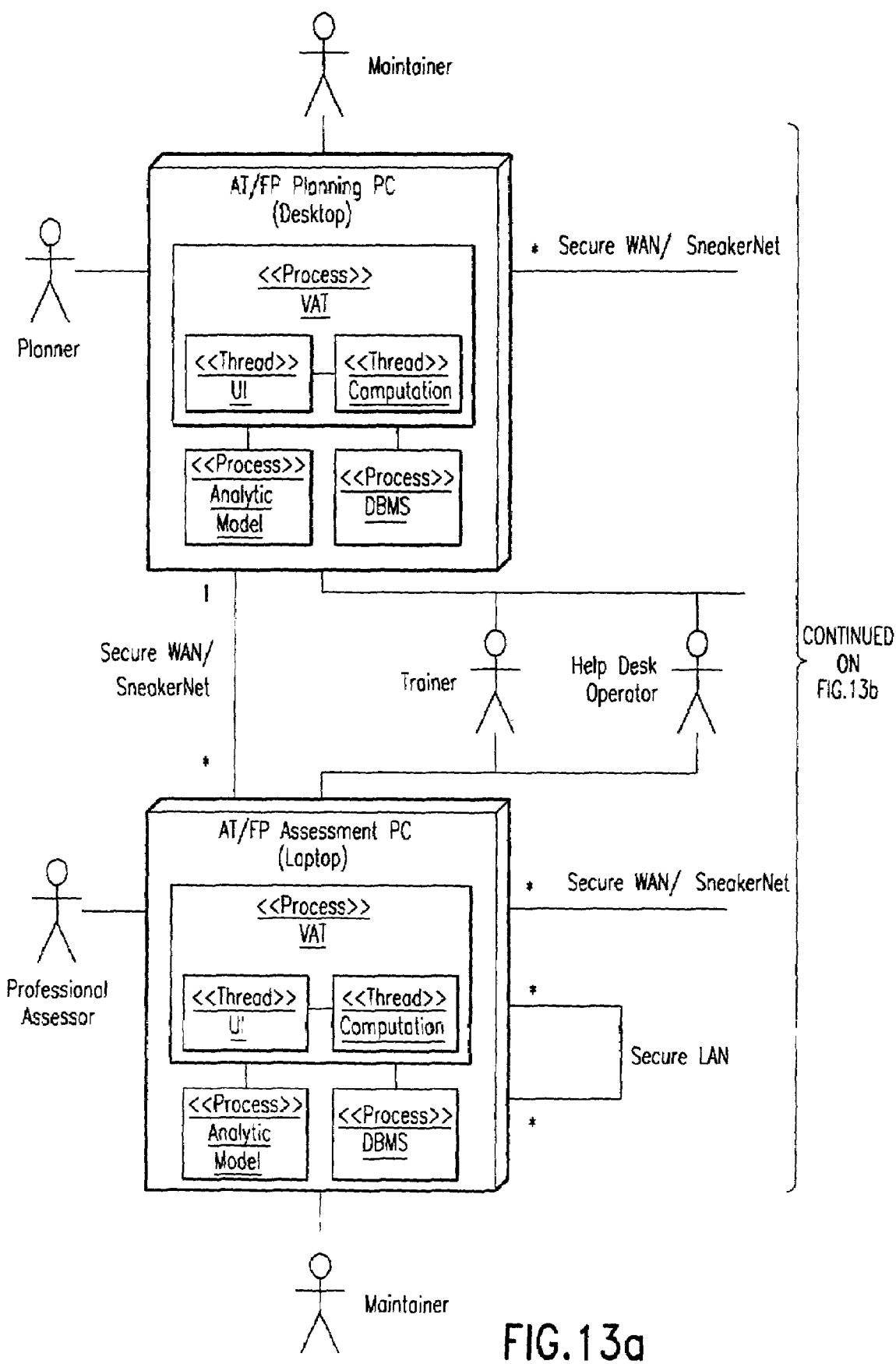
FIG. 13 a-b is a user/AVAT interconnection diagram.
Figure 13B:
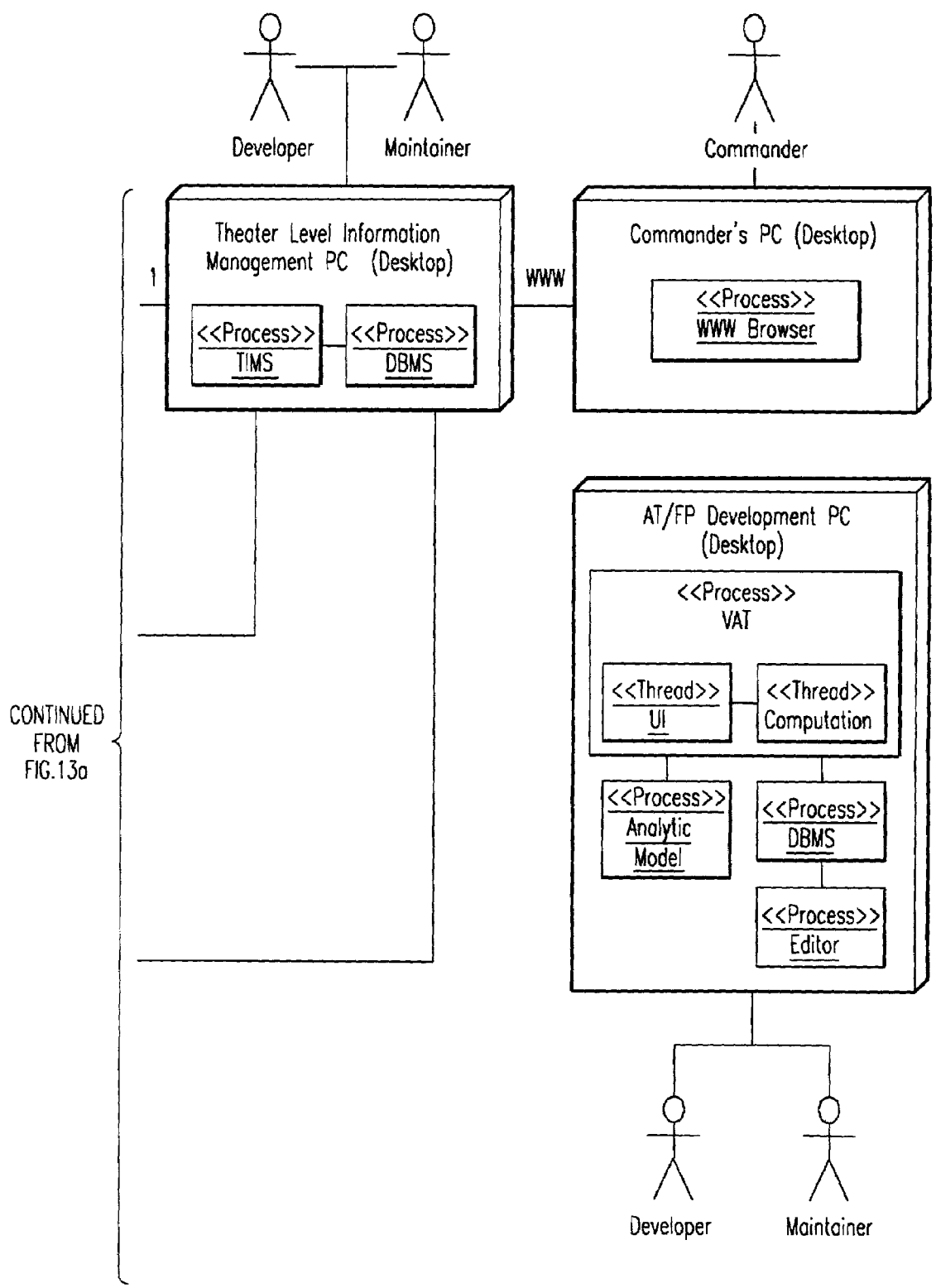

The VAT 200, TIMS 130, and the VAT Editor 150 may be deployed for, by way of non-limiting example, the identified users as shown in FIG. 13. FIG. 13 shows the typical configurations for each user and the interfaces among the users.

User Interface Design

A preferred embodiment of a VAT 200 interface design is illustrated in FIG. 3. This design provides a web-like interface. The main content 310 window displays the interview, calculated results, and the 3D scene to the user. The panel 320 to the left of the main content window 310 provides an outline view for context and to allow the user to navigate the application as he/she desires. The toolbox 330 on the far left of the screen 300 provides ready access to major components of the system including external analytic models, the simulation, and output reports.

Figure 15:
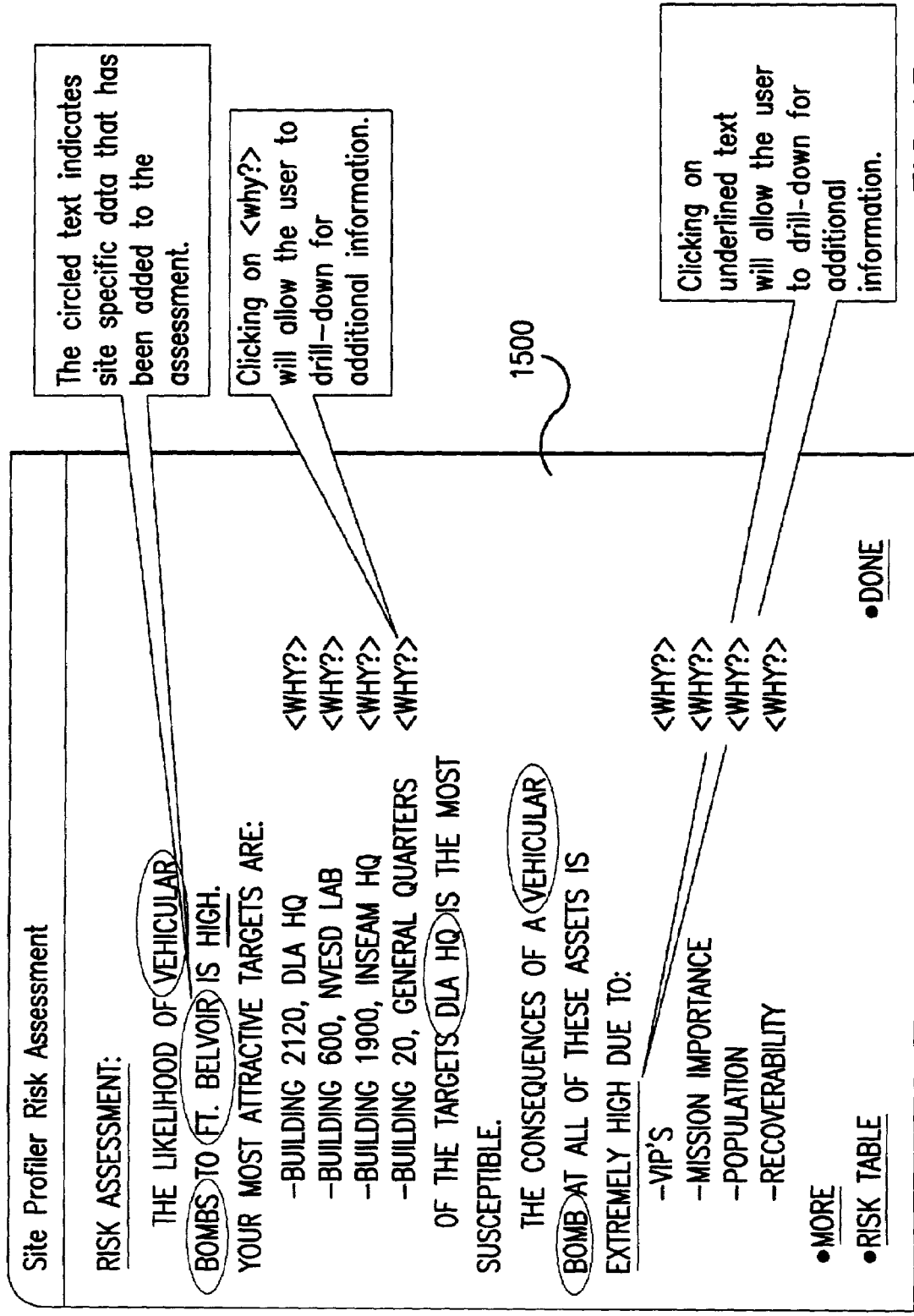
FIG. 15 is a review of the Risk Assessment Screen.

FIG. 14 and FIG. 15 are examples of the types of screens that appear in the main content window. The typical Planner Interface Screen 1400, as shown in FIG. 14, has large fonts, natural English, and establishes context for questions and information before they are presented.

The Risk Assessment Screen 1500, shown in FIG. 15, is a notional representation of an intelligent natural language representation of risk data provided by the Computational Engine 230. This screen 1500 can be customized for each site or user, uses natural English, and interprets the risk network 500 data like an expert would. This interface allows the user to click on words like "High" to see the underlying information that influenced that determination. This screen can be printed or used in custom output reports.

The Risk Summary Table 1600, shown in FIG. 16, provides a powerful mechanism for the user to interact with risk data and understand the risks to their site. Clicking on data within the table 1600 displays detailed supporting information. Selecting a row allows the user to see all of the details for that row or to view a simulation of the event represented by that row.

Figure 17:
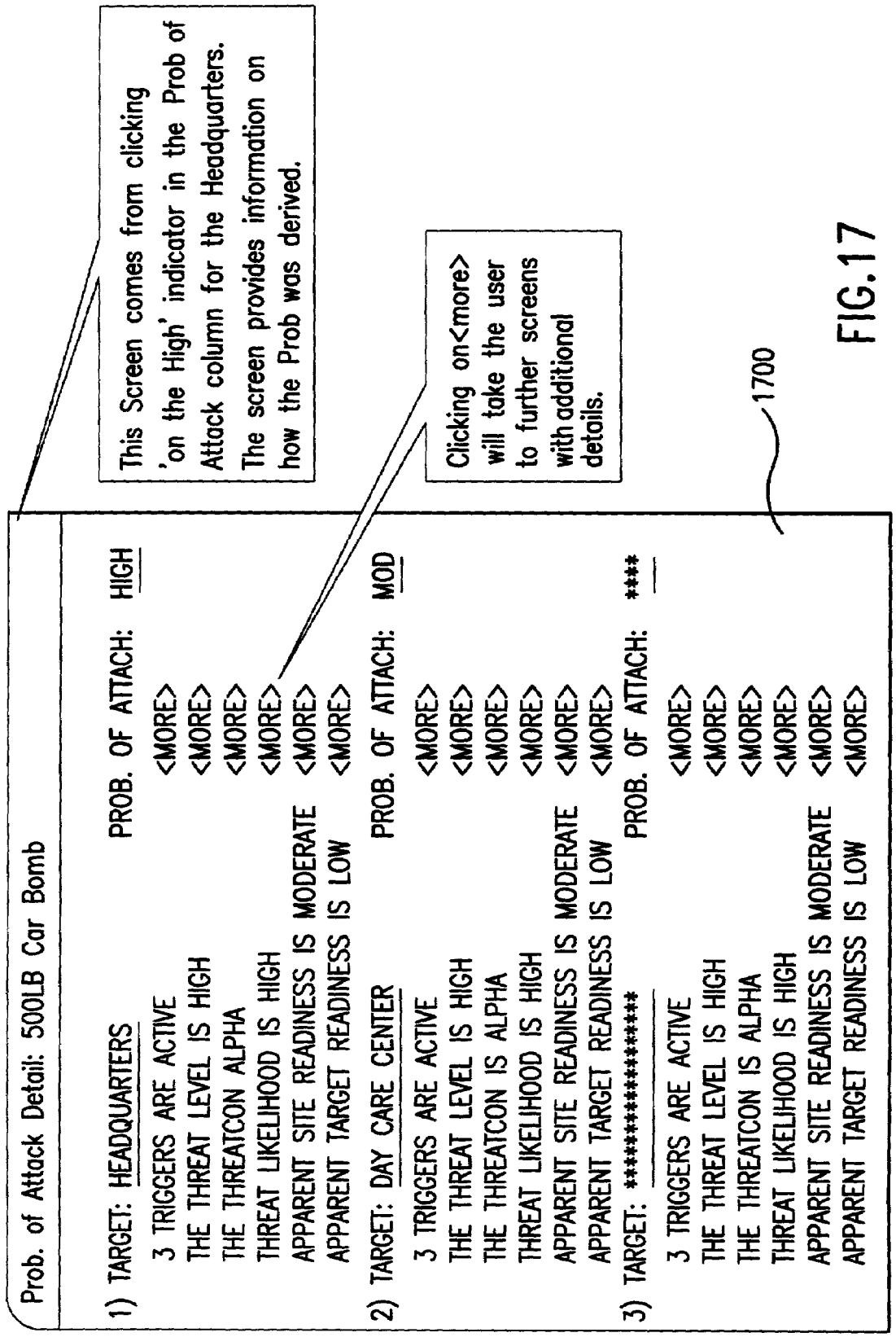
FIG. 17 is a review of the "Probability of Attack" Screen.

Clicking on one of the first three column headings from the Risk Summary Table 1600 makes that column the primary grouping function. This allows the user to see risks grouped by weapon, delivery system, and target. Clicking on any other column heading makes that column the secondary sort. Therefore, clicking on the "Targets" column heading 1610 and then clicking on the "Prob of Attack" column heading 1620 would group all of the risks by target and sort them according to their probability of attack as shown in the screen 1700 in FIG. 17.

Figure 18:
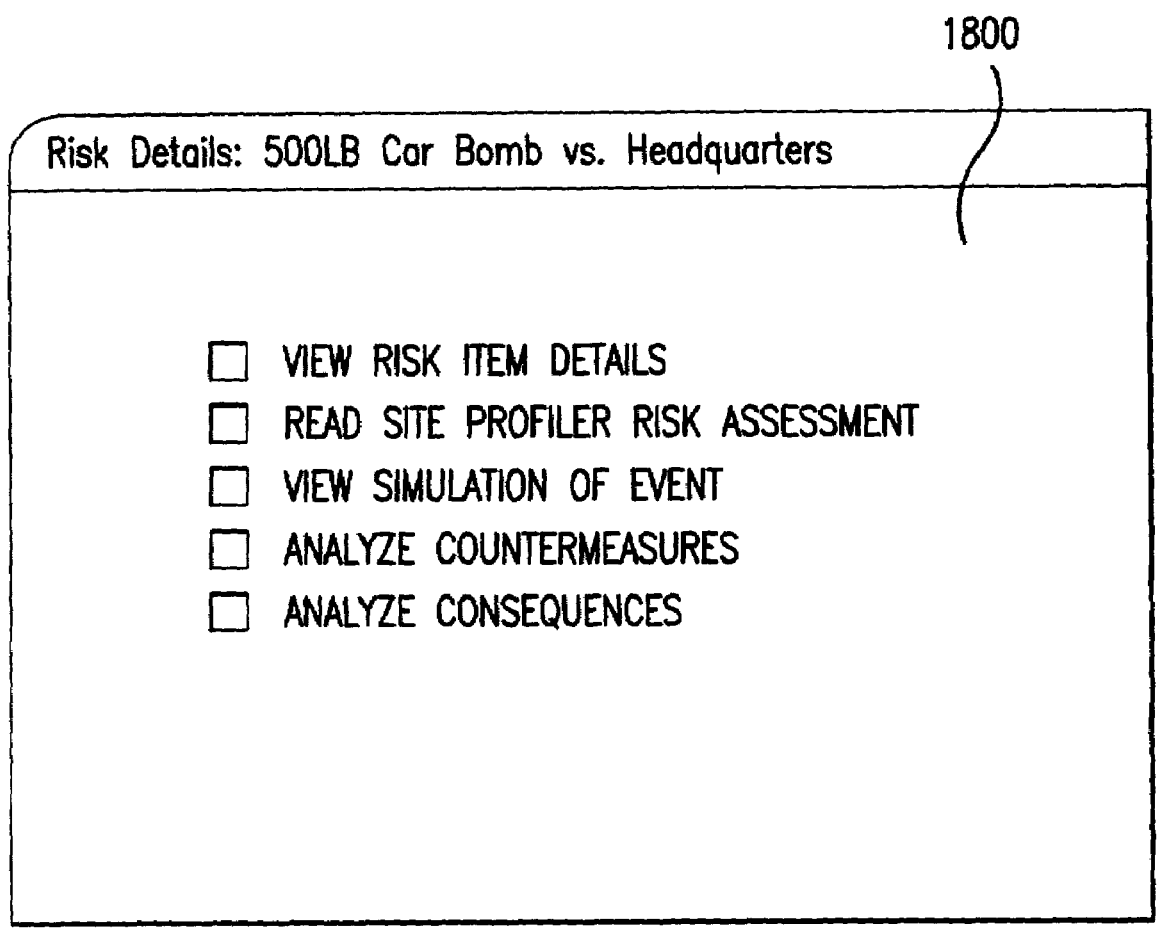
FIG. 18 is a review of the Risk Detail Screen.

The Risk Detail Screen 1800, as shown in FIG. 18, is accessed by clicking on the value of any of the calculations represented in the Risk Summary Table 1600. In this example, the user clicked "High" in the "Prob of Attack" column of the 500 pound car bomb against the Headquarters row. This screen shows all of the detailed information for 500 pound car bombs. The user can click on "more" for any of the statements that support the "High" assessment to see the information that they are based on. This data is derived from the Risk Influence Network 500. The Risk Detail Screen 1800 can also be accessed through the outline view.

After accessing the data in tabular form, the user can then view scenarios in a 3D simulation/gaming environment in order to gain more insight into the threat vector as played against his/her site layout and countermeasure setup.

Figure 19:
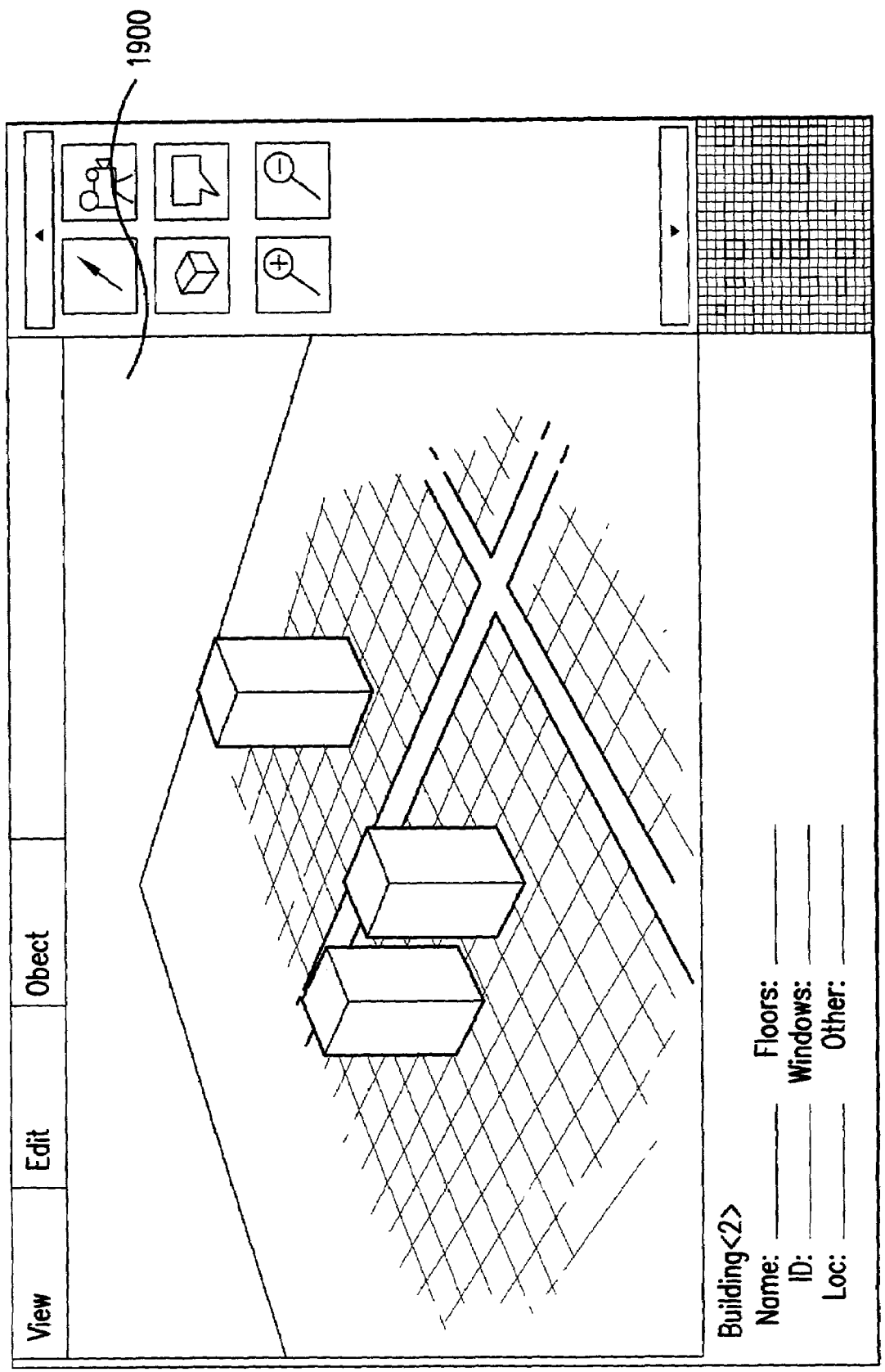
FIG. 19 is a view of the 3D Viewer Screen.
Figure 20A:
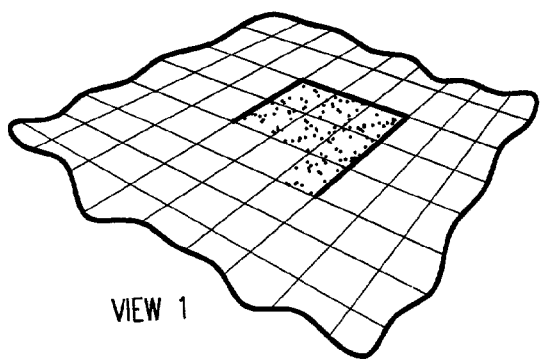
FIGS. 20 a-d are screen views illustrating the construction of a 3D object.
Figure 20B:
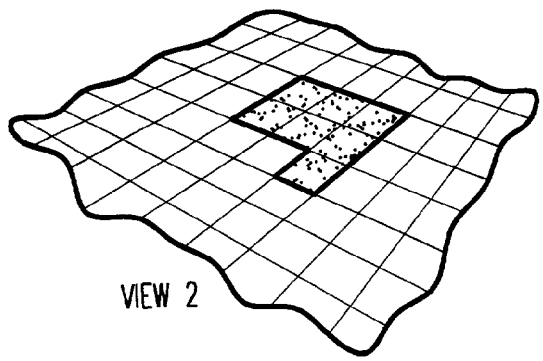
Figure 20C:
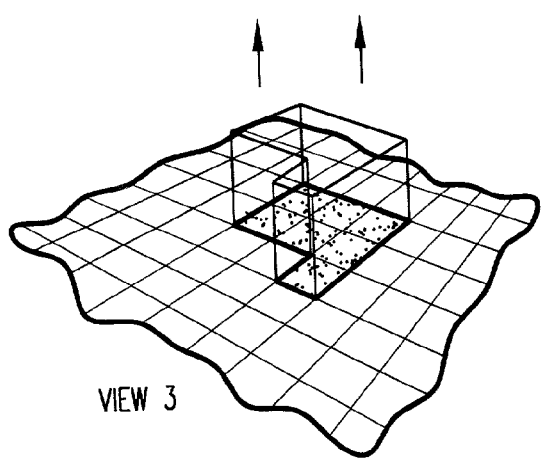
Figure 20D:
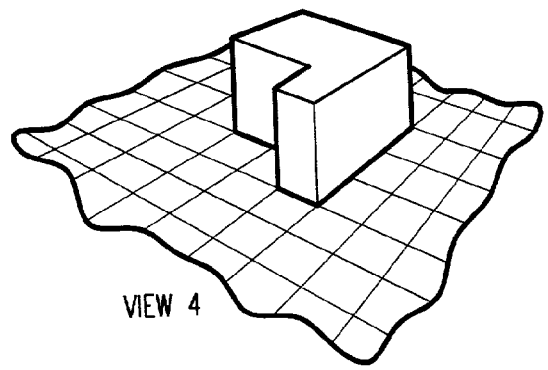

The 3D Viewer 280 allows the user of the VAT 200 to play various threat scenarios against his/her site. The site layout is read in from the database as constructed in the 3D Builder 260. The Computational Engine 230 is then invoked to calculate threat vectors, and the resulting data displayed on top of the layout in a three-dimensional view. The user is then able to select a vector based on delivery type, risk value, or other such factors, and play the threat against the site in a realistic manner so that the consequences can be viewed. After the threat vector has been played, the user can then switch to the 3D Builder 260 mode to add countermeasures, move countermeasures, or make other changes, and then run the simulations again as he/she builds up a site layout and plan. FIG. 19 displays a simplified example of a 3D Viewer Screen 1900.

The 3D Builder 260 allows the user to construct his base in the VAT 200 system for use with the various modules to calculate vulnerability and mitigate risk. The user is presented with a palette of standard 3D construction tools, camera movement options, and structure types to build. The countermeasure library and structure types are read in from the database, and the list is presented to the user so he can select a structure to build, maintaining the notion of a dynamic interface to the user based upon the information in the Database module 220. The user then uses the tool to build up the site on top of a base image of the layout (scanned-in map, perhaps) or use a base AutoCAD DXF file if applicable, to add countermeasures, and to define the site perimeter.

An exemplary interface to the 3D Builder module 260 of the VAT 200 is shown in FIG. 7. After all buildings and structures are placed on the map, the road network can be drawn in using line segments, and any bodies of water can be placed. If any structure requires additional information (such as number of people inside, etc.), the text area below the 3D view is used for text input that will be stored with the object. The user can then place any existing countermeasures such as cameras, guard posts, or jersey barriers for each THREATCON level to set the site baselines. The site is then saved out into the database when all structures and countermeasures are placed.

The process of building a structure is outlined in FIG. 20. From the scanned in image, or just the bare grid layout, the user selects, point by point, the outline of the base of the structure (View 1). The system then fills in the outline and creates a solid 2D polygon (View 2). The user is then able to pull up on this polygon with motion of the mouse to extrude the shape into the third dimension up to the required height (number of stories or exact height) (View 3), and the system displays a final rendered building with shading and textures applied (View 4). Building other structures follows a similar method, with differences based on scale/orientation of the object. Smaller objects, or objects that cover large areas are "painted" in using an object brush. For example, water is painted in as one would paint with a certain color in a standard 2D drawing program. Jersey barriers, for example, are placed one at a time; each "paint spot" showing up as one barrier. Once placed it can then be moved or rotated as desired.

Influence Network 500

The Influence Network 500, shown in FIG. 5, provides the VAT 200 with a knowledge base from which to determine risk. The network 500 is comprised of all of the nodes 510, 510a that ultimately affect the risk of a given threat against a given target. A node is defined as a piece of data used to influence other data in the network 500. Using probabilistic inference, the nodes 510, 510a in the network 500 are combined to calculate belief. This belief is interpreted as the probability of a certain result occurring, based on all of the data available to make a determination. This determination can be made using either complete or partial data. Thus, if the user does not enter data for all of the detailed leaf nodes 510a, the network 500 can adapt to solve the problem based on the data entered.

One of the more common techniques for representing probabilistic knowledge in a network 500 involves Bayesian networks. Using Bayesian techniques, the Influence Network 500 is made up on a series of nodes 520, 510a with connections between each other. A node can have parents (nodes that cause an effect) and children (nodes that are affected), but the network 500 can not contain cycles (circular paths among nodes). Nodes without parents are considered leaf nodes 510a, and are typically where evidence is added to evaluate the network 500. Each node 510, 510a is assigned a set of possible states, along with the probability of the state occurring. These probabilities reside in a structure called the conditional probability table, and represent the influences of prior beliefs on the decision. For leaf nodes 510a, there are no parents to affect the node's state, so the conditional probability table simply contains probabilities of the node occurring. These values are set by the evidence assigned from external data.

Children nodes have effects attributed to them from their parent nodes, so their probability tables are far more complex. For each possible combination of inputs from the node's parents, the table contains a probability of occurrence for each possible output of the node. As evidence is posted to the leaf nodes, the probabilities ripple throughout the network 500 as belief propagates. Evidence can also be posted to child nodes, and belief can then propagate backwards to its parents. This powerful feature allows belief to be refined in the network 500 at any level.

Initially, the conditional probability tables of all nodes in the network 500 are initialized to a default state, which is an expected bias in the answers. As evidence is posted to the network 500, these probabilities are refined and the network 500 produces answers in which we have more confidence. In this manner, partial data can be used to refine beliefs, with the initial probabilities responsible for "filling in the gaps" of missing data. Using advanced statistical techniques, the confidence of each probability can also be computed. This confidence is extremely beneficial for justification of answers. Because of the subjective nature of various data used by the system, defense of the system's results is vital.

Although the probabilistic inference of the network 500 requires complex mathematical operations, the structure of the network 500 is simple to represent. This presents flexibility in the VAT 200 design, allowing the network 500 to be configurable from the object database 220. With this technique, each node 510, 510a of the network 500 is aware of its parents, children, and where it receives its data. Using these "smart" nodes, the network 500 structure can be stored in the database 220 and manipulated externally by the VAT Editor 150.

By presenting the node structure to the user in an understandable manner, the user can modify the behavior of the Influence Network 500. This is extremely beneficial to the VAT 200, as data refinement is vital to the survivability of the tool. As data becomes available, decisions made by the network 500 can be modified to produce answers that are more accurate. In addition, if it becomes apparent that more data is necessary to produce an answer, nodes can be added to the network 500 to refine beliefs. These nodes can only derive their data from the GUI 202, but by adding the node to the network 500 and modifying the tables of all nodes that it affects, the network 500 behavior can be altered.

Data used by the network 500 comes from several different locations. Data entered by the user directly into the GUI 202, as well as data resulting from the database and from calculations made by the Computational Engine 230, the Dynamics module 240, and external models are all used by the network 500. By providing data from various sources, the decisions made by the influence network 500 are highly robust, dependent not only upon user knowledge, but also on statistics, simulation, and physics.

Because of the strong involvement between the Computational Engine 230 and the Influence Network 500, the Computational Engine 230 is responsible for constructing and maintaining the network 500. User inputs to the GUI 202 are posted directly to the network 500, but the Computational Engine 230 coordinates any other input, resulting from calculations or external models.

Vectors of Approach

The vectors of approach that are calculated by the VAT 200 determine the accessibility of a specific target to a specific threat (an actor with a weapon system). These vectors not only provide valuable data to the relative risk determination of the VAT 200, but when displayed graphically they provide a powerful tool for the user in understanding the vulnerabilities to their site. In order to compute the vectors of approach, a specific threat and target must be selected by the user. Using this data, the VAT 200 analyzes the threat and asset characteristics, the site layout, and the physical security measures to determine all possible approach vectors to the target.

Figure 21:
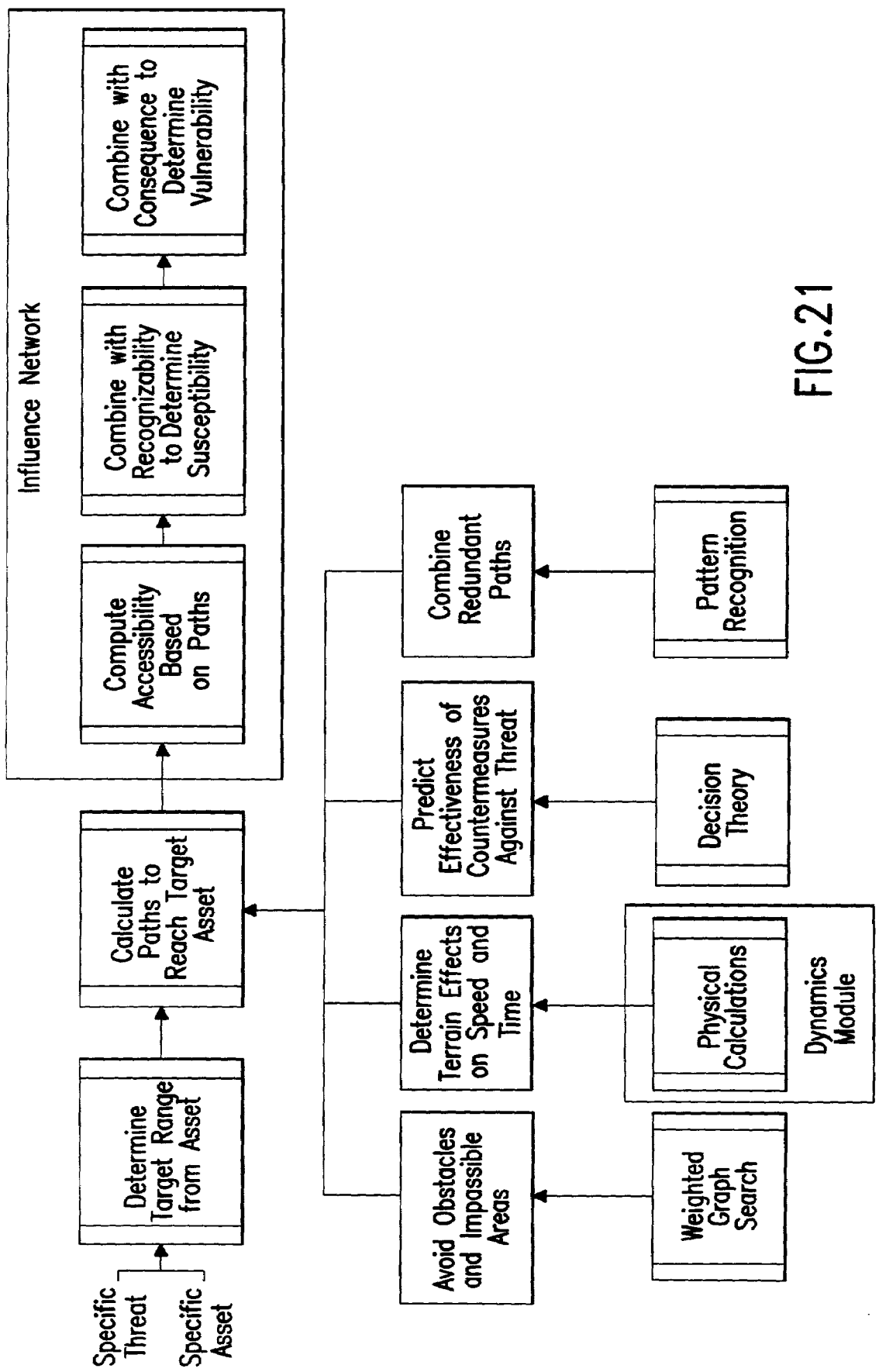
FIG. 21 is a block diagram of the Approach Vector Process.

The calculation of these approach vectors is a multi-step process that takes into consideration the terrain, the layout of the site, physical capabilities of the threat delivery system, and the reasoning process of the threat actor. FIG. 21 outlines the complete process for creating the approach vectors. The primary algorithmic techniques employed in creating these vectors are: a weighted graph search algorithm, first-order physics, decision theory, and pattern recognition.

Using the layout of the site and terrain, the weighted-graph search algorithm searches for a path between two points, avoiding obstacles and impassible areas. First-order physics are applied to ensure realism in the chosen path. Decision theory is applied to determine the reactions of the threat upon encountering countermeasures. Once all of the possible paths have been computed, a pattern recognition algorithm eliminates redundant vectors.

Risk Management

Risk management support is provided in the VAT 200 by allowing the user to modify the site baseline based on the determination of vulnerabilities to specific threats. Once the user builds the baseline, characterizes assets and determines specific threats, the VAT 200 walks him/her through a susceptibility determination and consequence analysis. Susceptibilities and consequences, coupled with the probability of a specific threat attack, make up the relative risk of a target against that threat. In order to perform risk management, the user must reduce the susceptibility of a target to an attack, the likely consequences of an attack, and/or the probability of the attack occurring. All of these can be reduced through the employment of countermeasures or asset relocation.

Figure 22:
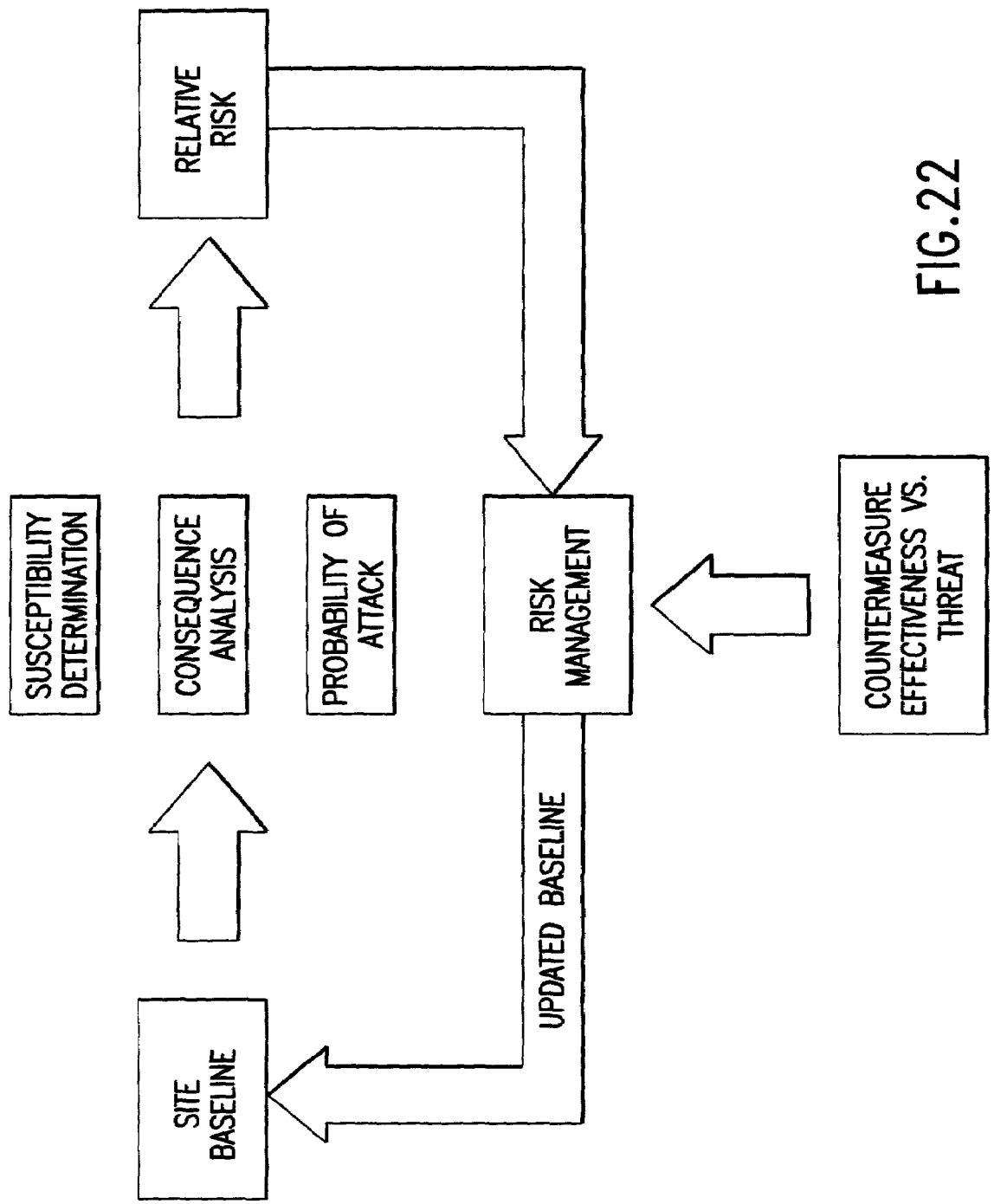
FIG. 22 is a flow diagram of the Risk Management Process.

FIG. 22 provides an overview of the risk management process. Based on the current site baseline and the vulnerabilities determined by the VAT 200, the user is presented with countermeasures to employ across their installation. By targeting the placement of these countermeasures against the specific vulnerabilities, the user can reduce risk. To assist in this process, the VAT 200 analyzes the threat and suggests countermeasures that can best reduce the components of risk associated with the threat. Comparing the effectiveness of the countermeasure against the threat accomplishes this. Countermeasures that are most effective against the threat are presented to the user, along with suggestions for successful employment. These countermeasures are not limited to hardening of assets (blast walls, Mylar on windows, etc.) but include countermeasures to:

Deter the threat from acting
Deny access to the target
Detect the threat or event
Mitigate the consequences of an event
Interdict the threat
Respond to the event As countermeasures are added and removed to affect the risk, the site baseline is ultimately modified. The new baseline is then used to produce updated susceptibility and consequence determinations. Other risk management options such as asset relocation will also be permitted. This cyclic process highlights the iterative nature of risk management and its application to planning.

The VAT 200 also allows the user to consider costs when managing risk. Preferred embodiments the VAT 200 do not provide a detailed cost modeling or cost benefit analysis capability; however, for classes of countermeasures the user may select, the VAT Database 220 is populated with 'initial cost' and 'recurring cost' parameters. The values for these parameters are defined as none, low, moderate, or high. The database also contains fields for the user to enter dollar costs for specific countermeasures, if desired. These costs can be printed in custom reports or viewed in risk summary tables to sort and rank risk mitigation strategies by cost.

Analytic Models

The VAT 200 uses analytic models to calculate the consequences of likely threat scenarios. The Influence Network 500 requires an assessment of the consequences of an event in order to calculate the overall risk. For preferred embodiments the VAT 200 potential consequences are simply damage to assets and human casualties. From these results, the risk network 500 calculates additional parameters such as the mission impact and the symbolic victory the terrorist may receive based on biasing values the user has entered for the affected assets.

The VAT 200 User Group selected the models that will be provided with the initial release of the VAT 200. The VAT Plug-in interface 250 is also capable of interfacing with other models via the Analytic Models Interface. Table A below lists the models that are supported by preferred embodiments of the VAT 200. Other models may also be supported.

TABLE A

Analytic Models

| Model | Sources |
| --- | --- |
| AT Planner | U.S. Army Engineers Waterways Experiment Station |
| FP Tool | Naval Surface Warfare Center, Dahigren, Virginia |
| Blast/FX ™ | TRW, Incorporation |
| Blast Card (Look-up Table) | TSWG |
| HPAC | DTRA |
| CBR Card (Look-up Table) | Titan Corporation |

A design goal is to make the interaction of the VAT 200 with external models appear transparent to the end user. To support that goal, the VAT 200 provides all of the set-up data required by the models in the correct format and interprets the damage and casualties calculated by the model. As a result, although the data required from the user by the VAT 200 may be simple, the interaction of the VAT 200 and external models is quite complex. This complexity is due to several important issues.

The VAT 200 and each of the analytic models represent the same features in different ways requiring complex data transformations.

The analytic models have limiting assumptions that the VAT 200 must track and present to users.

The VAT 200 must ultimately accept data from the analytic models. The VAT 200 software has no means to validate this data.

Compounding these issues is that the VAT 200 is written to accept data from models that calculate consequences for all kinds of weapons systems. The VAT 200 includes plug-in modules that allow interfacing to six models covering blast, chemical, biological, and radiological agent scenarios. However, third party developers may produce plug-ins that interface with other kinds of models in the future. Therefore, the VAT 200 must consider other kinds of models in its use of analytic models. The sections below describe the approach that the VAT 200 takes for each of the model interfaces present in preferred embodiments of the VAT 200.

Consequence Model Plug-Ins

Most plug-ins available in preferred embodiments of the VAT 200 pertain to casualty estimation and damage assessment. This ensemble falls naturally into two classes: those designed for estimating the consequences of blast and fragmenting weapons, and those which calculate the consequences of chemical, biological, or radiological weapons.

The ensemble of blast and fragment consequence calculators is diverse principally in the target dimension, the weapons themselves for the purposes of VAT 200 being substantially described by their net explosive weight and the presence or absence of efficient provisions for fragments. Targets, on the other hand, and particularly buildings, vary enormously in their sizes, shapes, construction details, the care in which they were constructed, their age, and their outfitting. In addition, surrounding buildings and natural terrain features can markedly intensify or diminish blast and fragment effects on a given building and on its occupants. The presence of buildings can shield people in the open from fragments, can channel weapon fragments at some people, and can contribute building fragments (especially but not exclusively glass fragments) to the injury-inducing or lethal objects flying through the air in the wake of an explosion.

In contrast to the blast and fragment family of weapon-target encounters, the CBR family is knit together by the dependence of all of them on wind-borne travel from release point to target. In the CBR family the variety is provided by the method of dispersal, meteorological/terrain effects, and by the varying quantities/qualities of the agents themselves.

Conceptual Data Flow Between VAT 200 and Blast and Fragment Analytic Models

Figure 23:
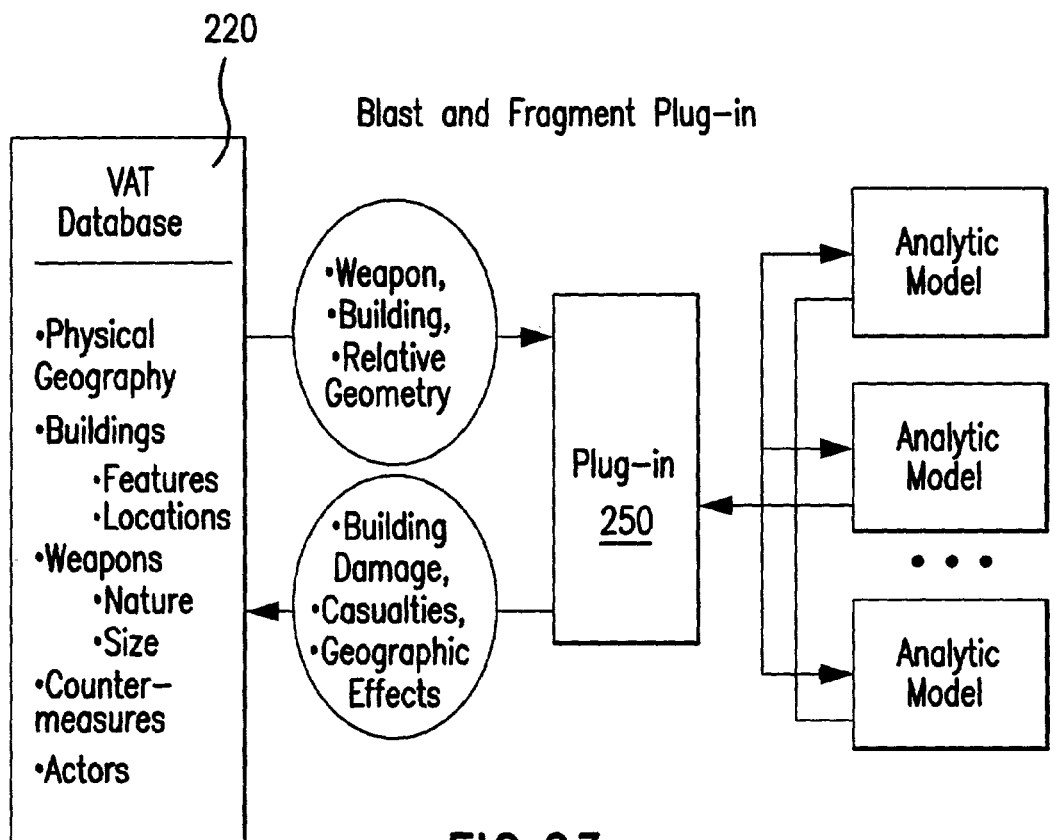
FIG. 23 is a data flow diagram of Blast and Fragment plug-in data flows.

As FIG. 23 illustrates, data is exchanged between Analytic Models and the VAT 200 through the Plug-in Interface module 250. Blast and fragment analytic models model one or several physical phenomena. These include air blast, fragmentation, structural response, and casualty or personnel hazard mechanics. All of the blast and fragment analytic models preferred embodiments address building damage in some fashion or another. In order to function they need three categories of inputs or assumptions. These categories are the characteristics of the weapon, the characteristics of the building being analyzed, and the geometric and geographic context for the weapon and the building.

A full real-world description of a weapon includes its net explosive weight, its shape, its containment vessel, boosters such as the presence of bottles of acetylene, and additional fragment generators that came with the weapon. Where the weapon is concealed, as in the case of explosives concealed in an automobile or in the sides and bottom of a suitcase, the distribution of the explosives can affect the shape and power of the explosion.

Buildings have a host of features relevant to the calculation of damage. The detail with which the VAT 200 user characterizes buildings may not match the detail for a given analytic model. One option is to group buildings into general classes (e.g. two-story, box-walled building). This general characterization could be provided to models equipped to expand that into a representative building. Alternatively, VAT 200 could do the expansion and send the representative building details to an analytic model. For either alternative there will be a reduction of predictive accuracy relative to providing actual details. A contrasting case for building construction is when the VAT 200 user provides greater detail than an analytic model is equipped to use. In addition, population within a building, may have multiple representations: the total population in the building, numbers of people in each bay of a building, or individuals' specific positions within the building. This discussion highlights the need for the VAT 200 Plug-in to provide the appropriate transformation of variables between potentially disparate data fields.

The geometric and geographic context for weapon-target pairs is also potentially much richer than some models are capable of processing. However, the user may not possess all of the information that a model could use to refine its predictions and where the missing information is required, either the analytic model or VAT 200 will make reasonable assumptions that will be clearly explained to the user.

VAT 200 expects the following output from blast and fragment models:

Structural damage;

a Casualty information; and

Information keyed to the geography showing the extent of the various effects of the explosion.

Conceptual Data Flow Between VAT 200 and CBR Analytic Models

Figure 24:
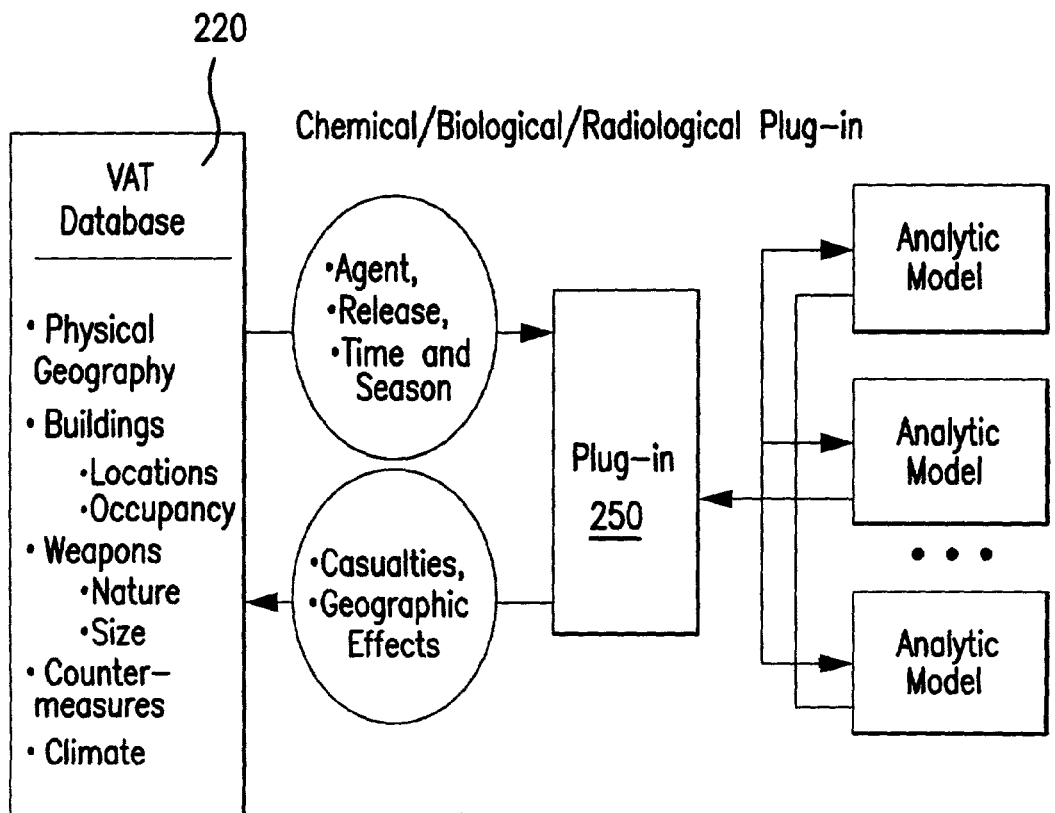
FIG. 24 is a data flow diagram of Chemical/Biological/Radiological plug-in data flows.

FIG. 24 illustrates the data flows for the chemical, biological and radiological (CBR) plug-in models. The atmosphere is the vehicle for dispersion of CBR agents after release. Atmospheric dilution, interaction with water or with other substances in the atmosphere, and in the case of biological pathogens, exposure to sunlight, all act to degrade the toxicity of one or another of these agents. CBR effects calculations require (in order of priority) agent release specifics, meteorological conditions, terrain, and time of day.

CBR substance release information includes agent type, amount, mechanism for release, and delivery mechanisms. The release mechanism describes how and how well an agent is aerosolized (e.g., explosive charge, spray, etc.) while delivery mechanism is the means of introducing the weapon system to the target (e.g. letter bomb, aircraft, etc.).

VAT 200 needs casualties and "damage" resulting from CBR attacks. Damage is partly the result of casualties, especially casualties to key and essential personnel, but it can also be the result of denial of use of facilities or an area and equipment until decontamination has been performed.

Casualty information can be provided several ways. One is simply a count of dead and incapacitated. An analytic model provides such numbers on the basis of that portion of supplied population databases which applies to the installation in question. A second method of expression is to provide geographically keyed data expressing the lethality density of the substance as a function of time. From the latter, VAT 200 is able to calculate its own casualty information taking into account building-by-building and area occupancy as a function of time of day. Even when the analytic model counts the casualties the geographic data is still useful for assessing secondary mission impact (i.e. "damage"). It should be noted that preferred embodiments of the VAT 200 do not model or use the details of the interior of buildings or related heating and ventilation systems so the effects on personnel inside of buildings from CBR releases will be approximated by a standard mitigation factor. However standard procedures relevant to minimizing the casualties inside of buildings from CBR releases (e.g. turn off air conditioning or ventilation system) are provided.

Top-Level Descriptions of Consequence Model Plug-Ins

Blast and Fragment Models

Bomb Card

General Description

TSWG's Bomb Card, analytically represented in VAT 200, provides ranges for building evacuation and ranges for withdrawal of people in the open. Both are indexed on a progression of common or likely terrorist explosive devices, ranging from 5 pound pipe bombs to 60,000 pound semi-trailer trucks. The building evacuation distances are purely a function of net explosive weight. The open air evacuation distances are a composite of predicted effects from case shrapnel, thrown vehicle fragments, and glass breakage.

Mechanics of Use

VAT 200 will supply only type of bomb and net explosive weight in TNT equivalent pounds to the Bomb Card model due to the simplicity of the Bomb Card "model" approach (i.e., a simple look-up table).

The Bomb Card does not use any geometric and geographic information beyond the XY coordinates of the burst—for example height of detonation and presence of blast walls or nearby reflective natural or artificial features are not taken into account. Most importantly, no account whatever is taken of the character or construction of buildings.

The Bomb Card will return information about building damage and potential for casualties to personnel in the open.

AT Planner

General Description

AT Planner, a product of the U.S. Army Engineer Waterways Experiment Station, was developed to aid engineers in evaluating Force Protection issues from terrorist and saboteur attack. In its native mode it is a GUI-based interactive tool. Features include the ability to make building retrofit recommendations and the ability to recommend barriers to stop vehicles of a specified size with a specified distance for acceleration. Three-dimensional views showing building damage are available in the GUI 202 version and it is possible to request standoff distance calculations for specified buildings, specified damage types such as roof/wall failure or glass breakage, and for weapons of a specified net explosive weight.

Mechanics of Use

AT Planner can use precise positions of persons outside of buildings, detailed window distribution information, treats building occupants only by calculating injury potentials in the interior bay by bay, and can incorporate the mitigating effects of blast walls close to the point of detonation. Threats are specified in net explosive weight of the equivalent TNT charge. However, detonations inside of building are not modeled and AT Planner does not use height of burst or weapon fragmentation data, and its ability to represent irregularly shaped buildings is limited.

AT Planner's products include casualty information for outside individuals, coded panel-by-panel damage information for buildings, and a three-dimensional representation of building damage. VAT 200 will use these data to determine detailed consequences for threat-target pairs.

Blast/FX™

General Description

Blast/FX™ was developed by TRW Inc. (formerly BDM Inc.) for the Federal Aviation Administration as a tool to model the effects of explosives against buildings and the people in them. Features include the ability to predict severity of injury to individuals at precise locations inside the building. Buildings may be described in substantial engineering and architectural detail and fragment characteristics of weapons are also modeled.

Weapons can be described by energetic chemical and net explosive weight (describing one in terms of the TNT equivalent net explosive weight is sufficient). Fragmenting capability can be inferred from the casing but also fragment sizes can be specified, so that the model can accommodate weapons with bundled shrapnel such as nails.

Mechanics of Use

Of the ensemble of plug-in information pertinent to the general blast and fragment consequence projection task, Blast/FX™ is alone among the VAT 200 analytic models in being able to take into account the specific locations of individuals within buildings.

Extensive building construction detail can also be used by Blast/FX™: beams, columns, floors, and walls can be described for multiple levels by dimension, by category of material, and in the case of reinforced concrete, by the rebar spacing. Windows can be described by size and glazing material. Instead of requiring this level of construction detail from users, the VAT 200 will provide representative construction details corresponding to the generic building class selected by the user since preferred embodiments of the VAT 200 do not include the modeling of the interior of buildings.

Blast/FX™'s products returned to VAT 200 include the mortality or severity of injury to each person included in the scenario, component by component damage information, and three-dimensional views of the blast area with damage and casualties color coded (plus associated data to support this visualization).

FP Tool

General Description

FP Tool is a product of the Naval Surface Warfare Center (NSWC), Dahlgren, Va. Unlike AT Planner and Blast/FX™, FP Tool uses the TNT Standard methodology instead of the Kingery-Bulmash algorithms for its calculations. NSWC chose the TNT Standard in order to increase the accuracy of the calculations, especially for reflected air blast and elevated burst situations. Of the three blast and fragment models interoperable with preferred embodiments of the VAT 200, only FP Tool takes height of burst into account. The FP Tool also precisely models air blast-pressure decay but even with FP Tool the prediction is apt to be conservative.

Explosions internal to buildings may be modeled in the FP Tool. Exterior wall panel damage is predicted while interior walls are ignored in the calculation of this damage. The current release uses eardrum damage and fragment-skin penetration as metrics for air blast personnel casualty. The travel and consequences of fragments of the buildings themselves are not modeled in the current release of FP Tool: only casing fragments are considered. Fragment trajectories are calculated both for bursts outside and for bursts inside of buildings. When a fragment reaches an impediment, penetration is calculated on the basis of the fragment and the construction of the impediment. Casualties to people from fragments are calculated on the basis of probability of hit for personnel in hazard volumes rather than on the basis of precise positions of occupants. FP Tool also calculates probabilities of equipment destruction from fragments.

Mechanics of Use

Of the ensemble of plug-in information pertinent to the general blast and fragment consequence projection task, the FP Tool can use weapon size, three-dimensional burst position information; multiple buildings; and barrier information. Building generic type, percentage of glass, and population density are usable but more extensive construction details are not. Equipment type and fragility can be used, if provided.

Results passed from FP Tool to VAT 200 include air blast information, building collapse information, building fragment information, building damage information, equipment casualty information, and personnel casualty information.

Chemical/Biological/Radiological (CBR) Models

CBR Card

General Description

The CBR Card provides a quick look assessment for casualties related to the use of CBR agent releases. The purpose of this application is to provide a range of probable consequences from typical CBR attacks. The Card provides actual "Lethal Dosage 50" ($L/D_{50}$) values for a given release. $L/D_{50}$ is the dose for which 50% of the affected population is likely to die from the given exposure. It should be noted that the casualties will take place over a variable time frame depending on the agent: chemical agents act very quickly (within minutes to hours) while biological and radiological may take days to weeks to kill. However, the dosage calculation will be determined assuming that the personnel in the area remain there for 30 minutes after the release. The CBR Card is meant to provide a rough estimate of the consequence from a CBR attack and also to provide insight into crucial aspects of CBR releases. While the Bomb Card focused on standoff as the primary countermeasure to blast, the CBR Card will show the relative importance of time and situational awareness as critical weapons against CBR agent releases. Time is critical since if personnel can don a gas mask immediately upon being notified of a release then the hazard from CB releases is fairly minimal. Similarly, for radiological agents, limiting time exposed to the agent is the only way to prevent casualties for unprotected personnel.

The primary factors considered in developing the data to create the CBR Card are:

a source,
release mechanism,
amount of agent,
delivery mechanism, and
meteorological conditions.

The CBR Card permits several chemical agents to be selected: chlorine, VX, and GB. These three were selected because they span the likely threats in four relevant dimensions: availability, persistence, lethality, and history of use.

Chlorine is a representative industrial chemical agent meeting the test of easy availability. It is a toxic industrial material that has been discussed as a terrorist threat for years. It is lethal, its dense gas characteristics enable a cloud to linger in the absence of wind, and it is readily available. Moreover large tanker trucks are not uncommon, so inconspicuous delivery is plausible. Because of its likely packaging as a tanker truck the likely scenario is for a large amount of chlorine (tens of thousands of kilograms) to be released by a small explosive rupturing the tanker near the target.

The other two characteristics important to chemical weapons are relative lethality in small doses and persistence. No one chemical agent is best at both, so VX is included in the CBR card to represent the persistent chemical agents and GB Sarin is included to represent the agents of highest lethality.

The two conditions of midnight release and noontime release were selected to show the disparity between the dispersion and the degradation of CBR releases under differing meteorological conditions. Midnight release means no turbulence and no wind. The resulting transport and dispersion occurs because of a physical phenomena called meander which is the random fluctuation of wind azimuth coupled with random variations of a small wind speed. (That is to say, it really is not physically possible to have absolute calm conditions.) Meander creates a slow moving erratic cloud that may eventually cover a large area. The noontime release conditions provide a turbulent atmosphere with a four-knot wind. This condition provides a situation where the initial release will quickly produce a fairly directional plume of ground effects. The wind speed of four knots was selected to provide a reasonable ground footprint over minutes to hours without diluting the release too quickly.

Unless there is a continual release, turbulence, and exposure to water vapor will cause these effects to be fairly short-lived. In comparison to biological and radiological agents, chemical agents need to be brought right to the victim in order to work. For them the delivery mechanism is an important factor. That is why the CBR Card expands the three representative chemical agent cases to a variety of agent/delivery mechanism combinations such as aircraft drop, van spray, and suitcase bomb.

One agent, anthrax, is sufficient to represent biological warfare agents. Anthrax is a worst case choice because as a spore it is relatively resistant to ultraviolet light so it has a long linger time (relative to other biological agents) and is also more lethal than most other biological agents. It is also readily available and, unlike the chemical agents, it can kill at a long distance from its point of release. Three different, plausible delivery mechanisms are used—aircraft spray, van spray, and backpack spray.

For the radiological threat, Cobalt 60 is a likely source due to its availability from medical applications. One delivery method is used (suitcase bomb) for its application since in any other form it would be very dangerous to the terrorist employing it and an explosive release provides an effective way to spread a small amount of material quickly.

Mechanics of Use

The two parameters that the CBR Card will require from the user will be direction of prevailing wind and location of the source. The data produced from the series of CBR scenarios described above will be applied to the site within VAT 200 with these two pieces of data. In this way, personnel affected by the release may be calculated and provided as a consequence term and, if requested by the user, plotted on the site map. The prevailing wind condition is very important for CB releases since it specifically identifies the region at risk from a CB release. However, the user may experiment using different wind azimuths to determine the severity of a CBR attack during non-nominal meteorological conditions (i.e., the user may perform what-if analyses).

The CBR Card does not consider terrain effects. All scenario runs assume flat terrain. This simplification could obviously be important especially for very hilly terrain and urban areas.

The example threats provided in the CBR Card give a broad range of potential threats with limited resolution. If any of these scenarios produce event consequences marginally acceptable or unacceptable, it is recommended that a more detailed examination of the scenario by considered by using the high fidelity CBR transport and dispersion model, HPAC, described in the next section.

Hazard Prediction and Assessment Capability (HPAC)

General Description

The high fidelity transport and dispersion engine within the Hazard Prediction and Assessment Capability (HPAC) application normally requires over 100 independent parameters to perform a detailed calculation. However, the resolution of the information that will be available for a given site and scenario will not have much of this relevant information. The source of the release must be identified to include agent, agent dissemination device, and amount. HPAC has standard attributes of the agents stored in its databases to provide an initial release cloud. The transport and dispersion of this cloud, and its resulting lethality, is largely an effect of the environment into which this agent is released. VAT 200 does not need terrain and meteorological conditions to run but HPAC needs some values for these parameters. HPAC can either determine typical meteorological conditions for the site's geographic location and season of the year from its own resident databases or a default file will be made available for modification. In addition, the terrain will affect the transport and dispersion but VAT 200 assumes flat terrain. Data from HPAC will be typical contours showing the extent of a cloud's growth scaled to dose levels representative of physical impairment and/or high probability of death.

Mechanics of Use

HPAC is capable of using every bit of the agent cloud, time and meteorology, and geographic data that VAT 200 will supply. Some users of VAT 200 will be unable to provide information in detail and so will instead characterize weapons, weather, and geography by generic category. Together, VAT 200 and HPAC will extrapolate from these to the details HPAC's computation engine requires in order to run.

The present release of HPAC does not directly calculate casualty information. VAT 200 will receive geographic lethality and incapacitation information from HPAC that it will then use both for casualty and for mission impact assessment.

External Interfaces

The VAT 200 provides a mechanism that allows end users to enhance the functionality provided by the VAT 200 on delivery. The VAT Plug-in module interface allows third parties to create software modules that extend the VAT 200's capabilities beyond those delivered as part of the standard VAT 200 installation. There are currently three variants of plug-in modules: Analytic Model plug-ins, Data Analysis plug-in modules, and I/O plug-in modules. The following sections discuss the VAT 200's Plug-in module interface and the capabilities of each of the plug-in types in an overview fashion that attempts to provide context for the other sections of this specification.

Plug-In Module Interface

The VAT 200's external interface mechanism is constructed around the notion of software plug-in modules which provide enhanced behavior for the VAT 200 in specific areas of functionality: new analytic models, new textual data interpretation paragraphs, or new sources to import or export data to or from the VAT 200. Software plug-in modules are binary objects built from compiled code that adheres to standards defined for the AVAT 100 Suite.

In general terms, for all plug-in modules, the VAT 200 expects a base level of functionality that manages the low-level interface with the VAT 200 software. On top of that functionality, the VAT 200 expects that a plug-in will implement additional functionality that will allow the plug-in to provide enhanced behavior for the VAT 200 software.

The overarching design principle for the Plug-in module interface design is to make it easy for third party programmers to develop plug-ins for different situations, not precluding the possibility that more than one plug-in of a particular type (e.g. two analytic model plug-ins and/or three analysis module plug-ins) may be registered with the VAT 200 and potentially be running concurrently with the others.

Analytic Models Interface

The VAT 200 Analytic Models Interface will allow module developers to create interfaces to external analytic models and interface them with the VAT 200. Through the Analytic Models Interface the VAT 200 will be capable of exporting munitions, terrain, geometry and other information in the VAT Database 220 for analytic models to use in their calculations.

A major design goal for this interface is that the user will not be required to interact with an external model's native interface (if any exists) in order to use it or its results in VAT 200 risk calculations. As a result, the VAT 200 Analytic Models Interface provides a number of control functions that allow the VAT 200 to control the execution of a compliant Analytic Model.

After execution, the VAT 200 expects to receive results from the model. The kinds of information that an Analytic Model can return to the VAT 200 are listed below.

TABLE B

Analytic Model Information Table

| Value | Description |
| --- | --- |
| Consequence to Life | The effect on the human population in the area surrounding the event. This value is used in the influence network 500 to affect the overall risk value. |
| Consequence to Assets | The effect on the assets affected by the event. This value is used in the influence network 500 to affect the overall risk value. |
| 2D, 3D, and 4D (3D + time) data objects | Data values returned to the VAT 200 that allow the VAT 200 to visualize the results of a model execution. |
| Data Annotations | Items used to annotate the visualization of data returned from an analytic model. |

Data Analysis Module Interface

In support of the user created report format requirement, the VAT 200 exposes the Data Analysis modules interface. The VAT 200 uses Data Analysis modules to interpret the results of user-entered data and formulate statements about that data. Throughout the interview process for Professional Assessors and Planners and during the creation of output reports, the VAT 200 uses Data Analysis modules to create custom paragraphs of text. The exposed interface allows end users to create their own Data Analysis modules that can be used in user modified screen sets or in user defined output report formats. The Data Analysis module interface includes control methods that allow the VAT 200 to interact with Data Analysis modules and exposes portions of the VAT Database 220 to allow the module to perform queries on the database.

IO Module Interface

The third external interface the VAT 200 exposes is the IO module interface. The VAT 200 uses IO modules to read and write data from/to external data sources.

Initially the VAT 200 includes IO modules for importing data in the following formats:

| | |
| --- | --- |
| TIFF-Image format | JPEG-Image format |
| DXF-Image format | BMP-Image format |

The VAT 200 may also include an IO module for the following format:

JIS—The JSIVA Information System

Output Reports

The VAT 200 has a report generation capability that assists in the preparation of JSIVA formatted professional assessment reports, assessment team briefings, and AT/FP plans. In addition, the VAT 200 allows the user to define additional report formats that can be used to generate new report types in addition to those originally supplied with the VAT 200. The VAT 200 accomplishes this by storing report formats that define the information to be contained in VAT 200 generated reports in a content independent format. Report formats are editable from within the VAT 200 Editor. Using the report format editor, the user can modify any of the report formats supplied with the VAT 200 and/or create completely new formats that are unlike those supplied with the VAT 200.

Professional Assessment Report Generation Capability

Generation of the report of a professional assessment is an option in the reports section of the VAT 200. A substantial portion of the report consists of directly transferred text comments keyed in by users. Other portions of the report are available from the facility physical and procedural baseline information maintained in the database as a basis for the VAT 200's calculation. Finally, other portions of the report are the VAT 200's calculated results.

Professional Assessment Team Briefing Generation Capability

Generation of a Professional Assessment Team Inbriefing/Outbriefing is an option in the reports section of the VAT 200. As with the Professional Assessment report, the bulk of this report is generated based on information entered by the user during his use of the VAT 200. Other Professional Assessment Team Briefings are supplied in template form to speed the report creation ability of Professional Assessors.

AT/FP Plan Generation Capability

Generation of the AT/FP Plan is also an option in the reports section of the VAT 200. A substantial portion of the report consists of directly transferred text comments keyed in by users. Other portions of the report are available from the facility physical and procedural baseline information maintained the database as a basis for the VAT 200's calculations. Yet other portions of the report are the VAT 200's calculated results.

User Defined Report Generation Capability

Report formats are the heart of the VAT 200's report generation capability. The VAT 200 stores report formats that represent all the report types that the VAT 200 produces. Even the AT/FP Plans and Professional Assessment Reports that the VAT 200 generates are created using VAT 200 report formats. Report formats define for the VAT 200 the contents of a report independently of the information that will ultimately be contained in the reports. Using a report format, at report generation time the VAT 200 iterates through user entered site information and assembles a report based on the information.

Figure 25:
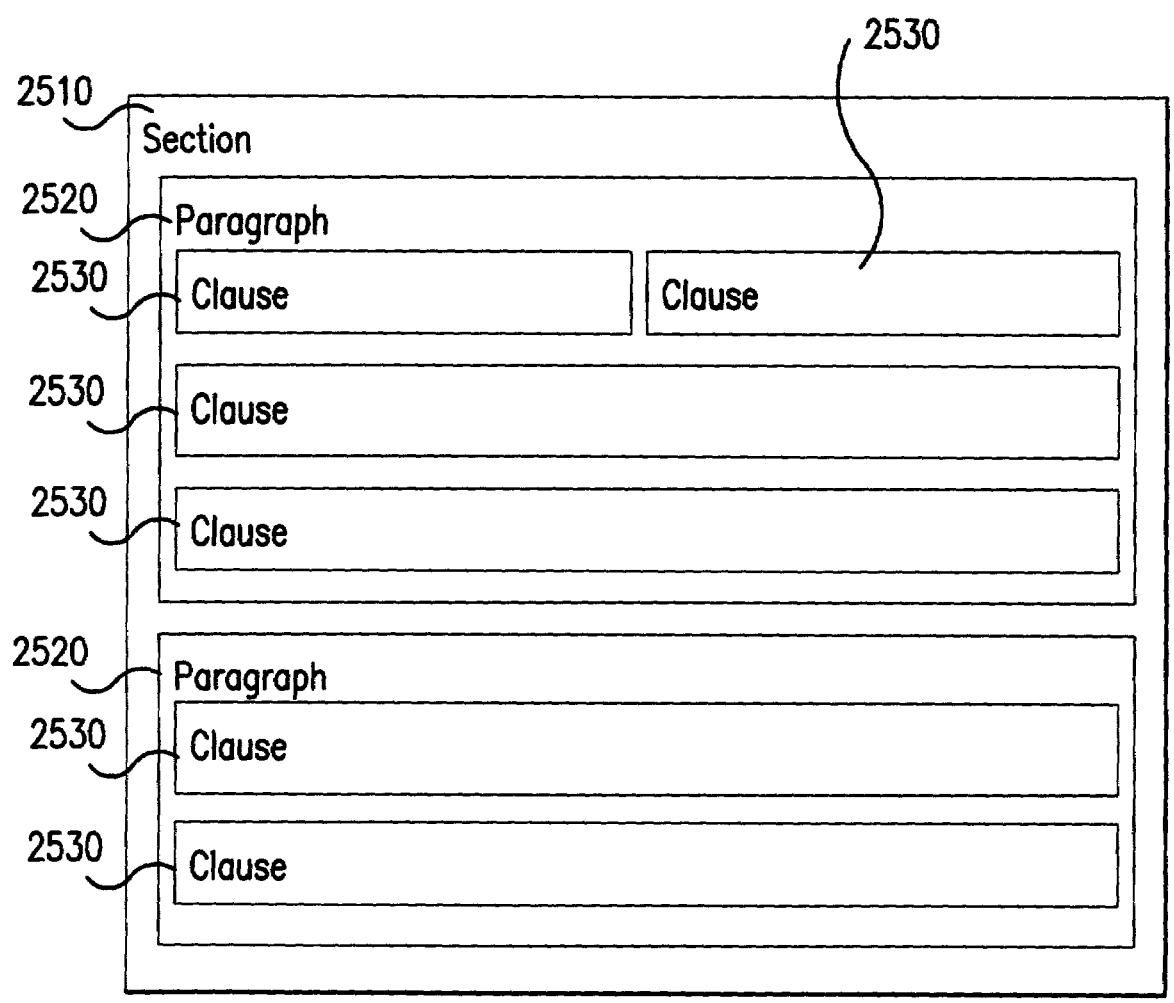
FIG. 25 is a schematic diagram of a user created report format.

Report formats consist of a small set of elements that can be assembled by the VAT 200 in building block fashion to create a whole document. As shown in FIG. 25, report formats consist of Sections 2510, Paragraphs 2520, and Clauses 2530. Major divisions of generated documentation are stored as sections in VAT 200 report formats. Sections consist of a title element and one or more paragraphs that make up the body of the block. Each section in a VAT 200 report format contains paragraphs that define the content of the block. Paragraphs in VAT 200 reports are usually what their name implies—paragraphs of text—although the VAT 200 extends this definition slightly for added flexibility by allowing graphs and tables to be inserted as paragraphs 2520. As with sections 2510, paragraphs 2520 may contain clauses 2530 that define the content of the paragraph 2520. Clauses 2530 are the lowest level element of a VAT 200 report format.

Paragraphs in a VAT 200 report format may be one of several different types. The simplest form of paragraph is a boilerplate paragraph that contains text that is constant for all reports generated using the report format. Boilerplate paragraphs insert their exact contents into generated reports. Another, slightly more complex type of paragraph is the analytic paragraph. Analytic paragraphs are created from the output of a Data Analysis module plug-in (see the external interfaces section for more information on Data Analysis modules). Using Data Analysis modules and analytic paragraphs, end users can create completely new forms of output for VAT 200 reports. The next most complex form of paragraph is a composed paragraph. Composed paragraphs are paragraphs that have one or more clauses that are used to build the body of the paragraph at generation time. Composed paragraphs insert the contents of the clauses that comprise them into generated reports. Finally, the most complex type of paragraph stored in VAT 200 report formats is a special paragraph. Special paragraphs are paragraphs that the VAT 200 creates entirely based on information entered by the user as part of their interaction with the VAT 200. Special paragraphs are graphs, tables and other forms of data representation that are constructed by the VAT 200 at the time of report generation that contain information from the VAT Database 220. The VAT 200 includes special paragraphs that create tables and simple graphs.

As with paragraphs, clauses can take multiple forms. The simplest form of clause is a boilerplate clause. As with boilerplate paragraphs, boilerplate clauses are copied into generated reports unchanged. The second form of a clause is the query clause. Query clauses represent simple database queries. At report generation time, the query is conducted and its results are what is inserted into generated reports.

Software Architecture

Object Model and Architecture

The VAT 200 software accepts and stores a multitude of data elements including user input data, analytic model results and influence network 500 evaluation results. In order to provide structure to that data and make it available to all of the parts of the VAT 200 system that may need it, there are three models the VAT 200 uses to organize information. One of these models, the Influence Network 500, has been specifically discussed previously due its central influence on the VAT 200's complex risk calculations. In addition to the Influence Network 500, the VAT 200 maintains a Data Model, which contains information about the physical elements of a particular domain, and the Meta Data model. This section describes each of these models, their relationship to the other models, and how the VAT 200 uses them to develop a complete representation of a site.

Figure 26:
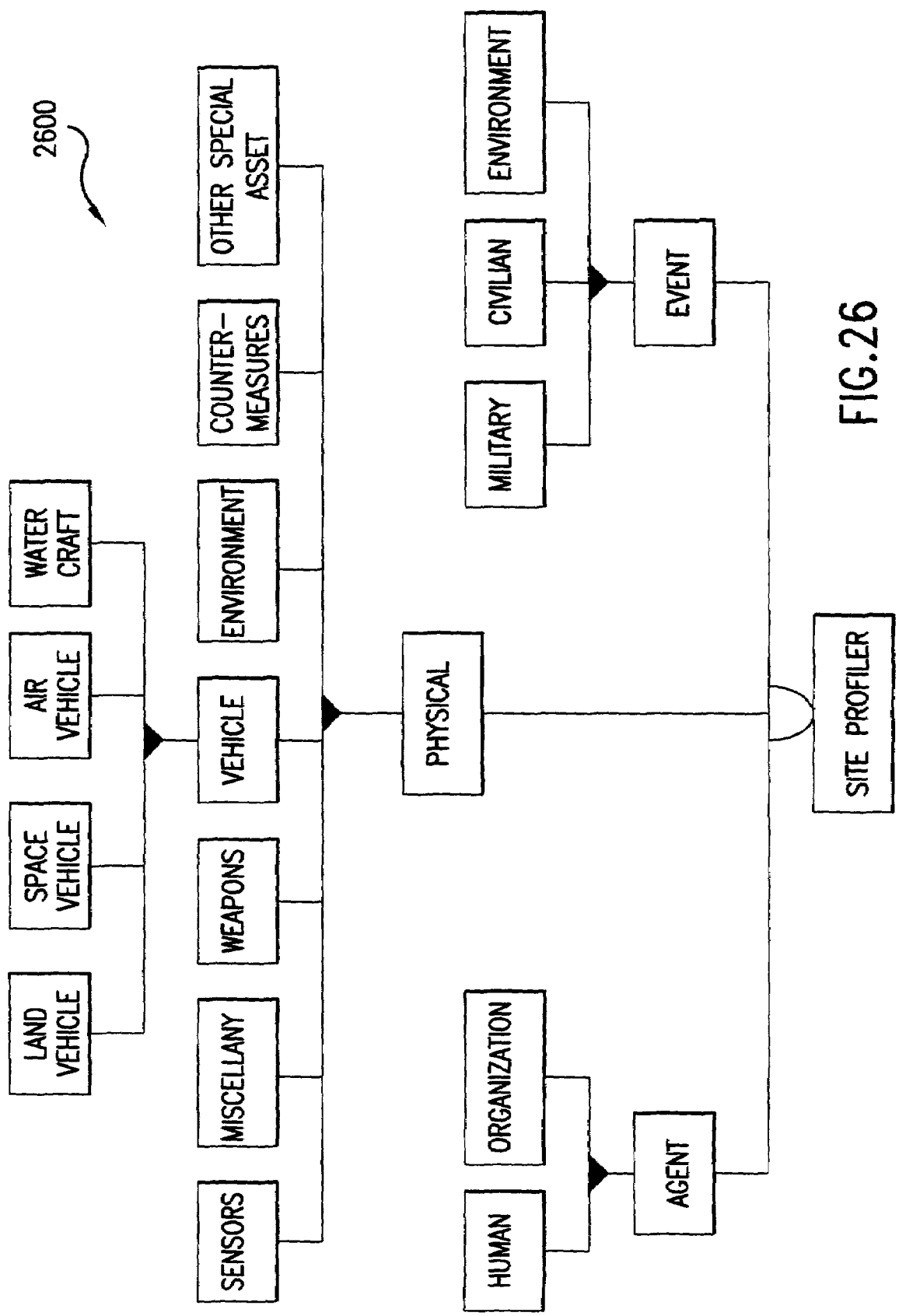
FIG. 26 is a block diagram of the VAT Data Model.

The VAT 200 Data Model 2600, shown in simplified form in FIG. 26, is how the VAT 200 organizes information about the real-world elements that can exist in the site under analysis. The association of physical items, agents, and events as the association element called AT/FP Domain forms the base of the diagram. Each of the branches of the tree represents an orthogonal view of the world that represents items from the most general to the most specific. In this context, physical items are real objects in the world that occupy space. For example under this organization, one could say they have a physical object, which is a vehicle, which is a land vehicle, etc. proceeding from the most general to the most specific. Agents represent entities in the world that have intent and perform actions. An example agent would be the U.S. Army or a terrorist organization. Finally, events are triggers that are likely to bring about change in the world state or cause an agent to act. An example would be a coup or the occurrence of a religious holiday.

The VAT 200's second use of the Data Model 2600 is to use instances of elements of the Data Model 2600 as part of associations that are part of the VAT 200's Meta Data Model (shown in FIG. 27 and described below). These element instances represent items that actually exist as part of the profiles that the VAT 200 is being used to create.

Figure 27:
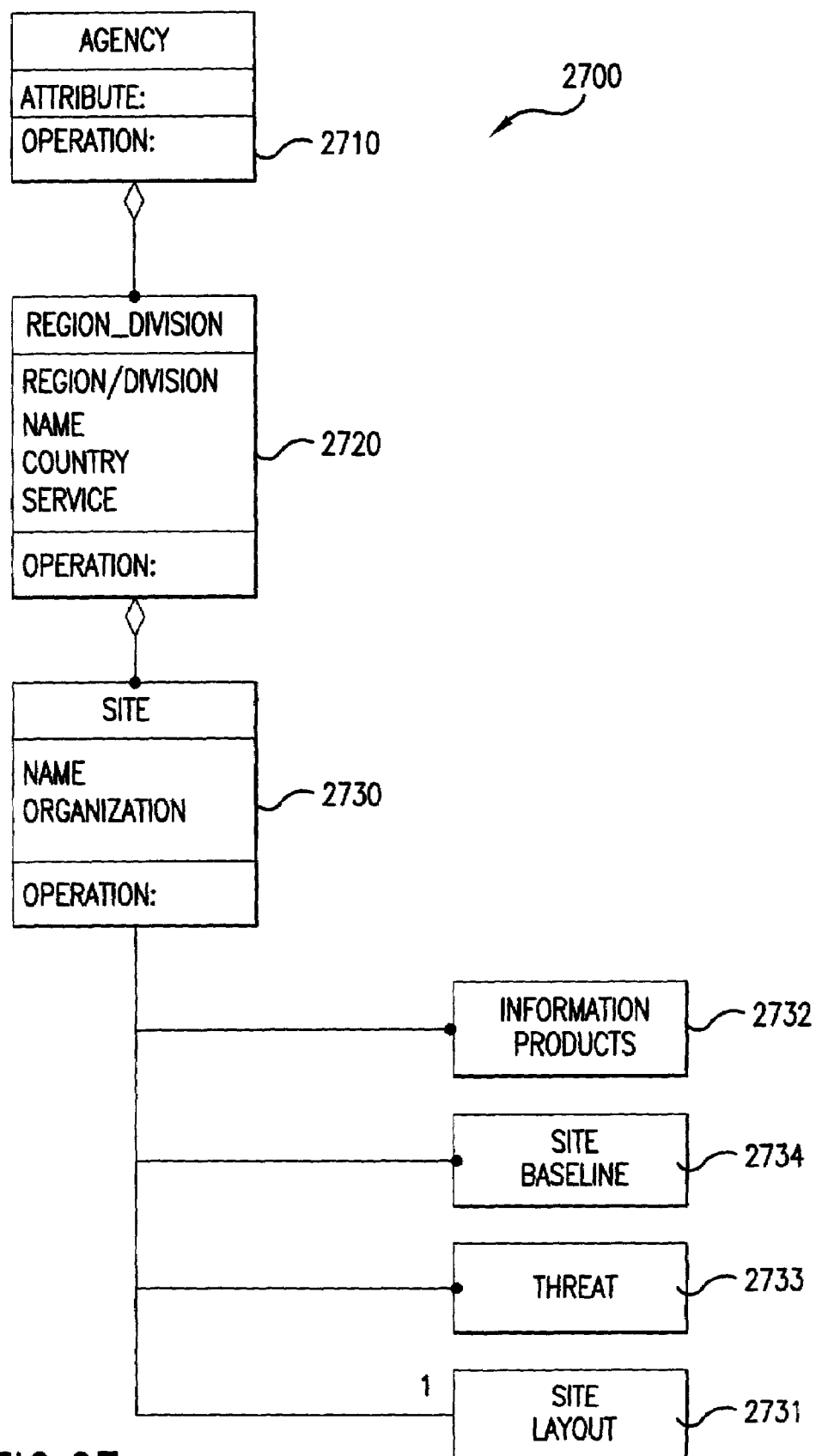
FIG. 27 is a block diagram of the Meta Data Model.

The VAT 200's Meta Data Model 2700, shown in FIG. 27, is the VAT 200's central aggregation mechanism for data about sites that the VAT 200 profiles. The VAT Meta Data Model 2700 stores information about the collections of elements from the Data Model 2600 that are useful in the AT/FP domain. The structure of the Meta Data Model 2700 is primarily based on associations since it focuses on bringing together objects into real world constructs.

At the root of the tree are the organizational elements Agency 2710, Region/Division 2720, and Site 2730. These objects provide for storing contextual information about a site and allow the TIMS 130 to properly associate sites that are under the same Agency 2710 or in the same Region or Division 2720.

Sites 2730 are composed of a Site Layout 2731 and one or more Information Products 2732, Threats 2733 and Site Baselines 2724. The VAT 200 uses the Site Layout 2731 to store all of the static information about a site's infrastructure, structures, and natural environment. Conversely, Site Baselines 2724 are used to store data about the dynamic elements of a site such as employed countermeasures, asset locations, and organizations as these elements are organized for a particular configuration (e.g. one may speak of the THREATCON Alpha baseline versus the THREATCON Bravo baseline.)

The VAT 200's final organizational element, as described previously, is the Influence Network 500. The Influence Network 500 provides a central framework from which the VAT 200 evaluates risk. Each of the nodes 510, 510*a* in this network 500 represents an element that affects the overall risk for a given threat against a given target. Nodes in the network 500 can have parents (nodes that cause an effect on this node) and children (nodes that are affected by this node), but the network 500 cannot contain cycles. Using an influence algorithm (described fully in the Influence Network 500 section), each of the nodes in the network 500 takes a set of possible states, each with a probability of occurring. Ultimately, the values at children nodes are influenced by the values in parent nodes in the network 500.

Figure 28:
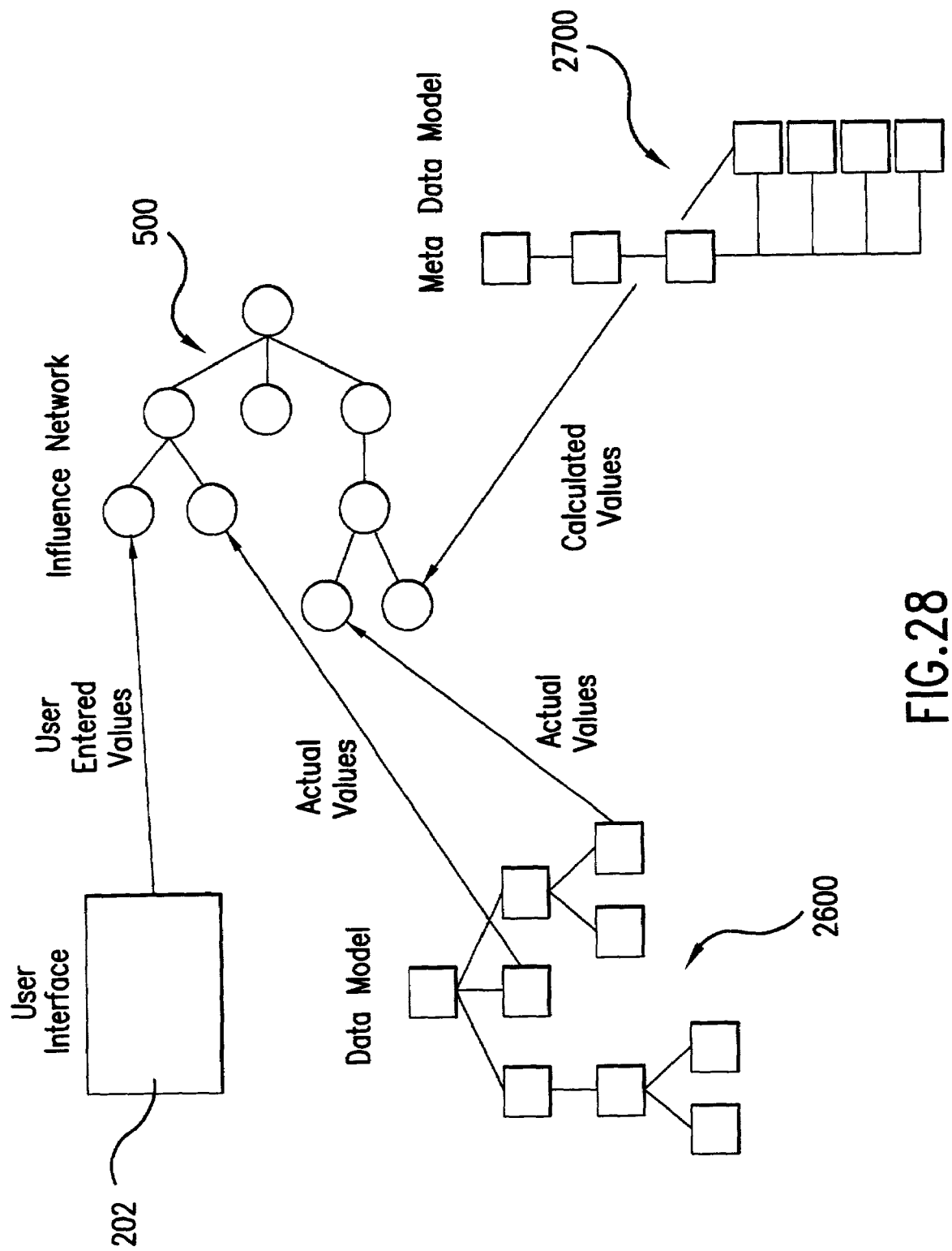
FIG. 28 is a symbolic diagram of Meta Data Model.

As shown in the FIG. 28, the VAT 200 populates the leaf nodes 510*a* of the Influence Network 500 using a combination of directly entered data, data pulled directly from the Data or Meta Data models 2600, 2720, and calculated information based on data gained from network 500 searches. As a consequence, data entered into the Data Model 2600 and the Meta Data Model 2700 directly or indirectly affect the site specific Influence Network 500 and therefore affect the site's overall risk profile.

To implement the behaviors implied by these three models, the VAT 200 is divided internally into nine subsystems that each implement a part of one of the data models, the influence model, the user interface, or other systems that operate on the models to perform useful calculations. The subsystems are identified in the next section and defined in detail in later sections.

Package Diagram

Figure 29:
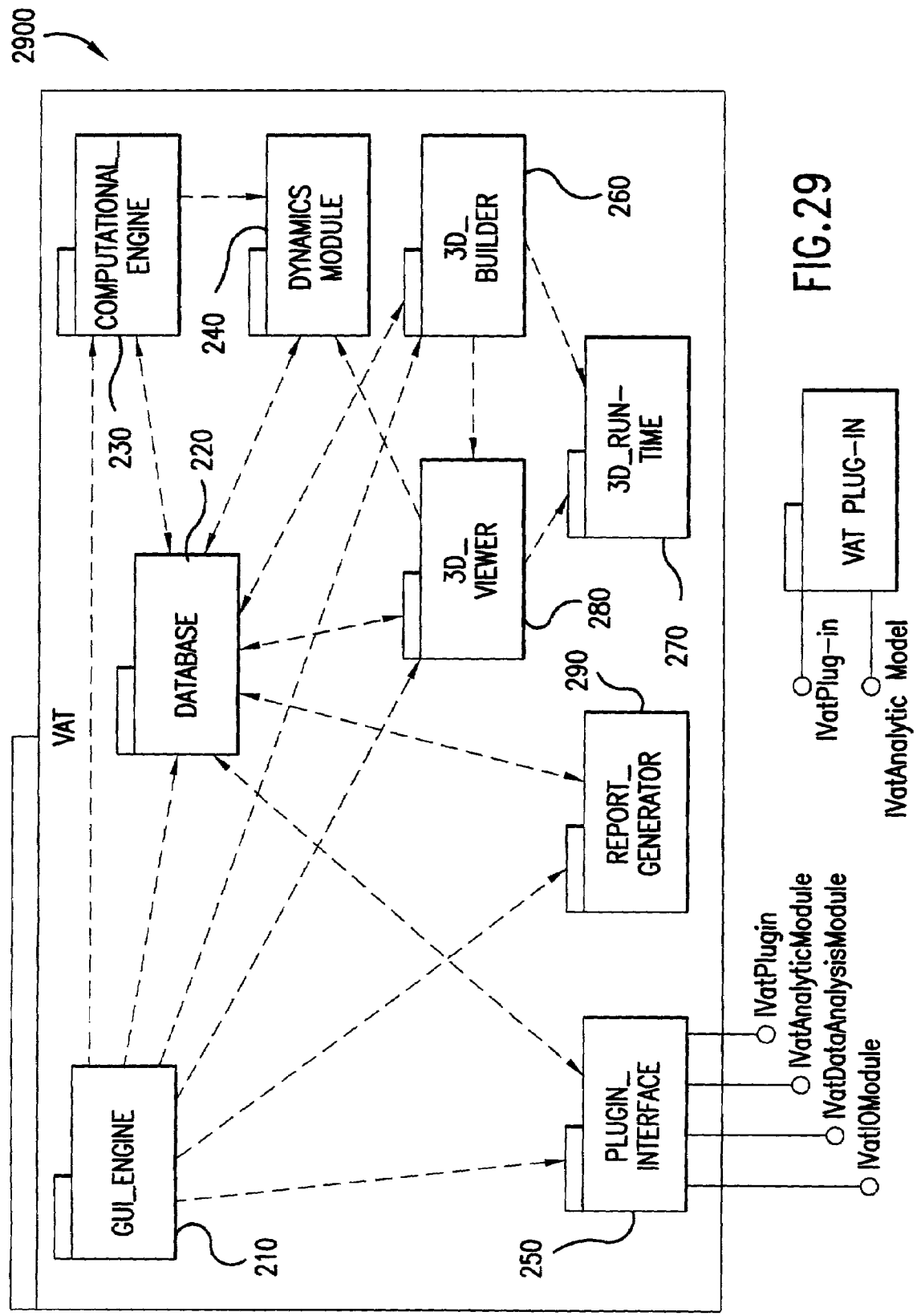
FIG. 29 is a block diagram of the VAT showing dependency relationships.

The VAT 200 is internally divided into nine subsystems. Each of these subsystems is implemented as a separate software package with a public interface that the other subsystems use to interact with the package. The VAT 200 Package Diagram 2900 in FIG. 29 shows the VAT 200, its subsystems, and their dependency relationships. The block symbols (e.g. GUI Engine 210) represent aggregations of functionality within the VAT 200 that will be implemented as a subsystem with specific defined interfaces. The dotted arrows show which of the VAT 200's subsystems depend on others. For each of these dependencies, the lower level package (at the arrowhead end of the arrows) will implement an internal system interface.

In addition to the VAT 200's internal interfaces, this diagram shows the external interfaces that have been defined for the VAT 200. These interfaces are discussed in the section above entitled External Interfaces.

Subsystems

GUI Engine

In order to provide a user interface that is tailored to multiple types of users and that can be modified without recompiling, the VAT 200 uses a GUI Engine 210. Instead of producing an interface based on compiled code, the GUI Engine 210 reads and creates the user interface from the database 220 at run-time. This approach provides a GUI 202 that can be modified by changing the database 220 instead of the code. It also provides the ability to define different user interfaces for each type of user. This allows the interfaces to be customized to fit the user's specific needs and level of understanding.

The current user interface concept has five main sections menu bar, navigation bar, tool interface, outline view, and dynamic content area. Each of these sections are created and managed by the GUI Engine 210.

The menu bar provides file input/output commands, edit functions, simple navigation, and access to help. The GUI Engine 210 passes the commands to the appropriate VAT 200 subsystems and interacts with the Windows clipboard as requested by the user.

The navigation bar provides the user with web like navigation (back and forward buttons) and quick access to important features and sections of data in the VAT 200. The GUI Engine 210 stores a screen history that it uses to determine what screen to display when the back and forward buttons are used. They act exactly like the buttons found on a web browser. The remaining buttons on the navigation bar are linked to specific screens in the VAT 200 that are immediately displayed when the user presses them.

Similar to the navigation bar, the tool interface provides direct access to various tools contained in the VAT 200. Each of the buttons, when pressed, instructs the GUI Engine 210 to activate a specific VAT 200 tool and display its interface.

The outline view's two purposes are to represent the data in the system and to allow the user to move around in the VAT 200 to view, edit, and change data. The GUI Engine 210 populates the outline as data is entered into the system and as the VAT 200 needs information from the user. The information is displayed in an outline form to better organize and manage its representation.

Users can use the outline to jump to information that they need to change or enter simply by clicking on a line in the outline view. This instructs the GUI Engine 210 to display the screen that contains the proper information.

The most important part of the interface is the dynamic content area. This portion of the interface contains the screens that:
 Interview the user
 Allow the user to view and modify data
 Display results, charts, and graphs
 Display 3D graphics for building the site and simulating it The GUI Engine 210, shown in FIG. 6, reads information from the database and creates screens to allow the user to interact with the system. This area, like the rest of the interface, is completely controlled by the GUI Engine 210, but the 3D Engine 210 is also capable of writing information to it. Whenever the 3D Builder 260 or Viewer 280 is needed, the GUI Engine 210 provides a graphics context to the 3D Engine 210 so that it can display graphics in the dynamic content area. The GUI Engine 210 creates and manages all the toolbars that are required to operate the 3D Builder 260 and Viewer 280. It passes the commands issued by the user to the 3D subsystem for processing. This provides a consistent interface to the user and relieves the 3D sub-system from the duties of handling user input.

The GUI Engine 210 handles multiple screen definition sets so that each one can be customized to fit a specific set of users, but it does not require that every screen be customized. Instead the engine supports default screens in addition to user type specific screens. This provides a mechanism where the GUI Engine 210 uses a default screen anytime a user type specific one does not exist. This makes the engine 210 more flexible and defining custom screens less time consuming.

Figure 30:
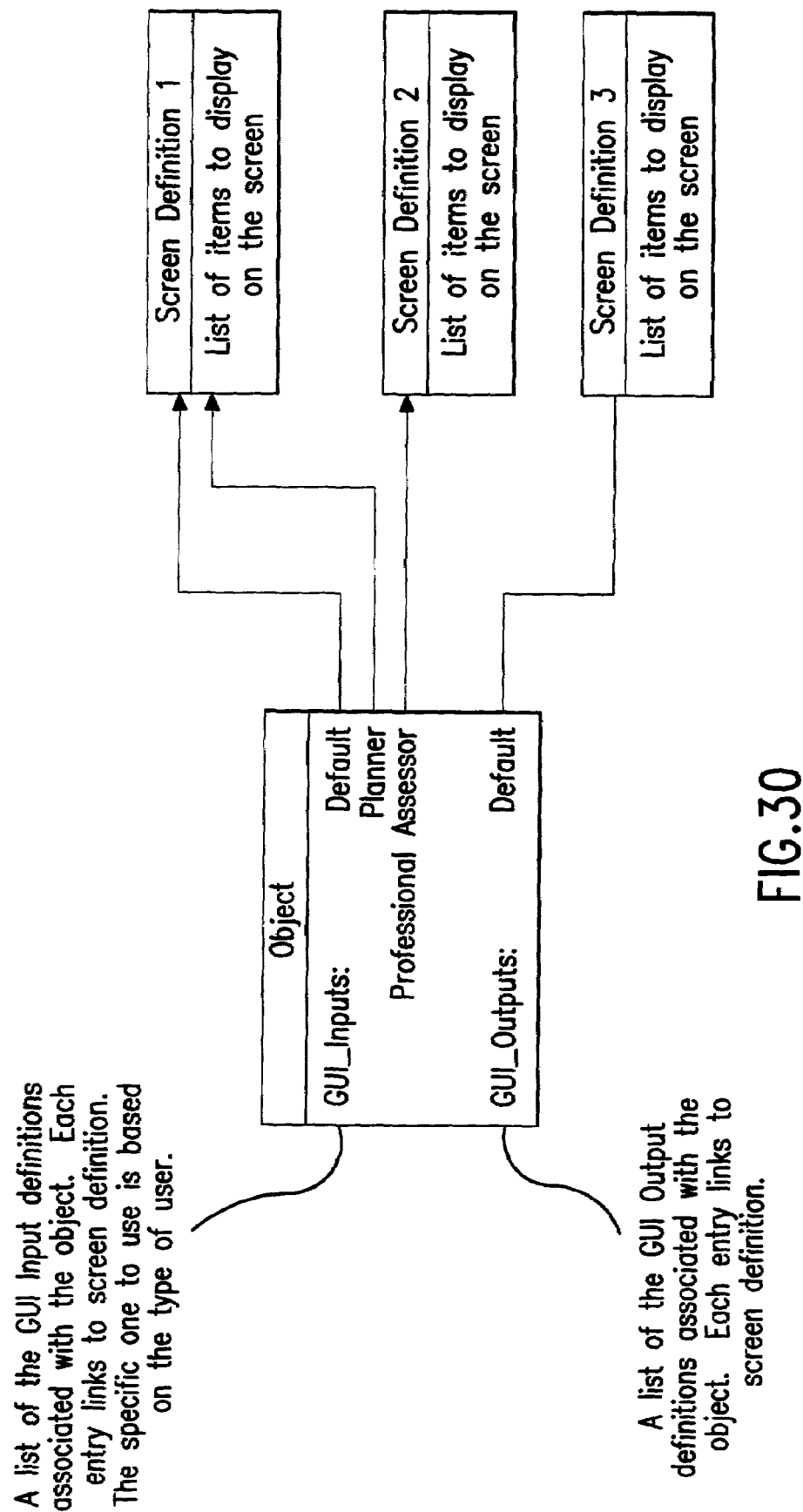
FIG. 30 is an object association diagram of the data base.

Each object in the system that requires user interaction has a least one screen associated with it. This is the default screen to be used by the GUI Engine 210. In addition to that screen each object can have other screens associated with it to be used by a specific type VAT 200 user as shown in FIG. 30.

As mentioned throughout this section, the GUI Engine 210 uses screen definitions to define what the dynamic content area of the user interface should contain. These definitions define what the screen should contain, but not explicitly how it should be displayed or laid out. This has two main advantages:
 The user interface is more flexible.
 Defining screens is much simpler.

The screen definitions such as the definition 3100 shown in FIG. 31, consist of a list of what should be shown on the screen, but not how it should be laid out. This approach frees modification users from the duties of having to graphically lay out each screen so that they can better concentrate on the content of the screen. It also allows the GUI Engine 210 to be more flexible by allowing it to adapt the screen to the size and style of the window available. It furthermore allows the engine to decide, based on the type of data to be input to output, what is the best way to display it.

The GUI Engine 210 uses the screen definition 3100 to determine what to display on the screen. To determine how to display the information, it checks the type of data and determines what input or output device to use. For example, if the definition 3100 specified that the users name should be entered, the GUI Engine 210 would check the database and know that this is a string. It would then use a text-input box on the screen for the user to type the information into. If on the other hand the definition 3100 specified that the users rank be entered (and a list of acceptable ranks exist), the engine would use a selection box so that the user would not need to type in the answer. This technique is applied to all of the items in the list until the entire screen composition is known.

At this point the GUI Engine 210 uses rules similar to a web browser to layout the information on the screen. It determines the spacing between lines, knows to emphasize the title of the screen, etc. Once this process is finished, the engine displays the screen to the user and handles all the interactions.

In addition to interpreting the screen content, the GUI Engine 210 is also responsible for determining what screen to show when. The user can jump to specific screens by using the navigation bar, outline, and tool bar, but this is only part of the navigational process. During the interview for example, the user will press a done or next button to indicate that they are ready to proceed to the next screen. The GUI Engine 210 is responsible for finding it.

There are three methods that the engine uses during navigation. The first is to jump to a user-specified screen as described above. The second is to look at data dependencies in the object model and influence network 500. Many of these objects require information about other objects. The GUT Engine 210 uses this information to determine what object screen the user should see next. But, this method alone may not produce a coherent progression of screens.

Figure 32:
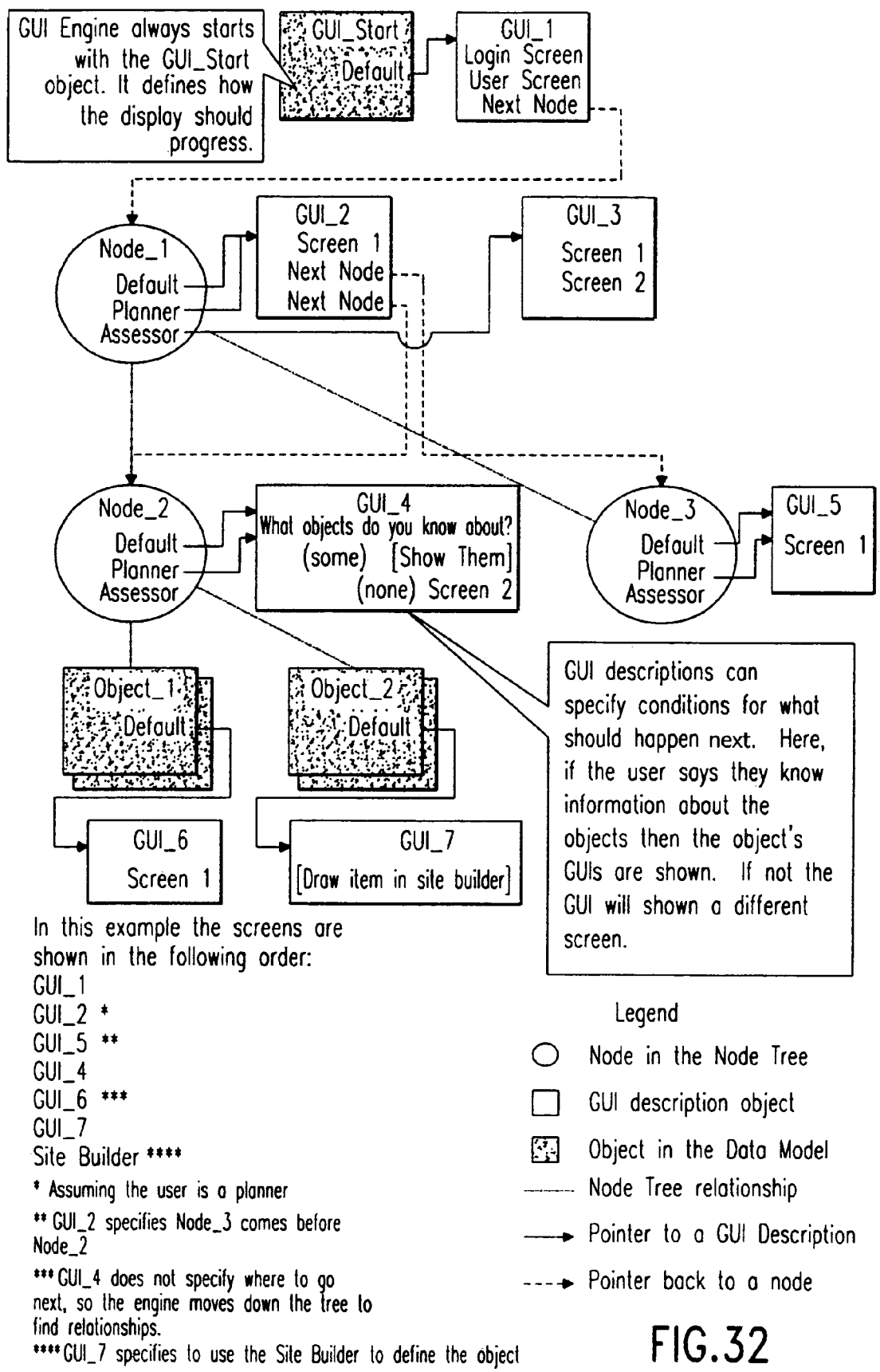
FIG. 32 is a process diagram of the navigational override process.

The GUI Engine 210 is equipped with one final navigational method. In addition to specifying what to display on a screen, a screen definition can also specify other screens to be displayed. This allows it to override the default behavior of the system in order to provide a directed screen progression. A sample diagram of this process is shown in FIG. 32.

Computational Engine

Figure 33:
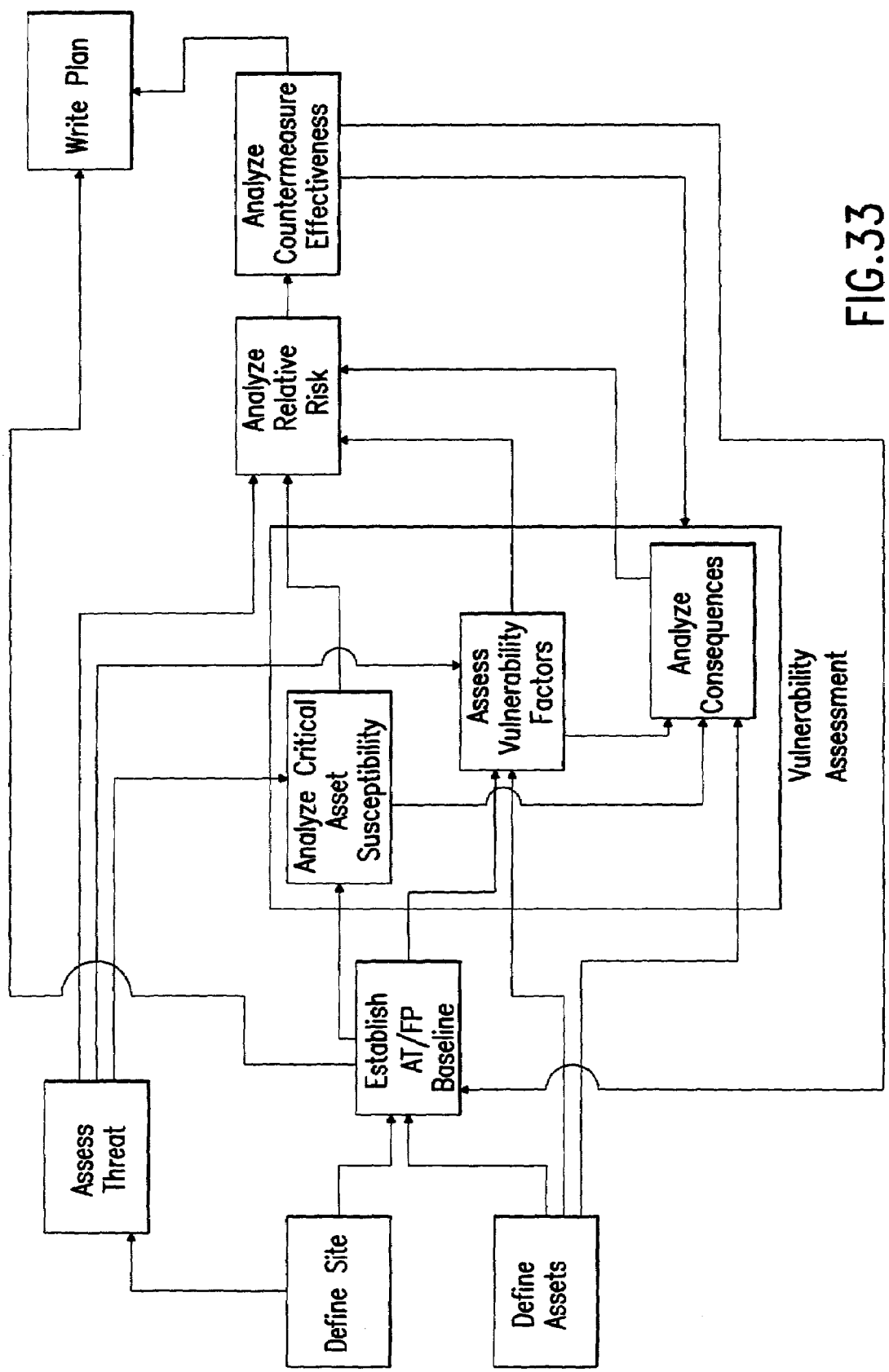
FIG. 33 is a block diagram of the risk management process.

The Computational Engine 230 subsystem of the VAT 200 is responsible for providing support to the risk determination and mitigation processes. During these processes, the Computational Engine 230 builds and maintains the structure of the influence network 500, in addition to performing calculations to support decision-making. FIG. 33 illustrates the many steps of risk determination and analysis with which the Computational Engine 230 is involved.

Figure 34:
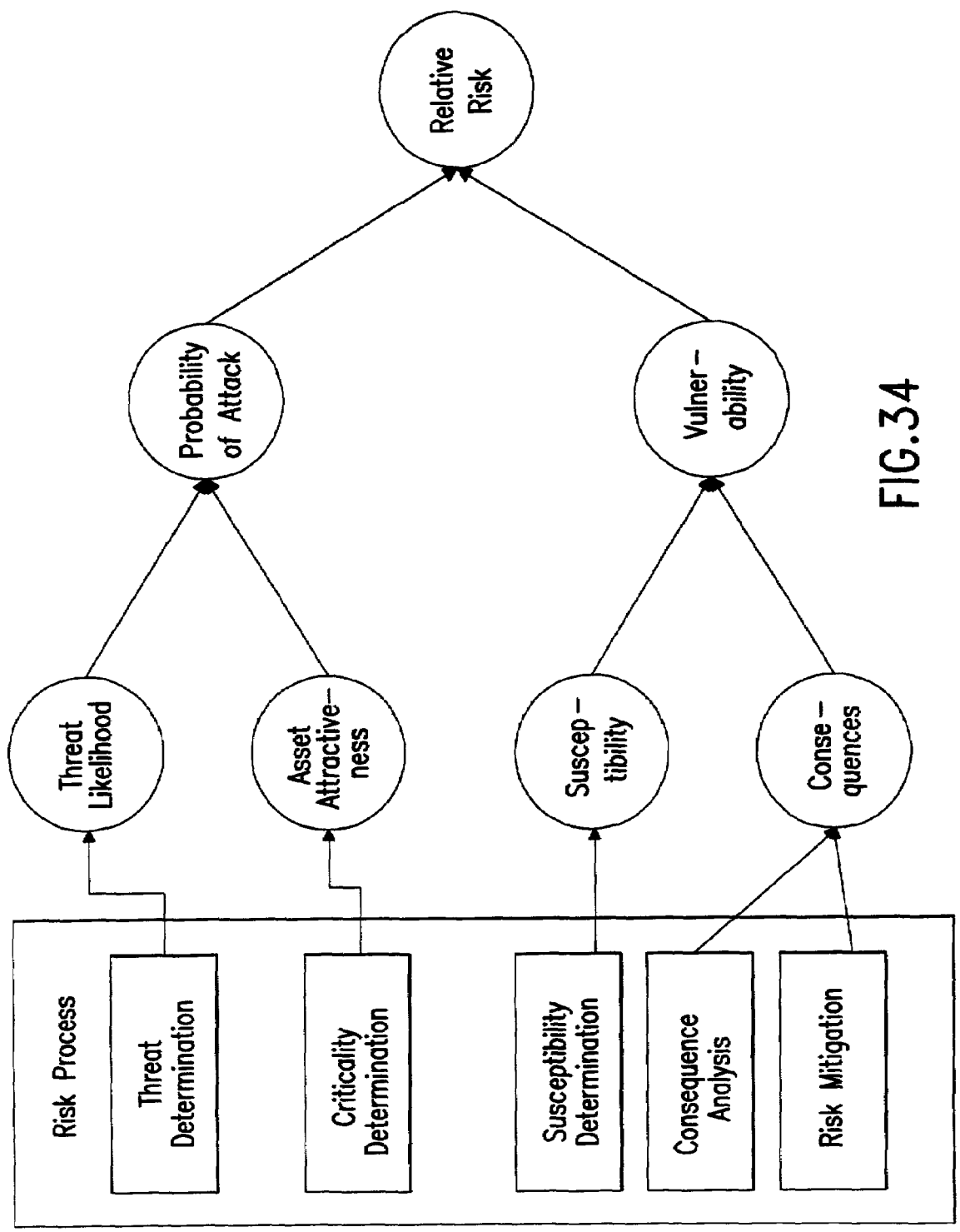
FIG. 34 is a block diagram showing risk steps and influence network interaction.

The key to the knowledge of the VAT 200 lies in the Influence Network 500. This network 500 embodies the factors that the VAT 200 relies upon in making decisions during risk determination and mitigation. Risk determination is composed of four major components: criticality determination, threat determination, susceptibility determination, and consequence analysis. Risk mitigation is comprised of countermeasure effectiveness analysis and consequence analysis. Each of these distinct components interacts with the influence network 500 in order to make decisions, and each decision made affects the rest of the Influence Network 500. Through the data interaction between these components, the influence Network 500 is capable of calculating the relative risk of a particular target against a particular threat. FIG. 34 illustrates the interaction between these steps of the risk process and the Influence Network 500.

Figure 35B:
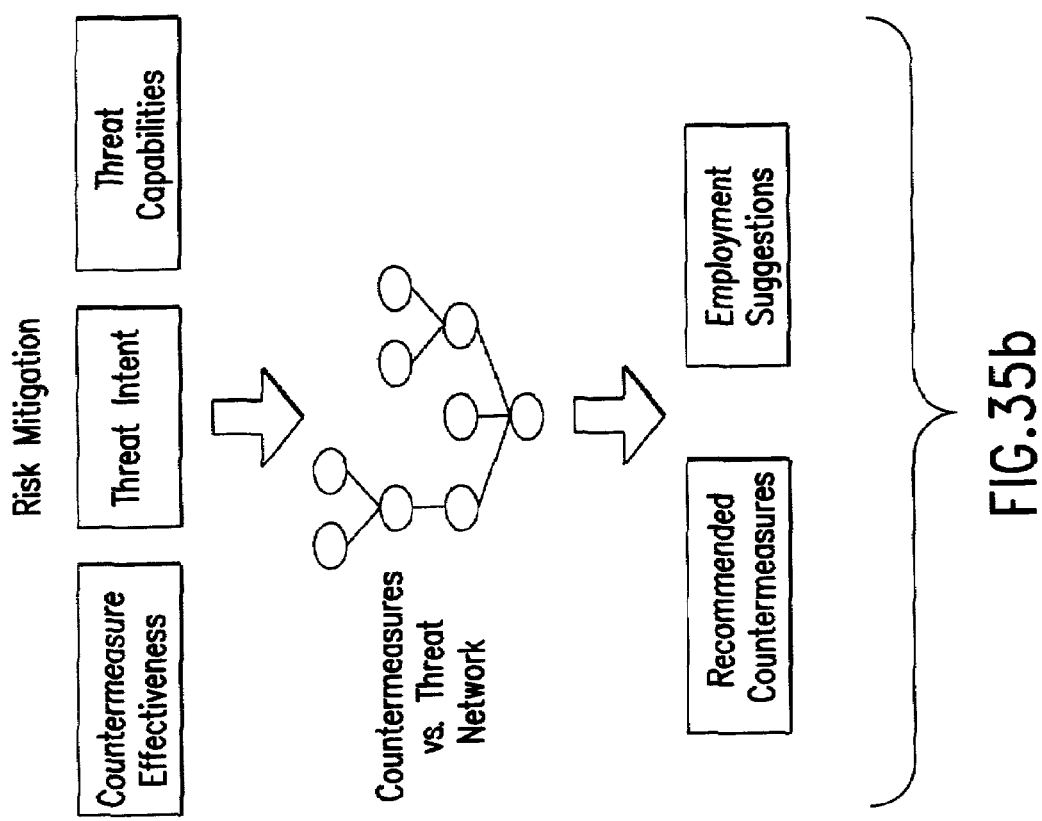
FIGS. 35a and 35b are susceptibility determination and risk mitigation process diagrams, respectively.
Figure 35A:
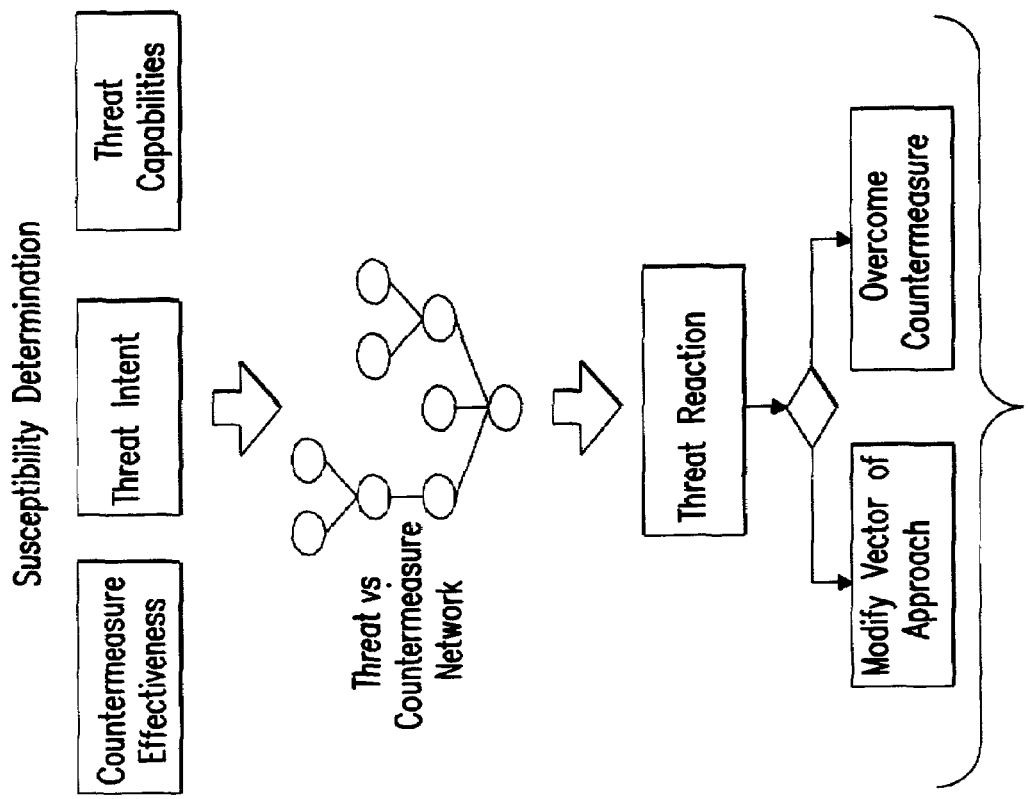

In addition to interacting with the primary VAT 200 Influence Network 500, the susceptibility determination and risk mitigation components also make use of local networks in order to make complex decisions, as shown in FIGS. 35 a, b. During the susceptibility determination, threat intentions and capabilities are compared to countermeasure effectiveness to determine the reaction of the threat upon encountering a countermeasure. This complex inference is handled using a miniature Influence Network. Similarly, risk mitigation also uses threat and countermeasure characteristics in making decisions. Various countermeasures are compared to the specific threat to determine which ones are most effective at mitigating the risk of the threat against the target. These local decisions do not directly derive from the prime influence Network, so they are handled independently.

Figure 36:
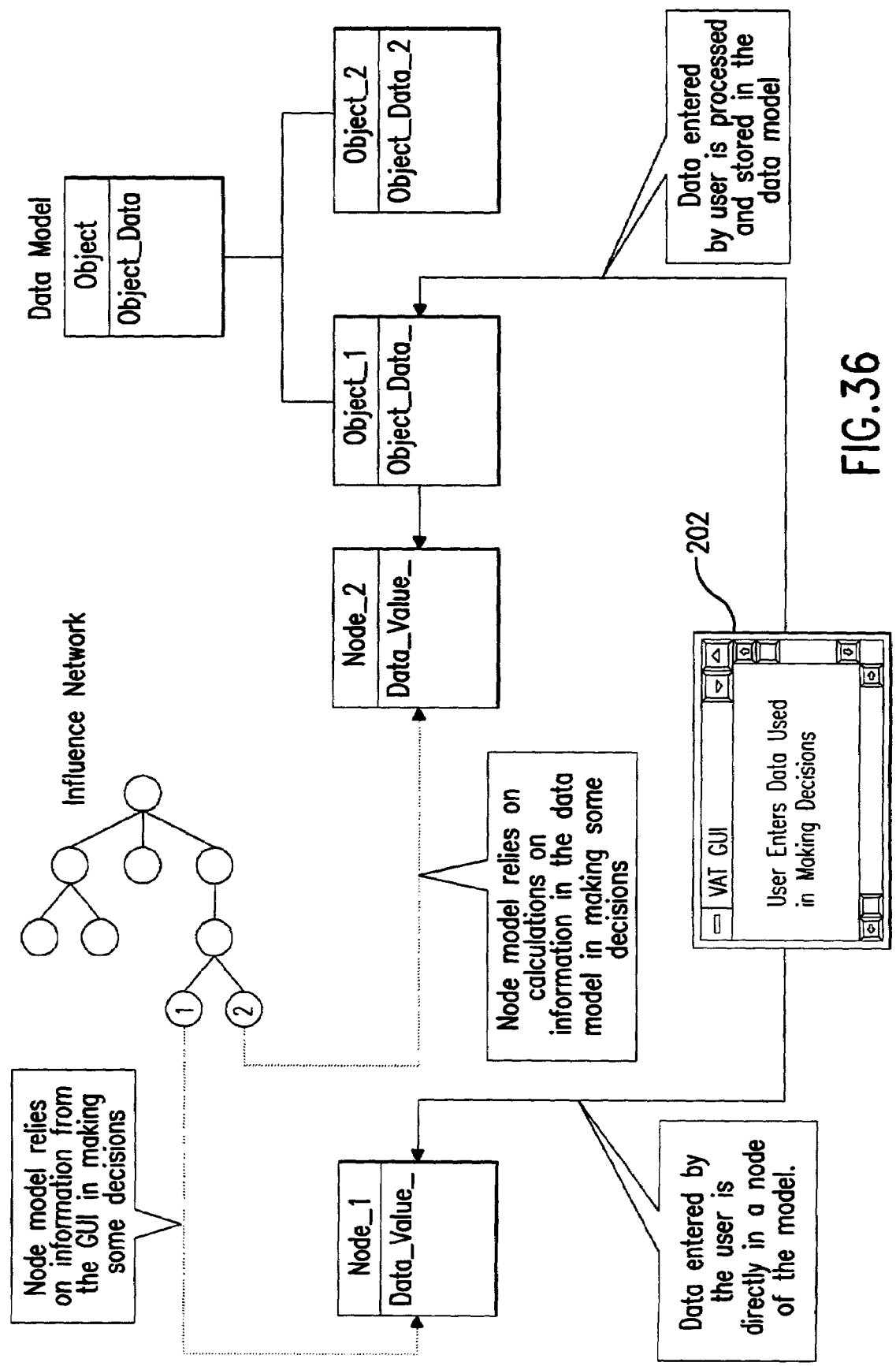
FIG. 36 is a diagram showing the relationship between the Influence Network, the graphical user interface, and calculations made against the model.

The structure of this network is used to control the progression of the screens shown to the user, and the data collected by the network 500 determines the resulting output. The network is capable of propagating data through itself in order to make decisions, but it must rely on external means to obtain this data. The GUI 202 provides a portion of this data directly from the user through elements on the screen. The remaining data is the result of various calculations performed by the Computational Engine 230. FIG. 36 depicts the relationships between the nodes of the influence network, the data connection with the GUI 202, and the calculations made against the data model.

Figure 37:
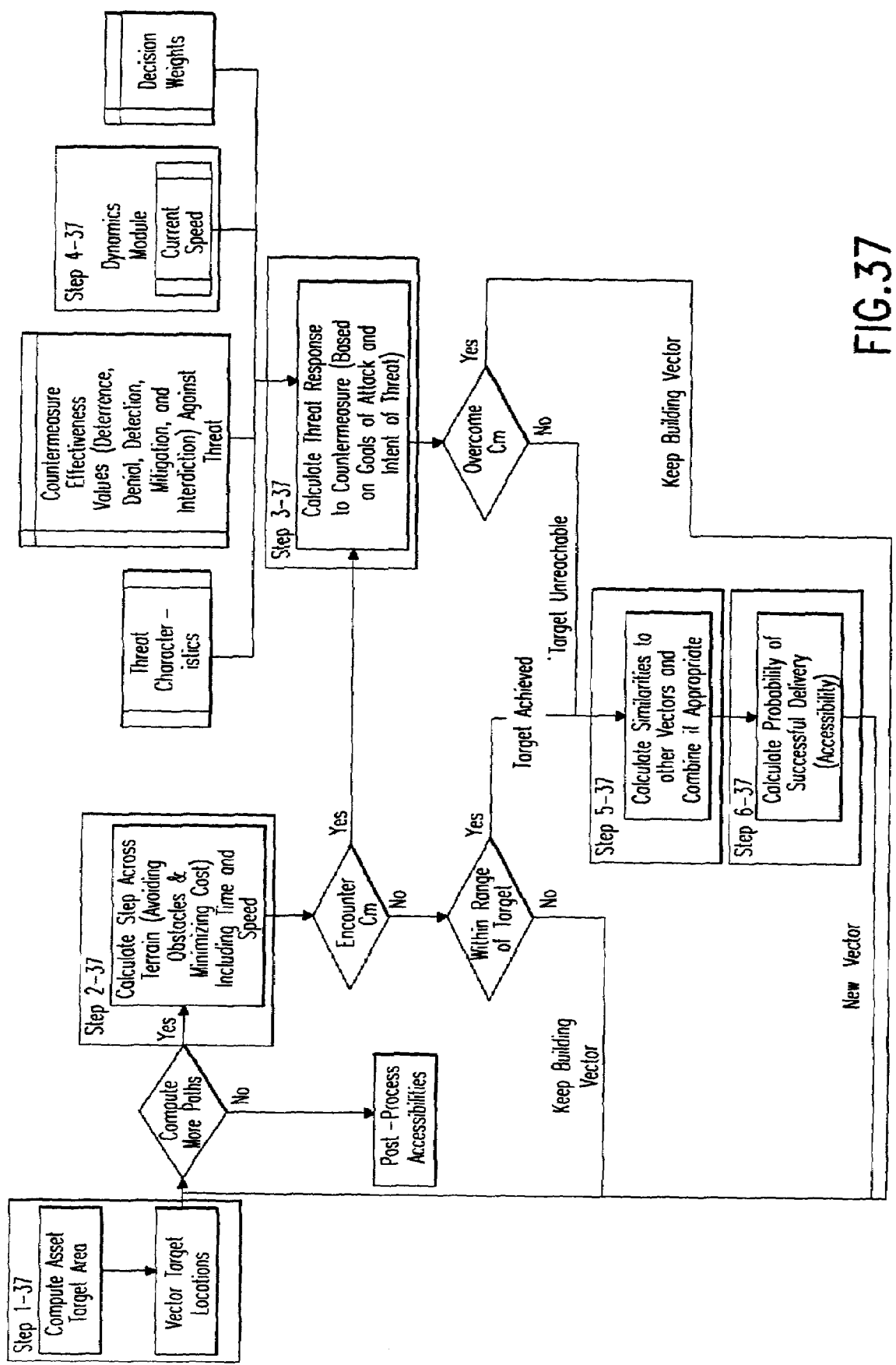
FIG. 37 is a flowchart showing calculation of approach vectors.

The primary calculation that the Computational Engine 230 is responsible for is the generation of approach vectors. These vectors represent the many ways in which a threat can reach the target in order to attack. Based on these vectors, the accessibility of the target is calculated and used in the influence network 500 to determine relative risk. FIG. 37 outlines the steps necessary to construct these vectors.

There are six primary steps to building approach vectors. Step 1-37 involves computing the range from the target that the threat must reach in order to affect consequences. Step 2-37, which is in reality the controlling loop of the process, involves using a weighted graph search technique to build the path. This technique takes two points and builds a path between them. In building the path, the algorithm seeks to minimize cost, which in this case is the number of countermeasures that it must face, and maximize effectiveness, or the resulting consequences to the target.

Steps 3-37 and 4-37 are actually responsible for supporting the weighted graph search algorithm. Step 3-37 involves the actual reasoning component that deals with countermeasures. Using a local version of the influence network 500, the search algorithm can evaluate the response of the threat to the countermeasure(s), and if necessary, can alter the path based on the results. Step 4-37 involves the application of first-order physics to the threat delivery mechanism. By using physics provided by the Dynamics module 240, the weighted graph algorithm determines the types of terrain that the delivery mechanism can cross, and the areas that the mechanism can fit through. In addition, the local influence network 500 makes use of physics to determine the denial capabilities of the countermeasure(s) against the threat. In a later post-processing sequence, the Dynamics module 240 calculates the speed and timing of the threat along the path, for use in later playback.

Step 5-37 of constructing vectors consists of refining the many paths that are produced. Invariably, similar and redundant vectors are generated, differing only slightly from other vectors and not providing useful data to the process. Using pattern-matching algorithms, these extraneous vectors are removed in order to simplify the final representations. Finally, in step 6-37, the accessibility value of the threat to the target is calculated for each vector. Once all of the interesting vectors have been constructed, the accessibility of the site is computed based on the accessibility values of all vectors. This value is used directly by the influence network 500 to determine relative risk.

Dynamics Module 240

The Dynamics module 240 is responsible for calculating and updating the state of the physical objects during the simulation of the threat ingress, given realistic physical properties of the environment and objects acting in the environment.

The Dynamics module 240 is the set of code that modifies and stores the state vectors of all objects. A state vector is a set of physical characteristics and measurements that describe completely the current configuration of a given object. For example, the state vector used in the VAT 200 includes position in three-space, a rotation quaternion to describe the rotation of the object, the linear momentum, and the angular momentum. This state vector is then updated every computation cycle of the Dynamics module 240 as external forces interact with the object and impose a change on the state vector configuration.

Figure 38:
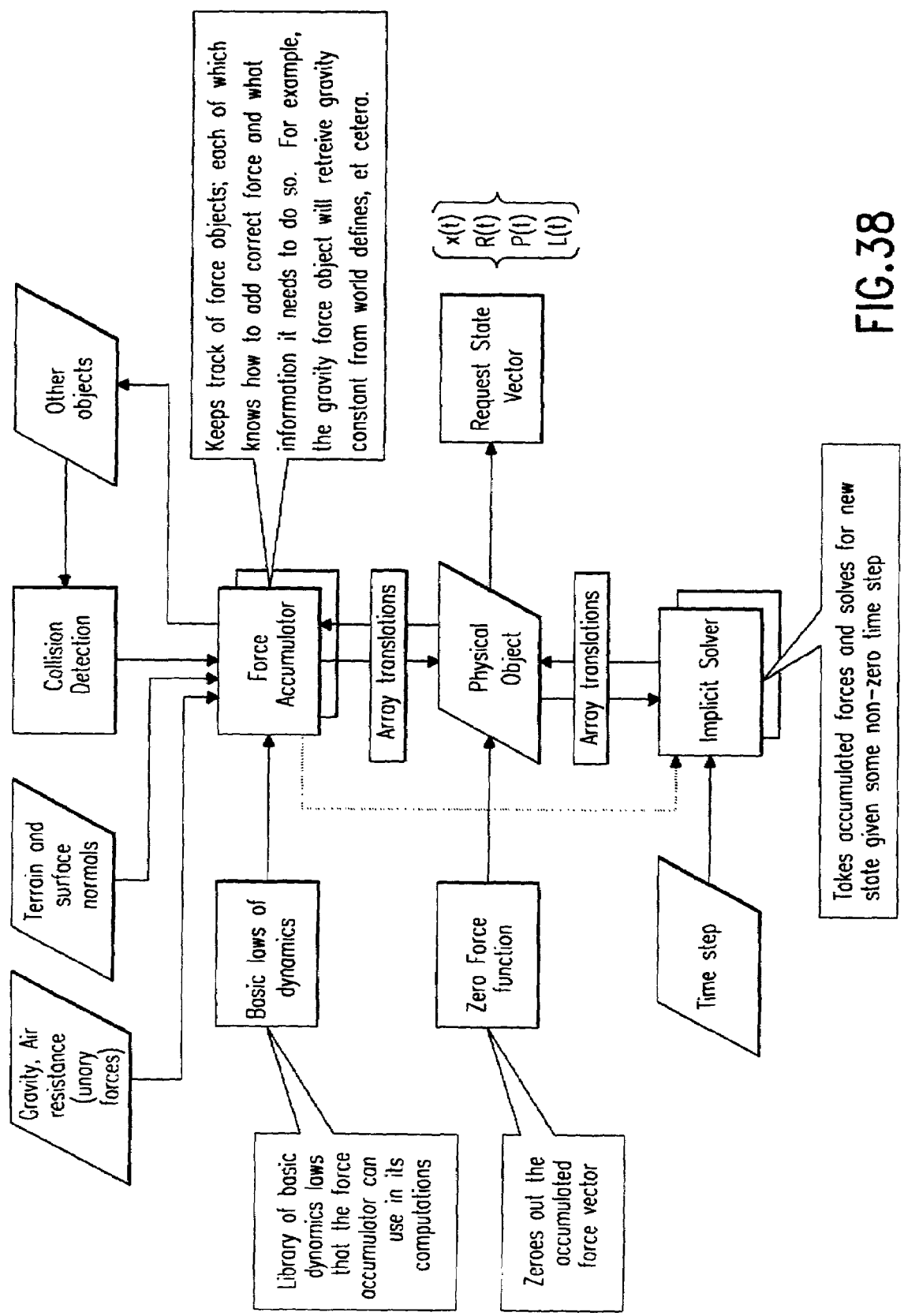
FIG. 38 is a block diagram of the Dynamics Module.

The Dynamics module 240 has three main sections. The first represents the object itself. The others act on that object and are labeled as the Force Accumulator and the Equation Solver. For each cycle of the computation the object sends a message to the Force Accumulator module to sum up all forces acting upon the object. The Force Accumulator has knowledge on how to calculate the various forces in accordance with the Lagrangian dynamics equations (dynamics equations based on energy conservation). For example, the Accumulator will access other objects if there is a collision force, or access only the gravitational constant if it is the gravitational force desired. The total force vector is then passed back to the object. FIG. 38 shows a complete module diagram and data flow outline.

From that point, the Equation Solver takes the time derivative of the object's state vector at time $t_0$, adds in the force as accumulated earlier, and integrates over a given time step $\Delta t$ to result in a final state vector at time $t_1 = t_0 + \Delta t$. The Solver uses an implicit method of solving the ordinary differential equation and utilizes dynamic time steps to minimize errors that occur in stiff Ordinary Differential Equations (ODE) (those that can "blow up" during standard explicit computational methods with too large a time-step).

The Dynamics module 240 is able to simulate any simple physical phenomena, such as object-object collisions, gravitational acceleration of an object, friction and resistance effects, and deformation events. The physical object as stored in the Dynamics module 240 has a volume (spatial extent), mass, and a state vector as described above.

VAT 200 Database

In order to store the many sources of data used throughout the system, the VAT 200 employs a relational database. With a relational database, the VAT 200 is capable of saving data from previous sessions for the user to access later. In addition, the database provides a framework for sharing data between modules in the system, and between users at different locations. FIG. 4 summarizes the many different types of data stored in the VAT Database 220.

The VAT Database 220 operation must be totally transparent to the typical user. This is because the architectural requirements will not support the traditional model where a database administrator manages the database independent of the application. The VAT 200 system is unique in the sense that it must operate in both standalone and traditional multi-tier modes. Therefore, the VAT Database 220 is designed in such a way as to provide data storage capabilities that are transparent to the user and require zero maintenance.

Figure 39:
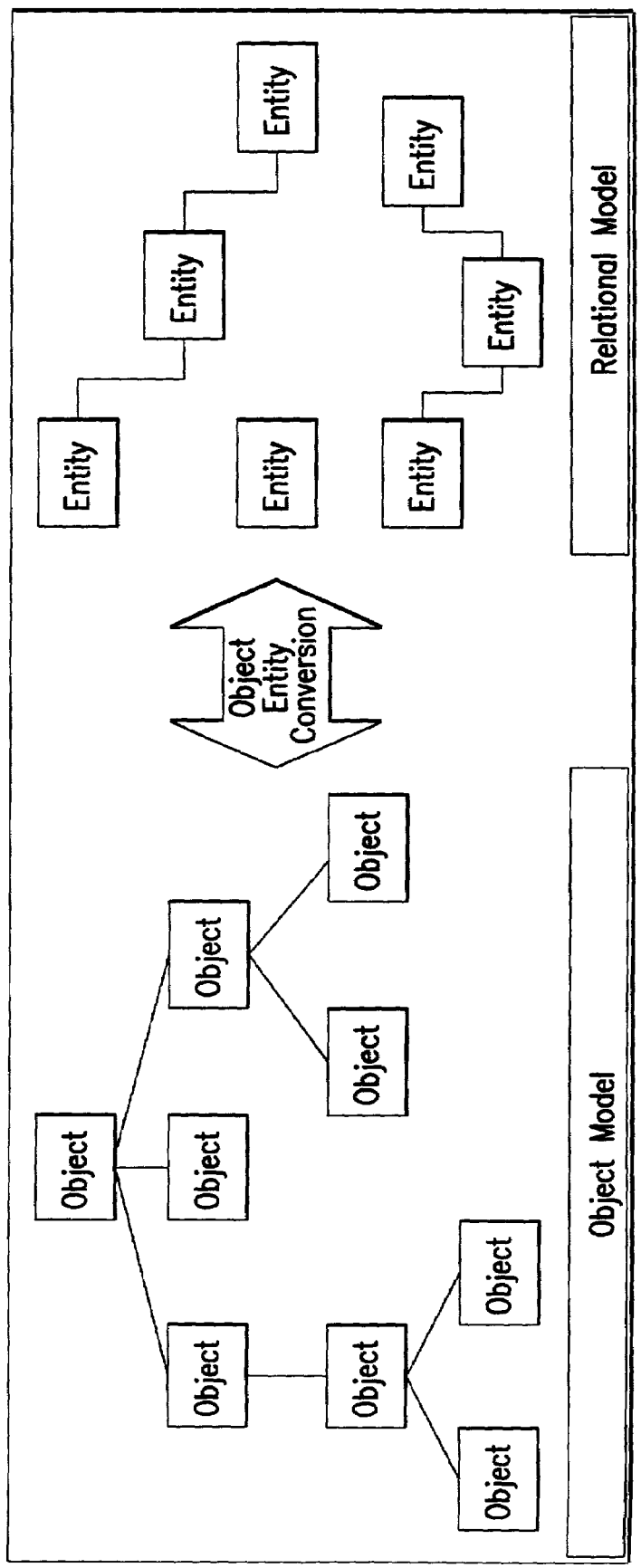
FIG. 39 is an object model to relational model conversion map.

VAT 200 architecture is predominantly object-oriented in nature. A relational database is not object-oriented, but is organized by tables. In order to implement an object-oriented application design the use of a relational database conversion code is required. The code is commonly referred to as a 'mapping' code because it is used to map the application objects to relational entities in the database. Depending on the application, the effort to develop the mapping code can be substantial. The goal of the VAT 200 is to minimize the mapping code effort, while maintaining complete functionality with vendor independence. FIG. 39 depicts the object-to-entity relationship.

The VAT 200 application incorporates a database broker to perform the necessary object-to-relational mapping functions. The broker is a distinct module in the VAT 200 application performing mapping functions, therefore encapsulating database access code. This approach provides a transparent conversion of the relational model into the VAT 200's object model. Modifications to the relational model only require modification to the broker.

The database broker handles all data storage and retrieval functions for the VAT 200 application, therefore housing the necessary database communication code. Regardless of the selected database, the interface between the VAT 200 application and broker remains constant.

Figure 40:
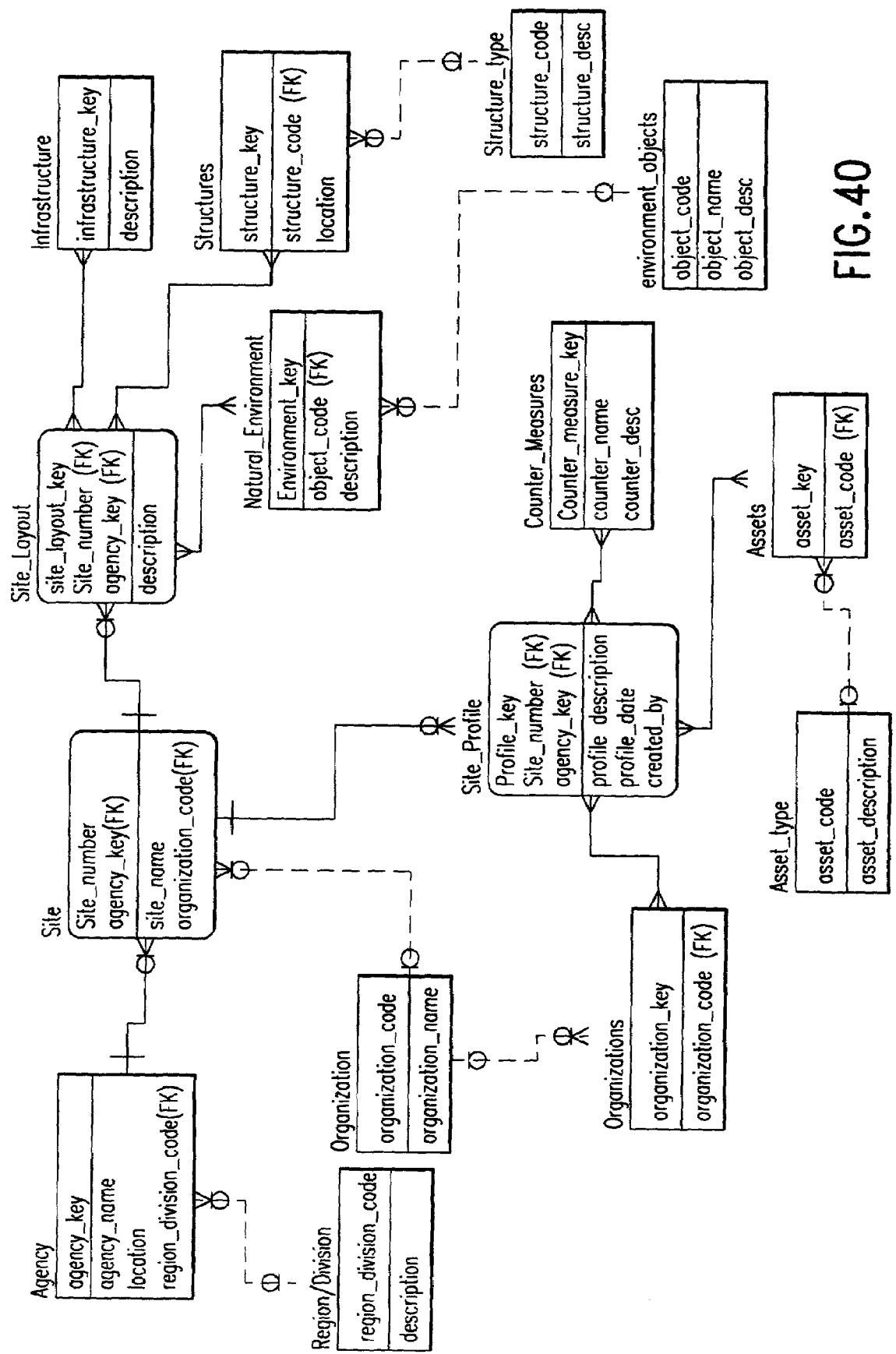
FIG. 40 is a class diagram of the Relational Data Model.

The relational data model is implemented by defining relational entities for the VAT 200 object classes as shown in FIG. 40. Each entity is designed to support the object model as efficiently as possible. The methods and aggregation features of the object model become incorporated into the database broker. The relational data model begins as a logical model defining the necessary entities and appropriate relationships between.

From the logical model, physical models can be created for any supported relational database.

3D Builder/Viewer

The VAT 200 contains the capability to render a site layout in a three-dimensional manner. This includes two modes of operation. The first is a 3D view that allows the user to construct a site or add objects to a site (3D Builder 260). The second allows the user to view a simulation run in a 3D environment (3D Viewer 280). The Builder 260 and Viewer 280 are two modes of operation built on top of the 3D Run-time environment 270, which is based on the OpenGL graphics library. Both use the same underlying rendering techniques, while presenting to the user different functionality. This allows the code base to be shared between the Builder 260 and the Viewer 280, resulting in a smaller memory footprint, easier transition between Builder 260 and Viewer 280 portions of the VAT 200, and a consistent 3D interface.

Figure 41:
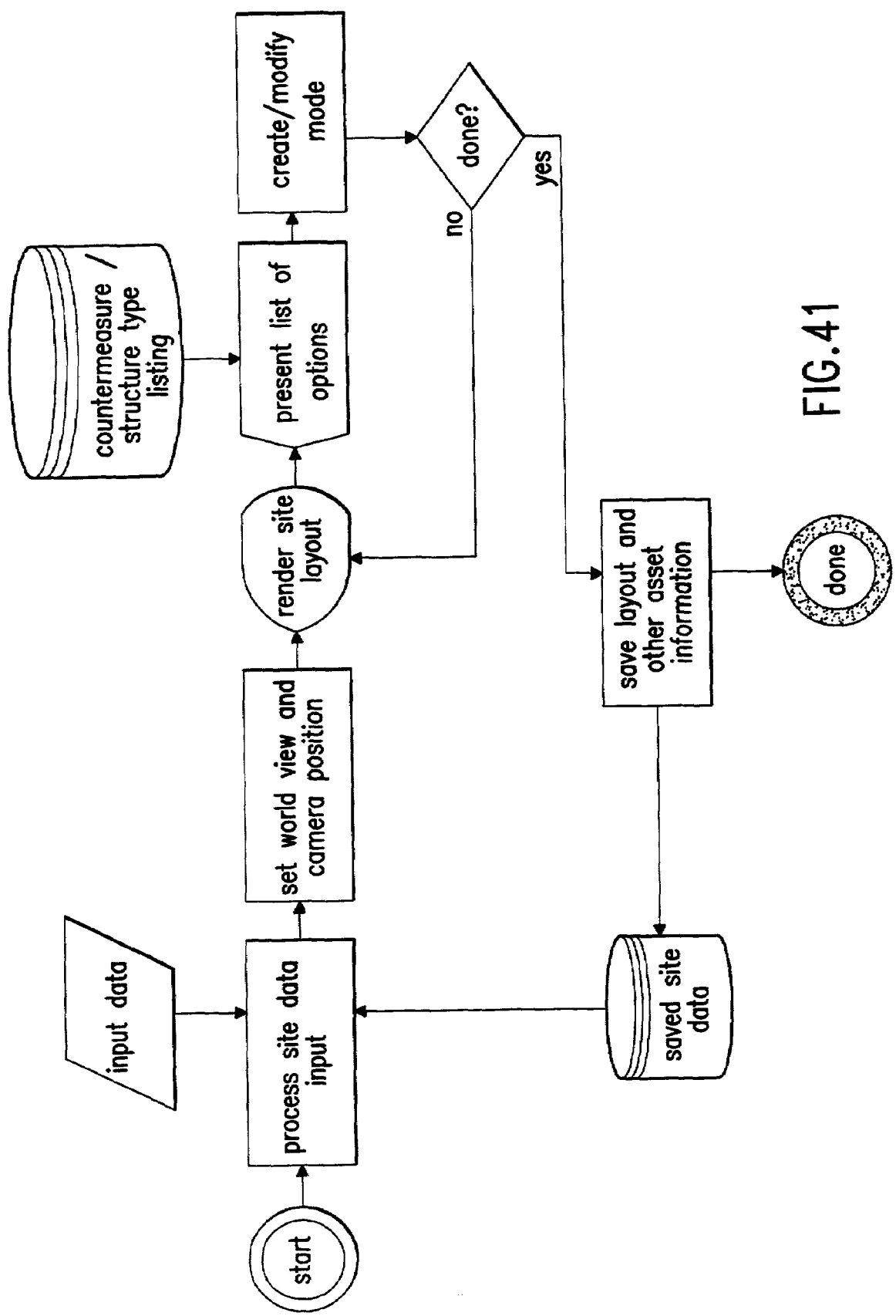
FIG. 41 is a flowchart of the 3D Builder Process.

The 3D Builder 260 allows the user to construct his base in the VAT 200 system for use with the various modules to calculate vulnerability and mitigate risk. The user is presented with a palette of standard 3D construction tools, camera movement options, and structure types to build. The countermeasure library and structure types are then read in from the database, and the list presented to the user in an appropriate menu so he can select a structure to build. The user then uses the tool to build up his site on top of a base image of the layout (scanned-in map, perhaps) or use a base AutoCAD DXF file if applicable. A flow diagram of the builder process is shown in FIG. 41.

Figure 42:
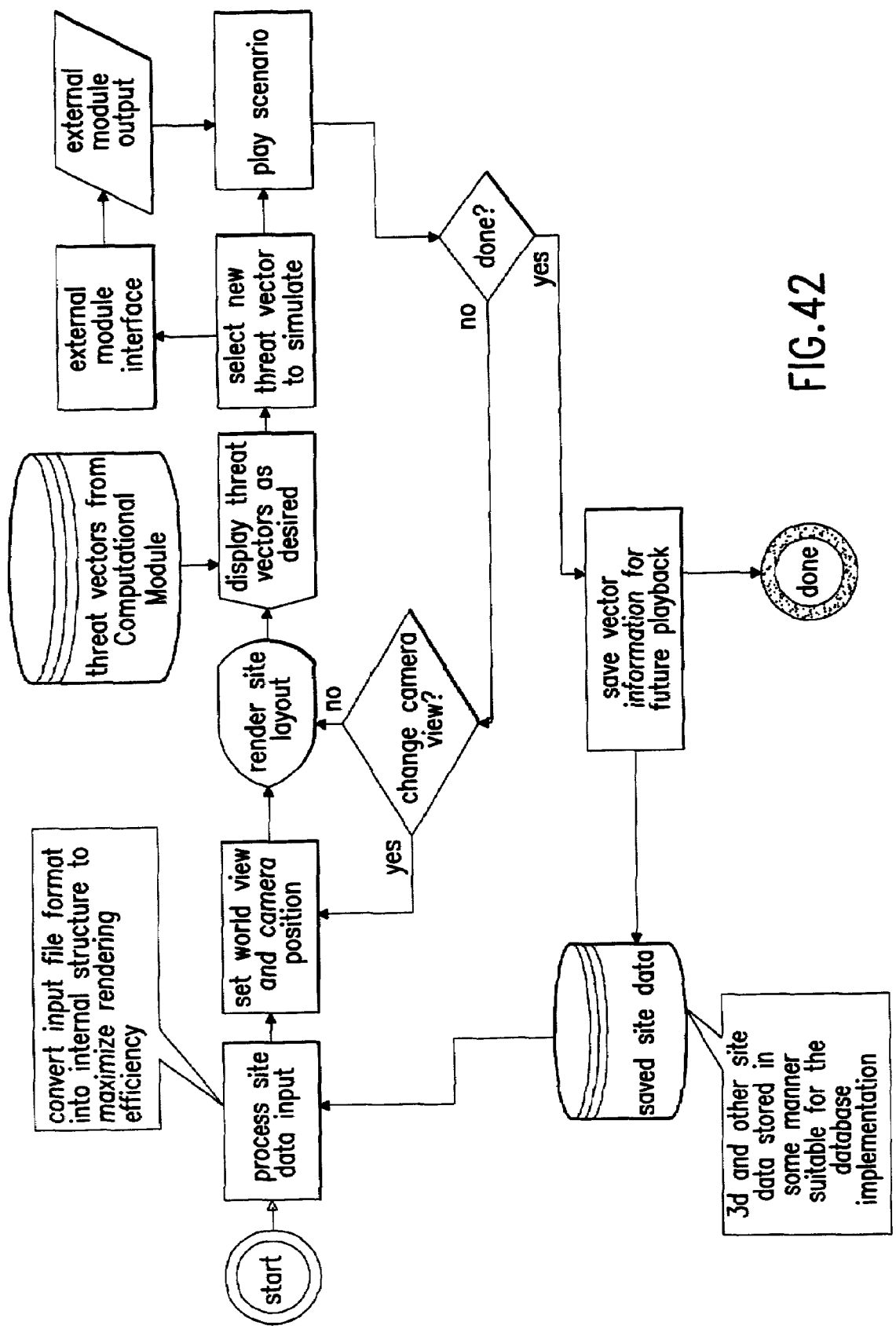
FIG. 42 is a flowchart of the 3D Viewer Process.

The Viewer 280 allows the user to view the site layout as constructed in the Builder 260, then displays the results of the computational cycle that calculates risk to various assets on the layout. This information is displayed as "threat vectors" on the layout, or representations of paths that a threat delivery mechanism would take. Each of these paths can be selected by the user, and the threat scenario can then be played out, including the consequence display at the end based upon data received from the external blast or CB models. A flow diagram of the Viewer 280 process is shown in FIG. 42.

The 3D Viewer 280 and 3D Builder 260 both sit on top of the base 3D Run-time engine as outlined in the previous section. Each interacts with different sub-modules of the Run-time to alter the user interaction, rendering mode, and display options. The Viewer 280, while interacting with the Computational Engine 230 and Dynamics module 240, communicates with the non-physical data structures to populate the threat vector display list. It also interacts with the camera model to change the view upon user request, as well as makes calls to the rendering engine itself to change display modes (switch to wire-frame mode, map textures differently, et cetera). The Builder 260, on the other hand, needs to access the structure of static data to populate the terrain and structure information (static polygons), while also communicating with the rendering engine and the camera model.

The Builder 260, upon initial startup, takes input from a 2D image or a 2D AutoCAD file (DXF). This is then used as the base of the modeling session, which allows the user to build on top of the actual site layout in order to bring it into the third dimension. The DXF file is parsed and translated into an internal format, and all 3D information generated by the Builder 260 is kept in an internal format for maximum efficiency. When the user is finished, the model is then saved out into a common 3D file format that can be stored into the data store (object persistence mechanism), and pulled up later in the Viewer 280. All asset characteristic information is imbedded into the 3D-file format so that all information is in one location.

3D Run-Time Environment

Figure 43:
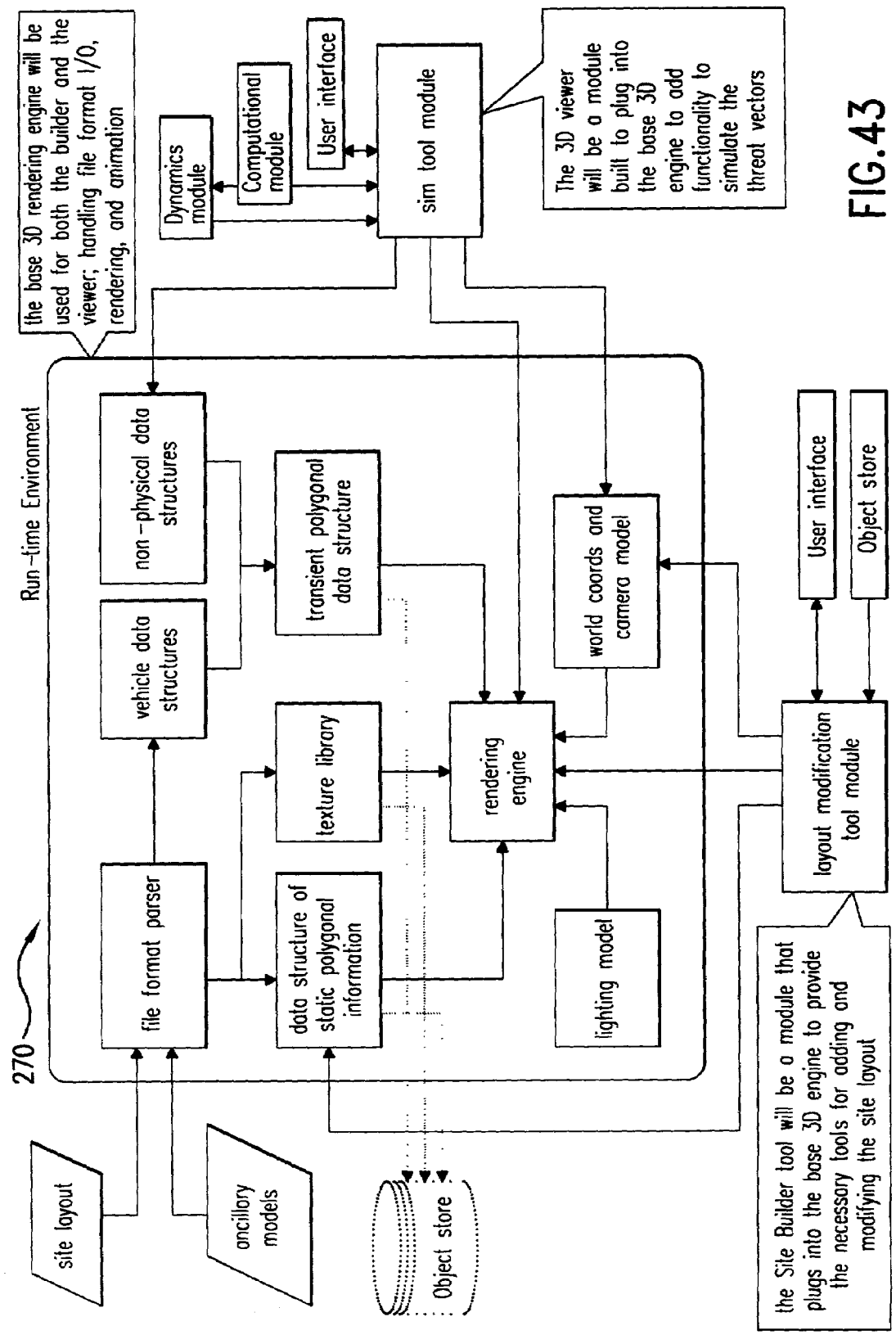
FIG. 43 is a block diagram of the 3D Run-time Environment.

Both the 3D Viewer 280 and the 3D Builder 260 are based upon the same 3D Run-time Environment 270 (also referred to herein as the 3D simulation/gaming environment) that handles the rendering of the scene. The 3D engine stores texture information, polygonal models, and lighting information needed to render the scene quickly and realistically. A detailed look at the sub-modules of the 3D-Run-time Environment 270 is found in FIG. 43.

The 3D Engine takes input from the database to retrieve the site layout as built by the Builder, or from the current polygon structure that the user has constructed in the case of the Builder. The texture images are stored and linked from individual polygons, and the geometry of the layout and buildings are stored separately from the geometry of the mobile objects such as trucks. The polygons for static data such as the terrain and buildings are stored in a manner that is geared toward quick rendering, while the objects that move do not necessarily remain in the same physical area during the simulation, and so cannot take advantage of the spatially-ordered data structure. A Binary Space Partitioning (BSP) tree is then used to store the terrain and structure polygons to allow for the quickest rendering of a large scene while allowing for rapid view-frustum culling and level of detail control. BSP trees allow all polygons to be stored in a tree structure that is branched based upon spatial position, so polygons close to one another in physical space are close in data space as well. These techniques are used to allow for faster rendering speeds on the limited hardware of the PC platform.

The models used to draw all auxiliary vehicles and structures are kept in a model library within the 3D-rendering module to facilitate the addition of new models. The truck models, for example, will not be stored integrated in with the site layout, but will be stored separately to allow addition or changes to the truck model. The site terrain and additional geometry are exportable to a common model interchange format (DXF) for viewing in an external model viewer independent of the VAT 200.

The rendering engine uses the OpenGL graphics Application Programming Interface, or API. This library of graphics routines has become the industry standard for fast real-time graphics, and is supported by most video hardware to provide acceleration and keep most of the graphics pipeline processing tasks off of the CPU. OpenGL provides a robust set of primitive calls to render polygons with realistic lighting, shading, and texturing effects, z-buffering, and other advanced graphics features. The graphics library lends itself to a scene graph approach for storing polygons and transforms internally, while also allowing for a BSP tree or other spatial structure to exist internally since OpenGL does not deal with higher-level polygon sorting or organization. A scene graph is a technique used to store rotations and translations in a tree structure. This structure allows changes at a higher level to affect all objects below the node; organizing rotations and translations in an efficient manner.

Report Generator Module

The Report Generator module of the VAT 200 is responsible for the creation of electronic and printed output from the VAT 200 system. The report generator is driven based on inputs from the user interface that indicate the report type to generate and the desired output format. The report generator always operates on the active dataset for the VAT 200.

Figure 44:
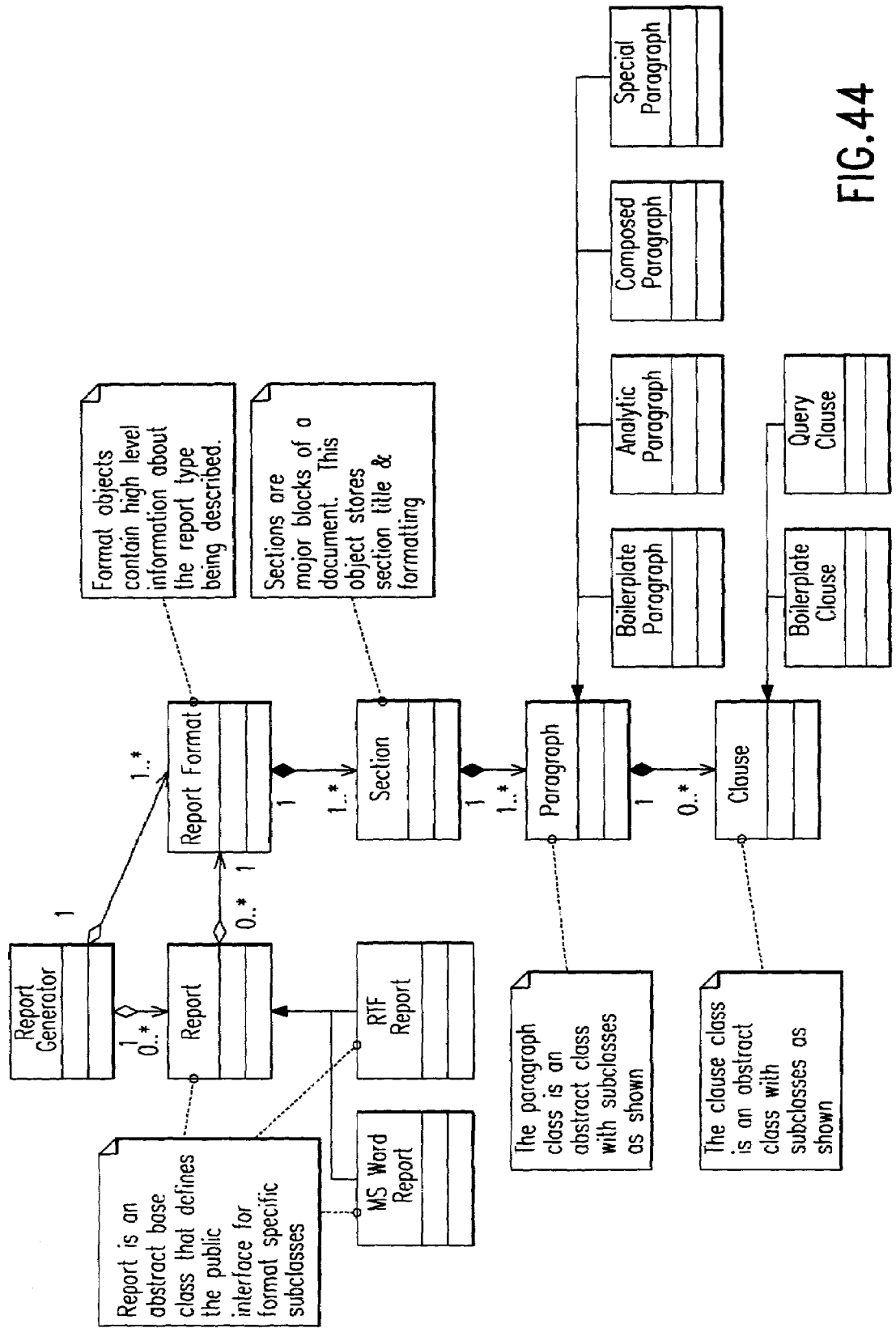
FIG. 44 is a block diagram of the VAT Report Generator Subsystem.

The Report Generator module is built around the design concepts expressed in the User Defined Report Generation Capability section. As described in that section, report formats form the heart of the report generation capability whose structure is reflected in its class hierarchy as shown in FIG. 25, Report Format and FIG. 44, VAT Report Generator module. In addition to the Report Format, Section, Paragraph and Clause object classes discussed in the User Defined Report Generation Capability section; the Report Generator module adds a class for the report that forms the public interface for creating reports in multiple formats, a report generator class that forms the public interface for the subsystem, and several subclasses which implement the specific behaviors for paragraph types, clause types, and output formats.

The report generator object defines the public interface for the Report Generator module. It is the only object in this subsystem that persists throughout a VAT 200 execution. Other objects in the subsystem are instantiated and destroyed as necessary when generating reports or creating user-defined report formats.

The report object is an abstract object that is never instantiated. Instead, it defines the public interface to several subclasses that deal with the specifics of particular output formats. This indirect approach allows the VAT 200 to be more easily expanded in the future to include support for additional output file format types. Initially, the VAT 200 will be capable of creating documents in RTF, and Microsoft Word 97™ formats.

A similar approach has been taken with the paragraph and clause objects. Abstract base classes form the interface to these classes, while specific subclass objects allow for specific behaviors for different paragraph and clause types.

When the user requests to generate a report, the GUI 202 sends the report format, the desired output type, and optionally, an output file name. Report generation occurs in two stages: qualification and creation. During the qualification stage the report generation subsystem performs a walk-through of the report format and verifies that each Section, paragraph, and clause has enough information to create its output. If qualification succeeds, then the subsystem actually creates the report.

If qualification fails, then the subsystem returns with a failed qualification message. Reports that fail qualification may still be generated, however, some information may be indicated as being missing or incomplete. During generation of a report for which the format qualification failed, those sections, paragraphs, or clauses that failed will insert a qualification failure message in the output report that indicates that the required source data was not available.

Plug-In Interface

The VAT Plug-in Interface 250 exposes portions of VAT 200 functionality to allow end users to enhance the capabilities of the VAT 200 beyond those that are delivered with the VAT 200. The VAT Plug-in Interface 250 subsystem exposes four interfaces which collectively allow the user to enhance VAT 200 behavior in three areas: adding additional analytic models, adding additional textual interpreters, and adding additional data input and output converters. In general terms, plug-ins are self-registering Microsoft COM objects that implement the VAT Plug-in Interface and at least one of the other VAT Plug-in Interfaces 250.

Figure 45:
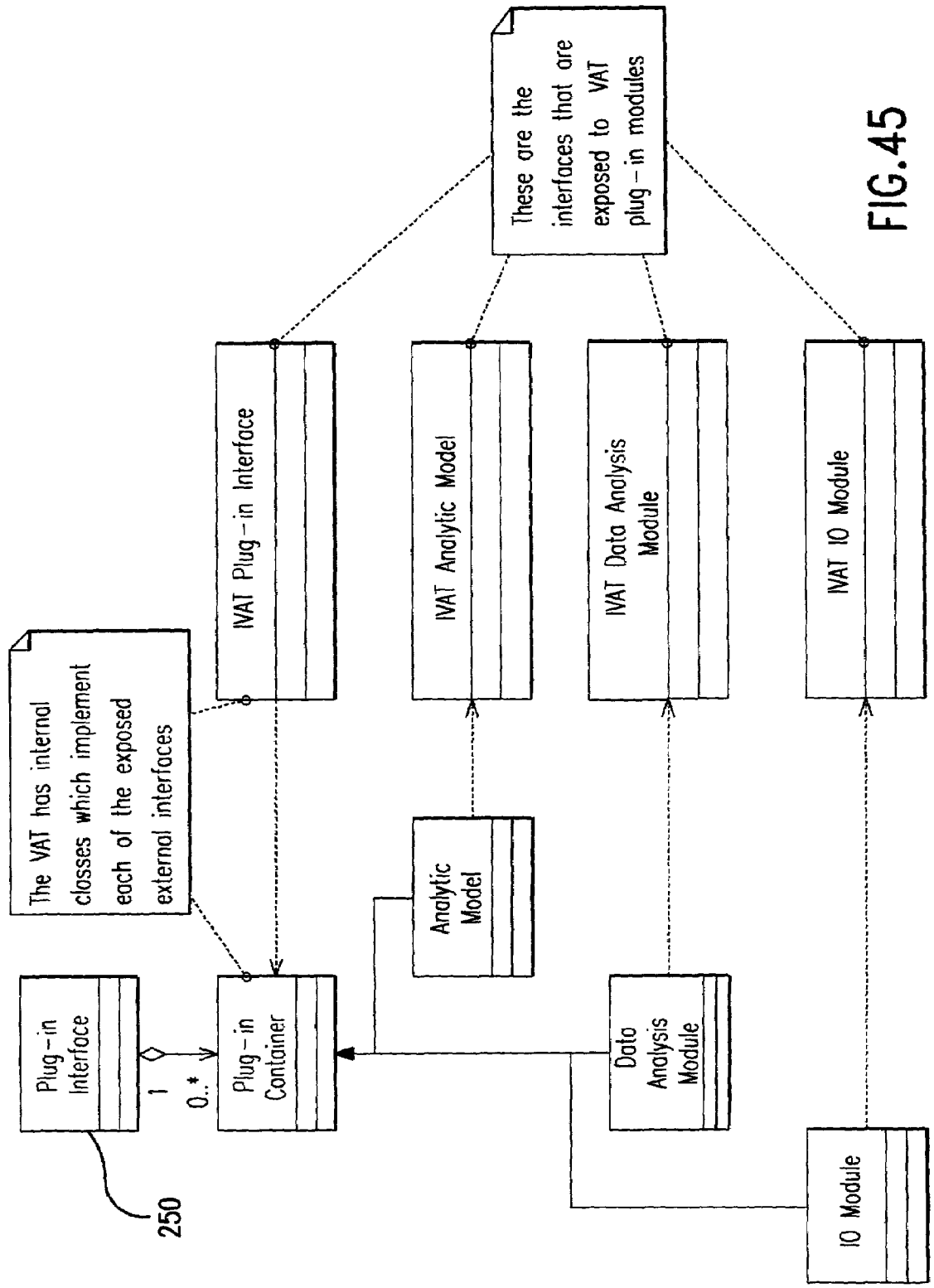
FIG. 45 is a schematic diagram of the VAT Plug-in Interface Class Structure.

The static structure of the VAT Plug-in interface 250 subsystem is shown in The Plug-In Interface Class Structure as shown in FIG. 45. The plug-in interface is structured to support the four exposed interfaces; each external interface is represented internally by a class that provides the methods to interact across the interface. In addition to the interface classes, a higher level class plug-in interface implements control for the plug-in interface and provides the public interface for the VAT Plug-in Interface module 250.

During VAT 200 startup, the VAT 200 initializes the VAT Plug-in Interface module 250, which then proceeds to register all plug-ins that are located in the VAT 200 system plug-ins directory and those in the user plug-ins directory. Each registered plug-in is then started by the VAT 200 to allow it to perform any resource allocation and startup processing that may be required. After VAT 200 processing has completed, this process is reversed. Each plug-in is shutdown to allow it to free any resources it may have acquired during the VAT 200 execution, and the VAT plug-in interface 250 is shutdown.

Figure 46:
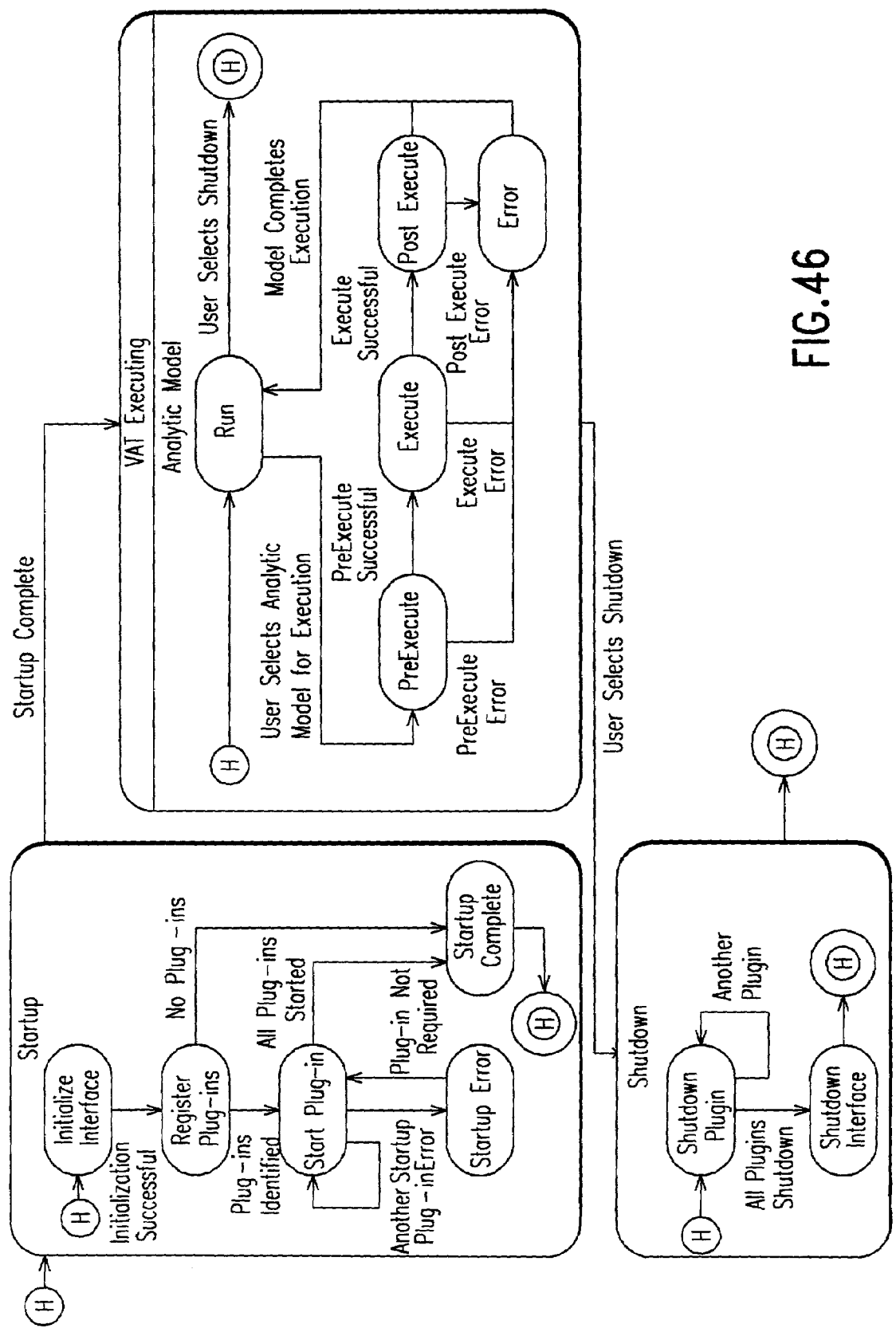
FIG. 46 is a VAT plug-in state diagram.
Figure 47:
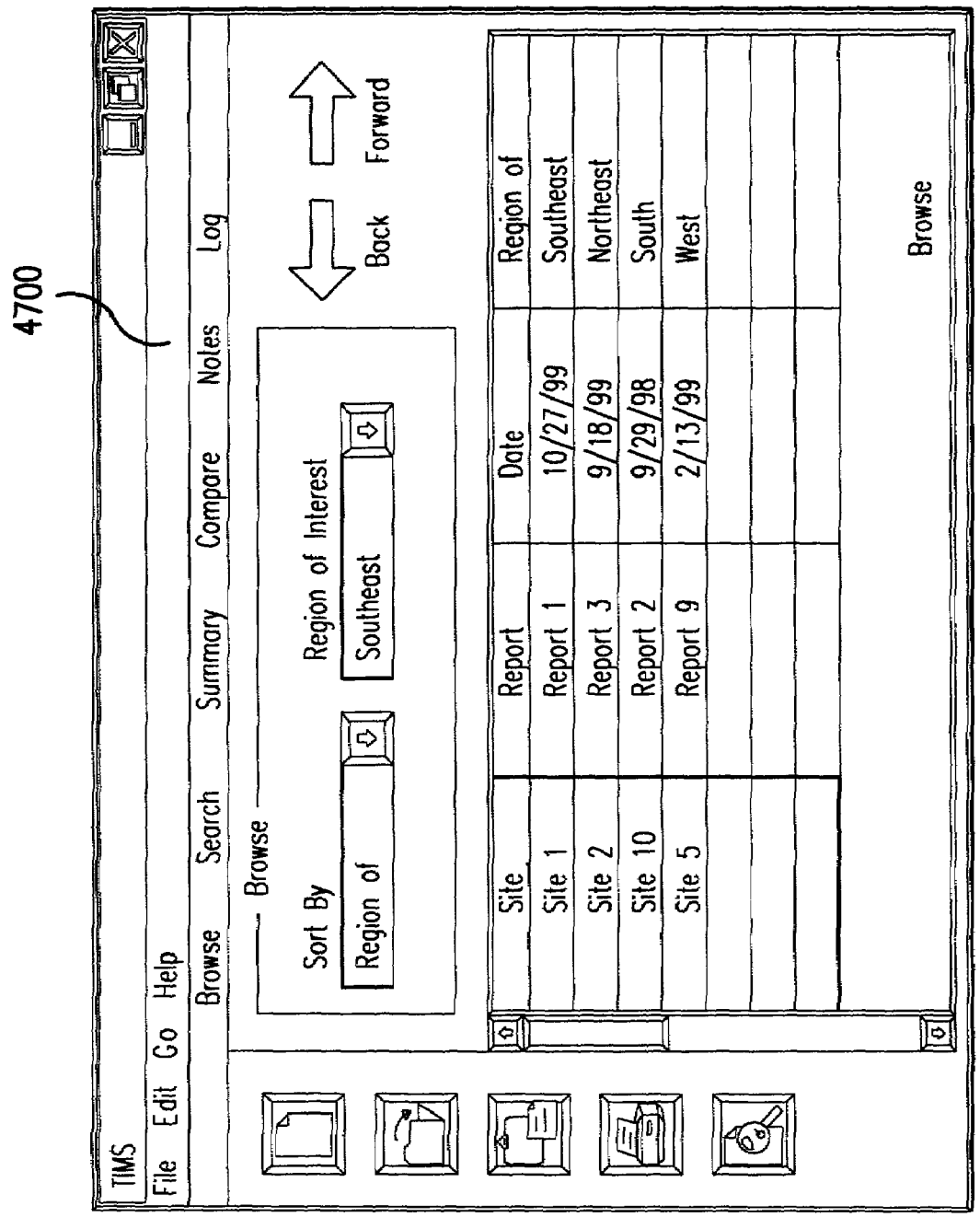
FIG. 47 is a review of the TIMS Browser screen.

Run-time processing varies depending on the type of plug-in. As shown in FIG. 46, while the VAT 200 is running the plug-in is dormant. When the user requests an analytic model execution, however, the plug-in proceeds through three states. The pre-execute state allows a plug-in module to perform any data gather/reformatting required for an impending model execution. After completing pre-execution processing, the VAT 200 proceeds through the execute state wherein the VAT 200 would actually execute the external model, and the post execute state where the VAT 200 allows the analytic module plug-in to perform any post processing and data collection.

TIMS

Interface Design

The TIMS 130 is composed of seven screens:

Login screen

Welcome (splash) screen

Browse screen

Search screen

Summary screen

Compare screen

Notes screen

The login screen allows the user entry into the system based on a login D and a password. Once logged in, a splash screen welcomes the user to the system and offers a list of possible menu selections. The browse screen 4700 is shown in FIG. 12. The browse screen 4700 gives the user the ability to sort the site entries based on several different methods. The user can also search the sites for particular information using the search screen. Once the user had decided upon a particular site and report, the summary screen outlines all of the information available from that site. Using the compare screen, the user can perform side-by-side comparisons of different report entries, either from the same site or from different sites. At any time, the user can capture comments or memos for later use with the notes screen.

Software Architecture

The TIMS 130 provides the user the capability to view individual VAT 200 sessions from multiple sites. The TIMS 130 also allows the user to sort, search and browse the data from the individual VAT 200 sessions by categories such as threat type, risk, score and others.

FIG. 12 is an overview of user interaction with the TIMS 130. Results from local VAT 200 sessions are transferred to the TIMS 130, in the form of the VAT Database 220, and stored in a database along with sessions from other sites. The TIMS 130 user can then analyze these various sessions using several browse and search techniques. Each session is viewable by selecting the Summary option, which displays a brief overview of the session's report and the information collected during the session presented in the form of charts and tables. At any point, the user can access a notes screen to capture comments for later review.

The TIMS 130 database architecture is similar to the local VAT 200 with minor enhancements in order to support the TIMS 130 operational requirements. The TIMS 130 is implemented on a high performance database server supporting multiple clients. The TIMS 130 database is designed to support the storage and access of multiple VAT 200 sessions from multiple sites. Each session is individually identified within the database supporting the TIMS 130 operational requirements. The Database Management System (DBMS) handles data concurrency, integrity and user authentication of the TIMS 130 sessions.

Through the user-friendly interface of the TIMS 130, the user can perform many tasks to understand the information collected from the local sites, including:

Browsing data—The user can scroll through all of the information sessions collected from the local sites Searching—The user can search for particular sets of data based on specific information, such as a site or a date Ranking and sorting—The user can sort the data and assign rankings based on categories such as threat type, risk score, remediation cost, target types, and vulnerabilities.

Comparison—The user can compare report sessions between the Professional Assessor and Planner, across different dates, and through other means.

Figure 48:
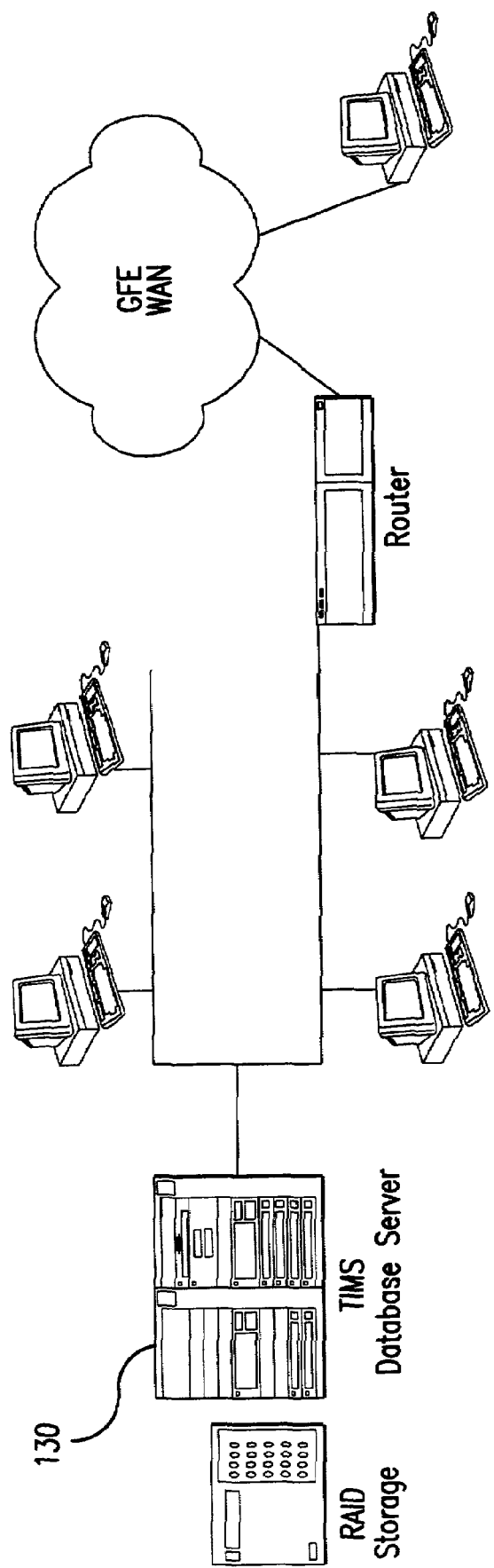
FIG. 48 is a TIMS Client-Server network diagram.

Because of the web-enabled capability of the TIMS 130, a client-server arrangement is used as depicted in FIG. 48. The TIMS 130 server handles the reception and storage of the local VAT 200 sessions, capturing each separate VAT Database 220 into one comprehensive data store. The user then accesses the collection of VAT 200 data by pointing their Web browser to the TIMS 130 server. The server also handles login and password authentication before allowing VAT 200 data to be viewed.

VAT Editor

The AVAT 100 Suite includes an editor that is capable of modifying the VAT 200 user interface, database, and reports formats. The editor is a standalone application that interfaces with the VAT Database 220 in order to make all of the available modifications. This is possible because the user interface definitions and report formats for the VAT 200 are all stored in the database instead of being compiled into the VAT 200 executable.

The VAT Editor 150 is capable of creating and editing the user interface screens and can define screens that are tailored to different types of users. It can edit the database to add object instances into the data model and modify the influence network 500. Finally, the VAT Editor 150 can create, edit, and delete report formats to create new and customized reports to meet future needs.

User Interface Design

Figure 11:
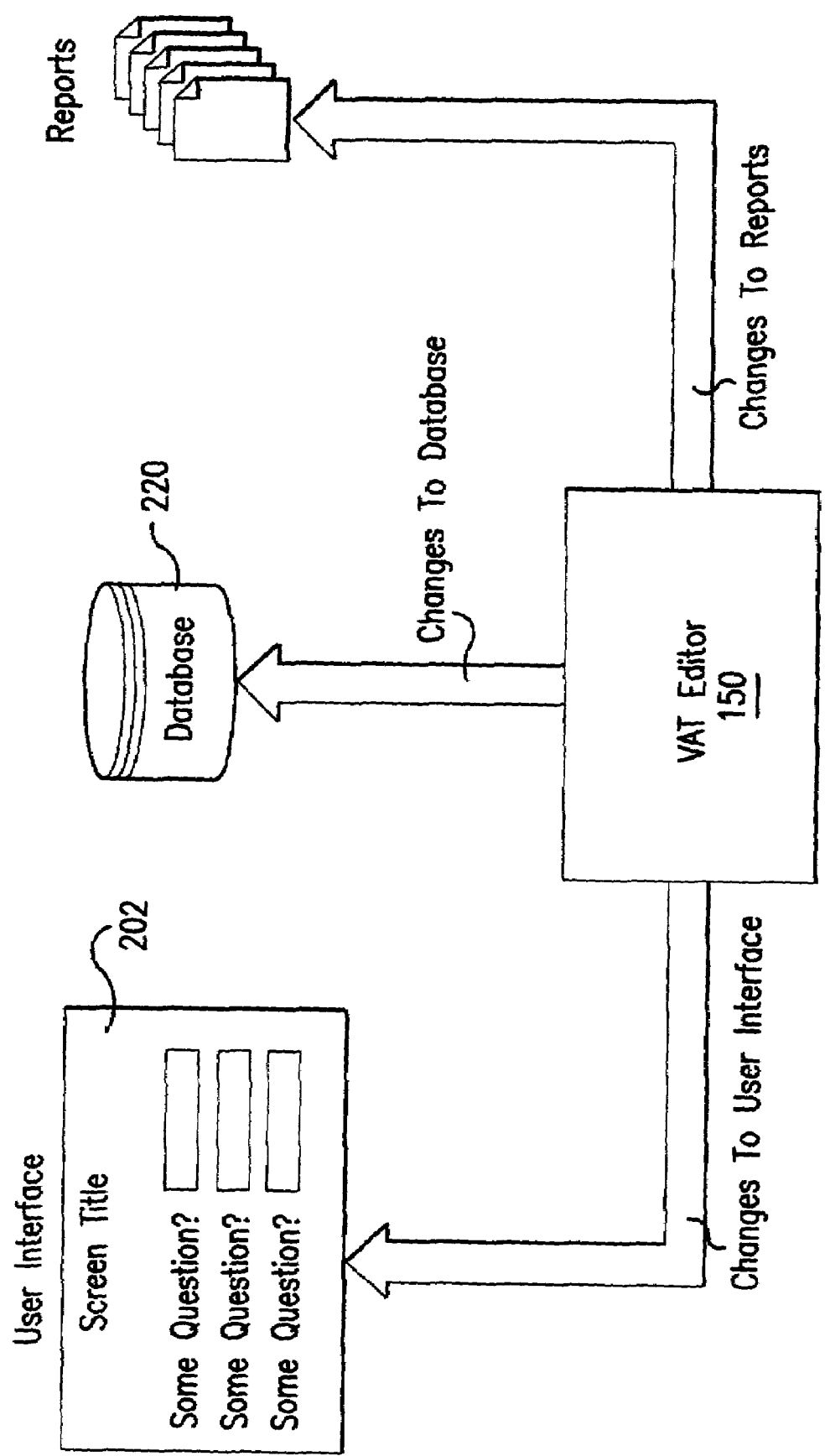
FIG. 11 is a schematic view of the interaction of the VAT Editor with other system components.

The VAT Editor 150 will allow the user to both view and change many aspects of the VAT 200 application. It is designed to allow a knowledgeable user to customize and extend the VAT 200 to address future user needs. The tool will have a mode for viewing and modifying the VAT 200 user interface, database, and output report formats. Each mode displays an overall picture of the item being edited and provides a toolbar on the left to issue edit commands. A mockup of the interface is shown in FIG. 11.

The User Interface Editing mode presents the user with a representation of the current screen flow in the system. It then allows the user to modify the flow of the screens, the content of the screens, and the look and feel of the application. Because the flow and contents of the screens are highly dependent on the contents and structure of the database, the Database 220 mode is always available to the user for reference.

The Database Editing mode provides the user with the ability to view and move around the database and its contents. It is capable of showing both the data model and the influence network 500. From there the user can select a class or node to view and/or modify.

Figure 49:
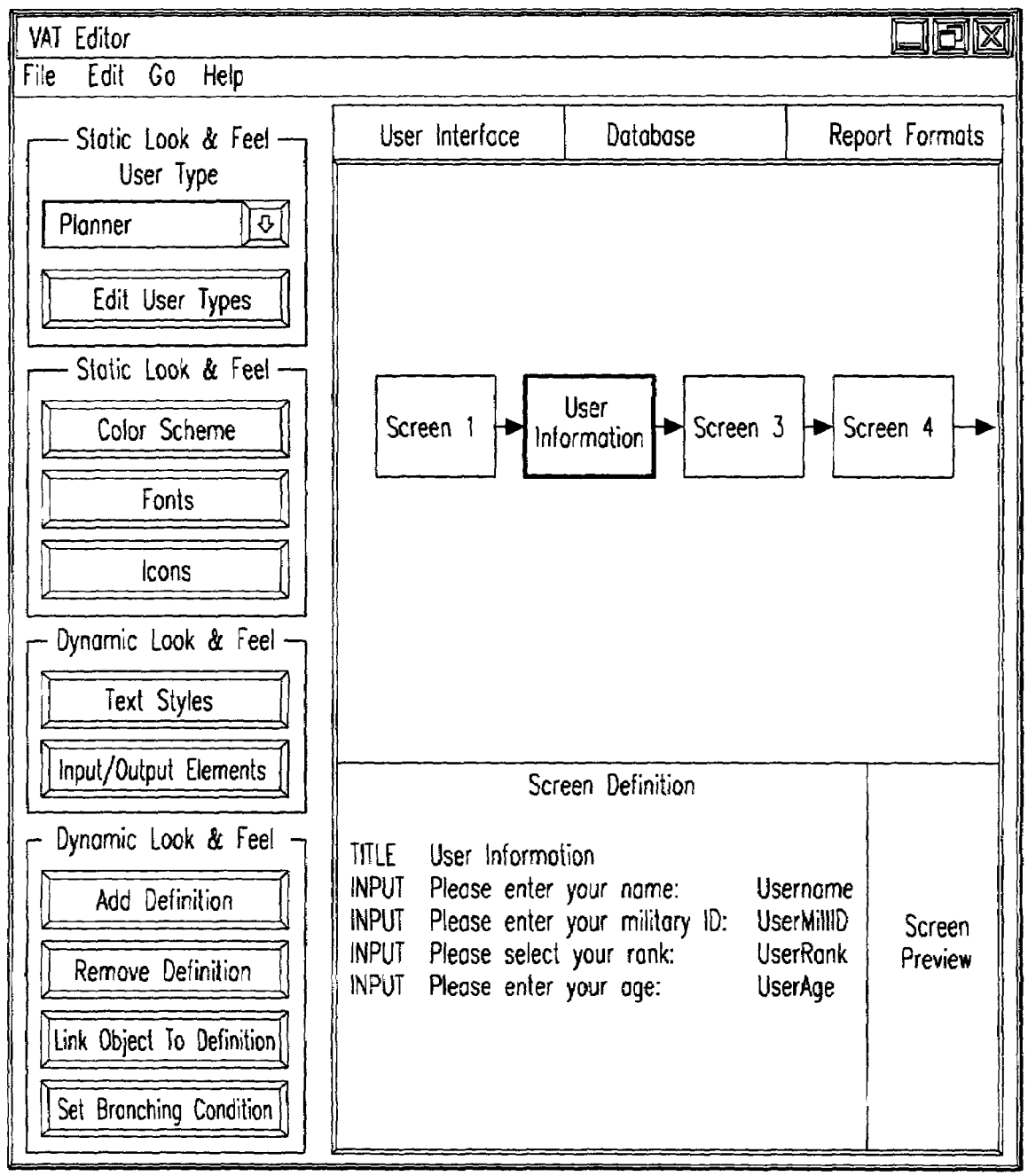
FIG. 49 is a view of the VAT Editor Modes screens.

The Report Format Editing mode allows the user to view the format of the reports in the VAT 200. They can then create new reports from scratch, create new reports from existing report formats, and edit existing report formats. The VAT Editor 150 will display the sections, paragraphs, and clauses that comprise the report format. The user can then select items to edit and/or insert new items from a list. The screen listing the three editing modes is shown in FIG. 49.

User Interface Editing

Figure 50:
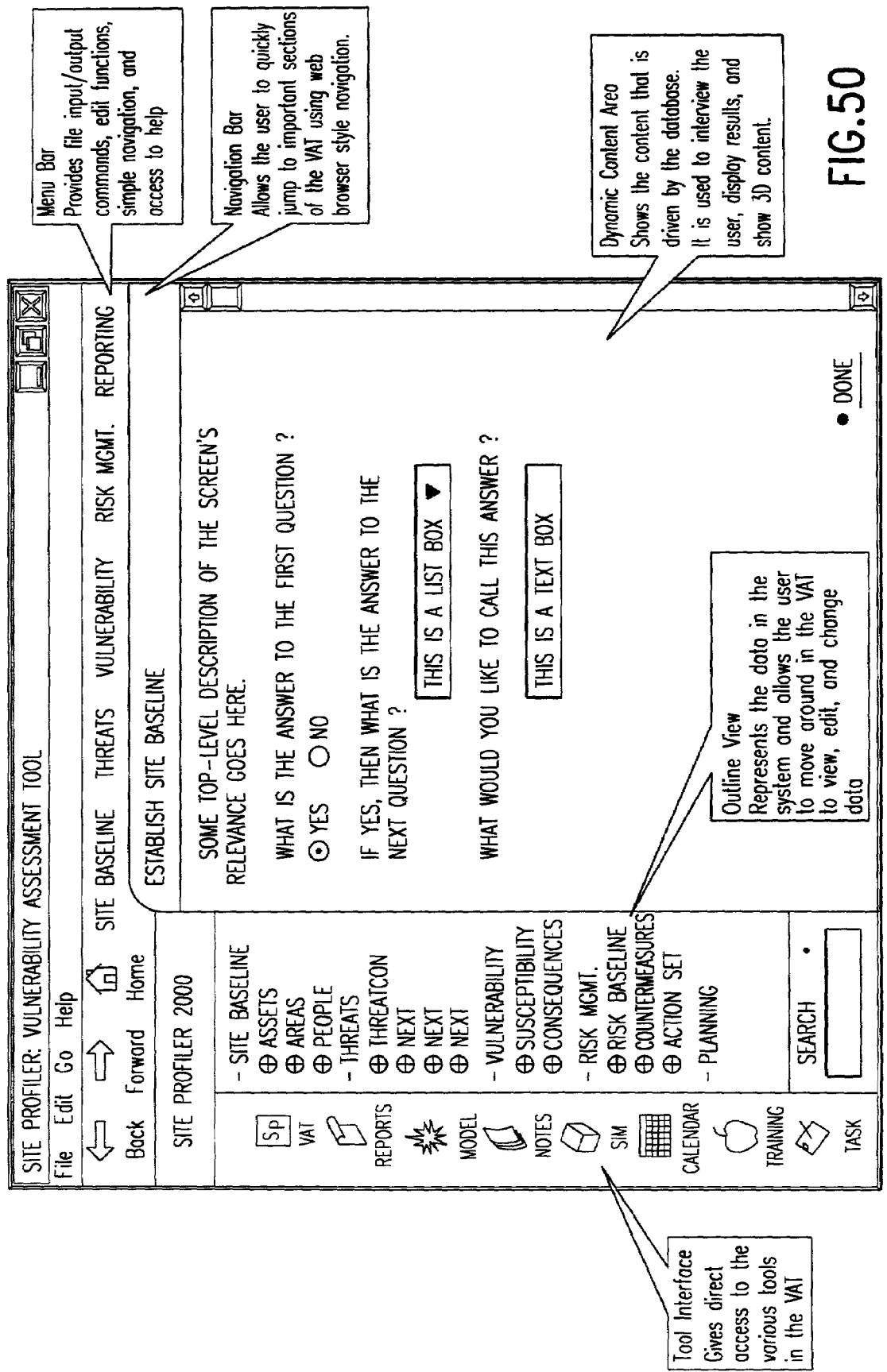
FIG. 50 is a view of a user interface screen.

There are two aspects of the User Interface that can be modified: the dynamic content and the overall look and feel as shown in FIG. 50.

Figure 51:
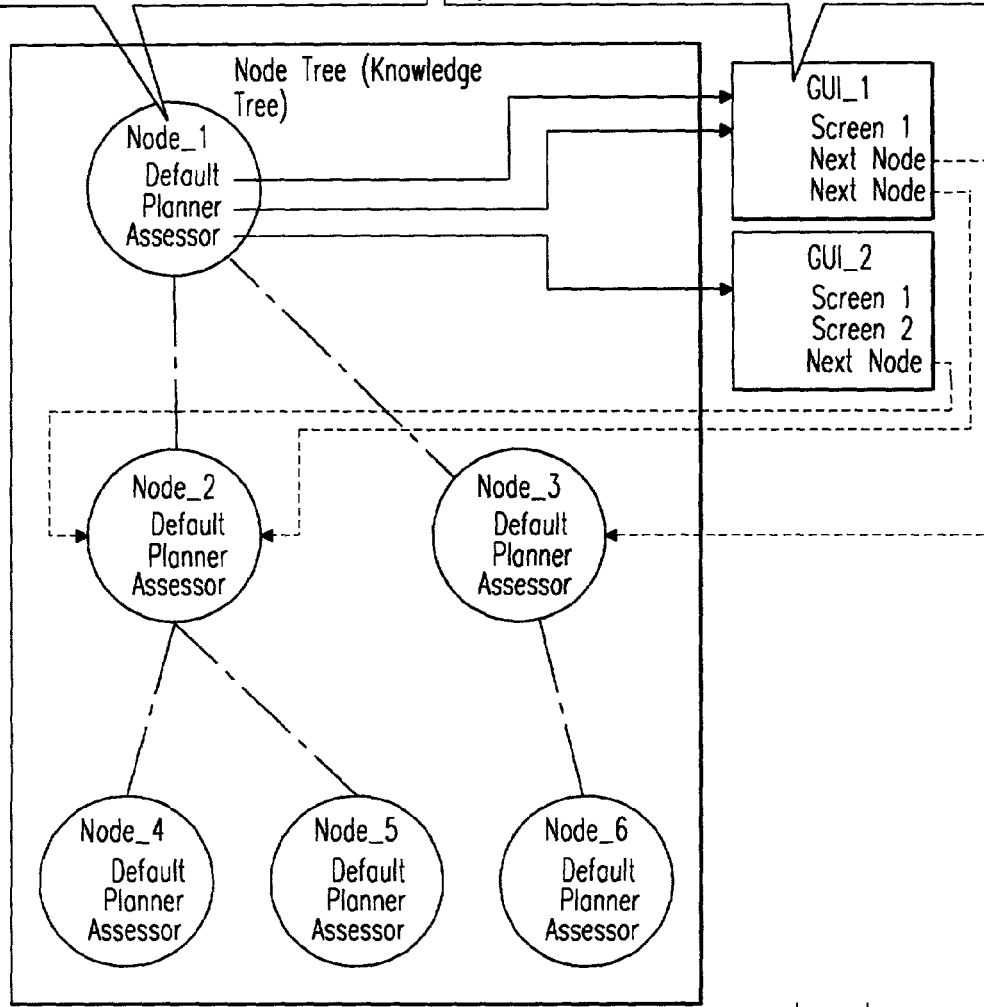
FIG. 51 is a node—GUI relational diagram.

Nodes in the influence network 500 and the objects in the data model 2600 drive the dynamic content of the user interface, shown above. Each of these items has one or more GUI 202 definitions associated with it as shown in FIG. 51.

Each GUI 202 definition is also associated with a specific user type that will use it. The user is able to:

Create and edit user types

Create and edit the GUI 202 definitions that the GUI Engine 210 associates with each user type for each node and data model object.

The GUI 202 definitions completely describe the dynamic content for the given object. Using the VAT Editor 150 the user is able to specify.

The title for the screen

Screen breaks

Static text

Data input and output fields including:
Associated prompts and questions
Where the data is stored in the database
How it should be entered including:
Size limits
Type limitations
Choice lists
Default values Images
Placement
Source file Buttons including:
Text label
Type
Action The objects in the database that should be filled in next In addition to defining the dynamic content of the user interface the VAT Editor 150 can also specify the look and feel of the application. This applies to both the dynamic content and the static content. For the dynamic content the user can specify:

What type of GUI 202 component is used for each type of data. Example: Boolean values are displayed using check boxes or a list box with true and false choices.

The format for specific types of objects on the screen. Example: Titles are bolded and centered.

For the static content the user can specify:

The colors to use for GUI 202 elements

The fonts to use for GUI 202 elements

The images to use for icons

Database Editing

The database-editing mode will allow the user to update and modify the database 220 to:

Create and edit objects in the Data Model 2600 by defining instances of existing classes. Example: Create a Jeep from the vehicle class by filling in its parameters.

Add simple nodes to the Node Tree that can only receive input from the user interface, they cannot access data model objects or system calculations.

Adjust the influence of certain nodes in the Node Tree including any that they create.

Add general data to the database for use in the GUI 202 and reports.

The VAT Editor 150 is not able to edit or add classes in the Data Model 2600 in preferred embodiments.

Output Report Format Editing

When editing output reports using the VAT Editor 150 the user is able to create, modify, and delete report formats in the system. This allows them to customize exiting report formats or create completely news ones as they see fit. Report formats in the VAT 200 consist of sections, which can consist of paragraphs that can consist of clauses. The user is able to add, remove, or modify any part of a report.

To create even more customized reports, the VAT Editor 150 allows the user to create, modify, and delete the available sections, paragraphs, and clauses in the system. The user can edit both the content and the formatting of the items in the report. The paragraphs and clauses are where all the report content is created. Sections, which can contain only paragraphs, are used to conveniently group paragraphs together for later reuse.

Figure 52:
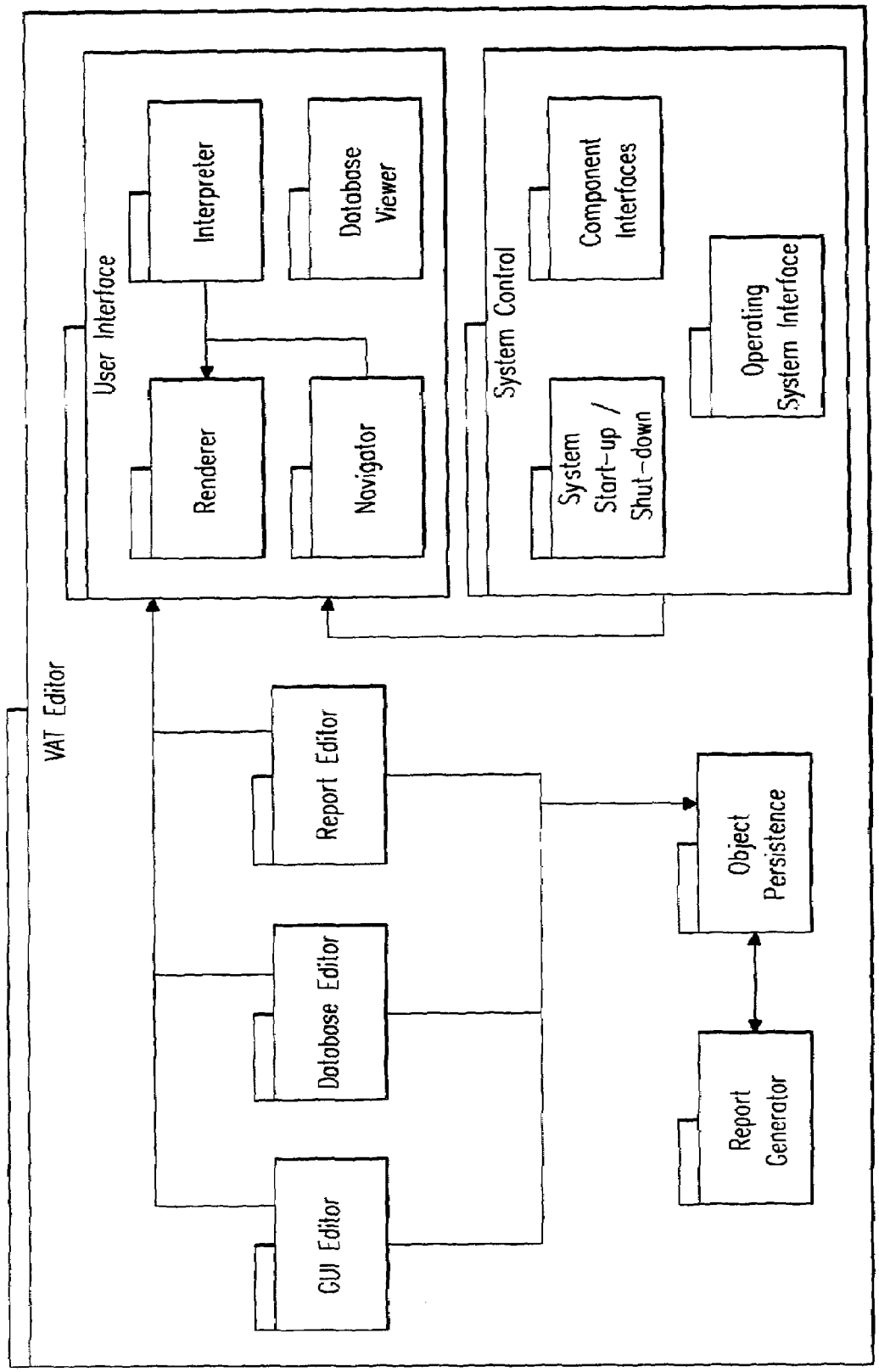
FIG. 52 is a package diagram of the VAT Editor.
Figure 53:
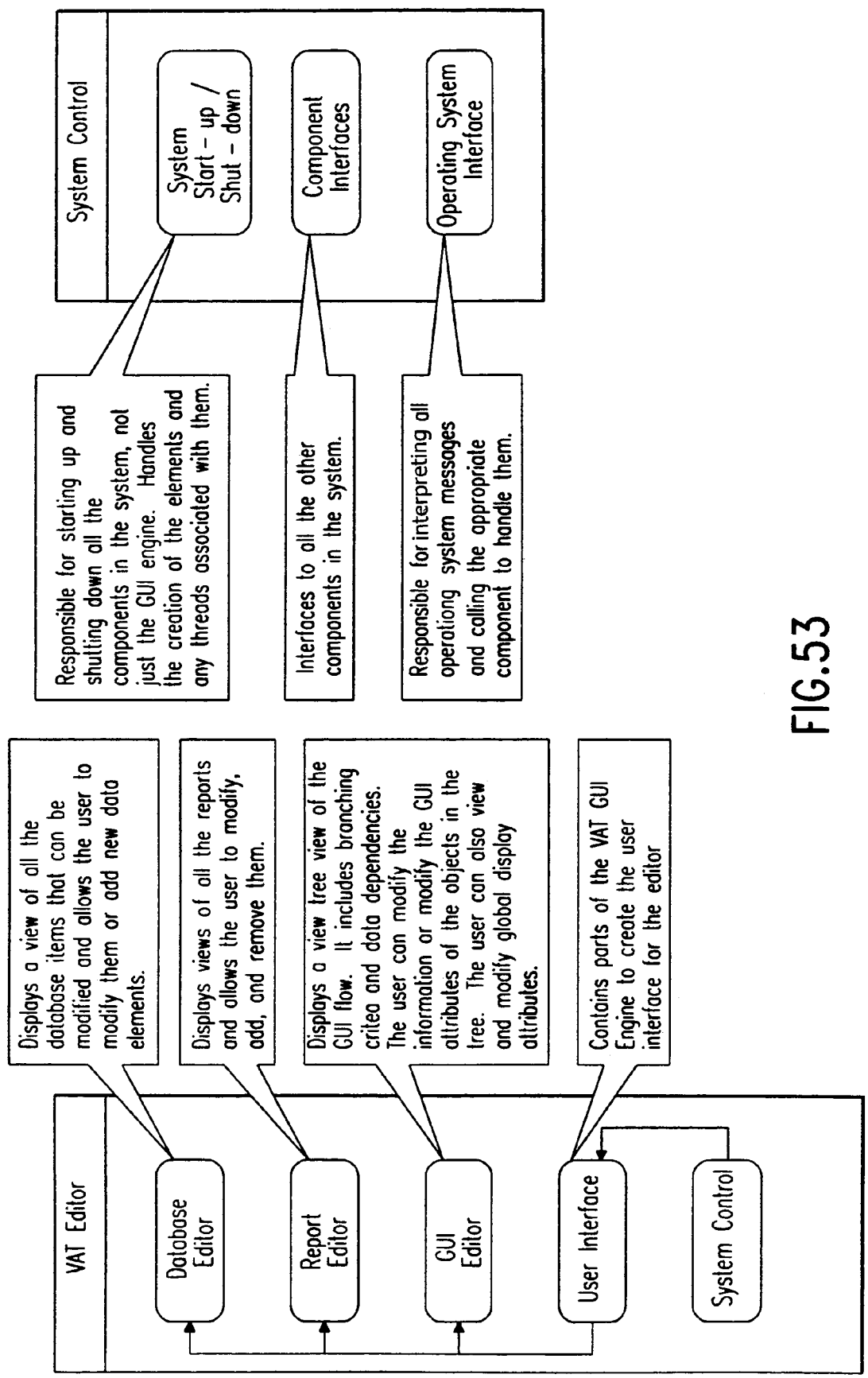
FIG. 53 is a block diagram of the VAT Editor.

The paragraphs in an output report can consist of:
Static Text
Results from simple queries of the database that return graphs or tables
Results from a report plug-in
Groups of clauses in the report system
Images
Clauses in a report can consist of:
Static text
Data values in the database
Results from simple queries of the database that return text or simple data values FIG. 52 illustrates the various components of the Editor 150. The VAT Editor 150 reuses packages of the VAT 200. FIG. 53 illustrates the various subsystems of the VAT Editor 150.

The invention has been described above in connection with a preferred embodiment related terrorist risk management. However, the architecture of the invention lends itself to modification for various other types of risk, including but not limited to the following:

Infrastructure Attacks
Information Theft (hackers, computer theft, etc.)
Financial Risk Management
Insurance Risk Management
Environmental Hazards
Risks to On-Orbit Satellite Systems and Constellations
Risks Associated with Air and/or Highway Travel
Risks to Manned and Unmanned Space Travel
Military Planning and targeting (inverse of the risk problem)
Executive/Personal Protection
Home Security
Building Security
Program and Project Risk Management
Drug Research or Other R&D Planning The modification is aided by the plug-in architecture of the invention. As discussed above, risk=probability*vulnerability. Vulnerability is based on both susceptability and consequence. The structure of the influence network lends itself to modification for any of the above-referenced risk situations. For example, in terrorism risk management embodiments, the invention calculates susceptibility based in part upon the 3D simulation/gaming environment (referred to above as accessibility calculations) and in part upon consequence calculations performed by existing external programs via the plug-in interfaces. Modification of this embodiment for an application such as home security is straightforward. For example, the consequence calculations, instead of being performed with blast and CBR models, can be simplified to calculate property loss and damage as a result of a burglary. The 3D simulation/gaming environment can be modified to calculate vectors representing probable burglar entry routes rather than weapons delivery routes. As another example, the invention may be modified for risk management of information theft by replacing the 3D simulation/gaming environment with a network security model. As a still further example, in a risk management system directed toward risks associated with space travel, the 3D simulation/gaming environment (which calculates accessibility) can be replaced with a model that calculates the proximity of the spacecraft to space debris, and the blast/CBR calculators can be replaced with similar programs that model damage to the spacecraft resulting from collisions with space debris.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Accordingly, the invention is not to be seen as limited by the foregoing description, but is only limited by the scope of the appended claims.

What is claimed is:

1. A method of assessing a risk of a terrorist attack on a site comprising the steps of:
   calculating a probability that a terrorist attack on the site will occur;
   calculating a vulnerability to the terrorist attack on the site, the vulnerability being based on a susceptibility to the terrorist attack and a consequence of the terrorist attack, the susceptibility being based on an accessibility determined from a model of the physical environment of the site and for a weapon, delivery system and specific target at the site;
   calculating a relative risk based on the probability and vulnerability;
   storing the calculated relative risk in a computer memory; and
   using the calculated relative risk for assessing the risk of a terrorist attack
   wherein the step of calculating a probability is performed using an artificial intelligence network, and wherein a plurality of approach vectors are determined for delivery of the weapon by the delivery system to the specific target at the site.

2. The method of claim 1, wherein the artificial intelligence network is a Bayesian network.

3. The method of claim 1, wherein the specific target is for a weapon, delivery system and specific target at the site chosen by a user.

4. The method of claim 3, wherein a plurality of approach vectors are determined for delivery of the weapon by the delivery system to the specific target at the site.

5. The method of claim 4, wherein countermeasures along the approach vectors are evaluated and the approach vectors are modified in response to the countermeasures where necessary.

6. The method of clam 1, further comprising the step of modifying the physical model of the site to add at least one additional countermeasure and re-calculating the accessibility for the modified physical model.

7. The method of claim 1, wherein the approach vectors are determined using a weighted graph search technique.

8. The method of claim 1, wherein the accessibility is based on accessibility values for multiple approach vectors.

9. The method of claim 1, wherein the probability is based at least in part on a trigger.

10. The method of claim 9, wherein the trigger is an historical event.

11. A device for assessing a risk of a terrorist attack on a site comprising:
   a memory; and
   a processor connected to the memory;
   wherein the processor is configured to perform the steps of
      calculating a probability that a terrorist attack on the site will occur;
      calculating a vulnerability to the terrorist attack on the site, the vulnerability being based on a susceptibility to the terrorist attack and a consequence of the terrorist attack, the susceptibility being based on an accessibility determined from a model of the physical environment of the site and for a weapon, delivery system and specific target at the site; and
      calculating a relative risk based on the probability and vulnerability;
   wherein probability is calculated using an artificial intelligence network, and wherein a plurality of approach vectors are determined for delivery of the weapon by the delivery system to the specific target at the site.

12. The device of claim 11, wherein the artificial intelligence network is a Bayesian network.

13. The device of claim 11, wherein the specific target is chosen by the user.

14. The device of claim 11, wherein the processor is further configured to evaluate the countermeasures along the approach vectors and modify the approach vectors in response to the countermeasures where necessary.

15. The device of claim 11, wherein the processor is further configured to perform the steps of modifying the physical model of the site to add at least one additional countermeasure and re-calculating the accessibility for the modified physical model.

16. The device of claim 11, wherein the approach vectors are determined using a weighted graph search technique.

17. The device of claim 11, wherein the accessibility is based on accessibility values for multiple approach vectors.

18. The device of claim 11, wherein the probability is based at least in part on a trigger.

19. The device of claim 18, wherein the trigger is an historical event.

* * * * *